United States Patent
Akgul et al.

(10) Patent No.: US 11,531,994 B2
(45) Date of Patent: Dec. 20, 2022

(54) ELECTRONIC DETECTION OF PRODUCTS AND ARRANGEMENT OF PRODUCTS IN A DISPLAY STRUCTURE, ELECTRONIC DETECTION OF OBJECTS AND ARRANGEMENT OF OBJECTS ON AND AROUND THE DISPLAY STRUCTURE, ELECTRONIC DETECTION OF CONDITIONS OF AND AROUND THE DISPLAY STRUCTURE, AND ELECTRONIC SCORING OF THE DETECTED PRODUCT AND OBJECT ARRANGEMENTS AND OF THE DETECTED CONDITIONS

(71) Applicant: VISPERA BILGI TEKNOLOJILERI SANAYI IC VE DIS TICARET A.S., Istanbul (TR)

(72) Inventors: Ceyhun Burak Akgul, Besiktas (TR); Kaan Can Fidan, Kadikoy (TR); Alper Aydin, Sisli (TR)

(73) Assignee: VISPERA BILGI TEKNOLOJILERI SANAYI IC VE DISTICARET A.S., Istanbul (TR)

( * ) Notice: Subject to any disclaimer, the term of this patent is extended or adjusted under 35 U.S.C. 154(b) by 153 days.

(21) Appl. No.: 16/632,810

(22) PCT Filed: Jul. 21, 2017

(86) PCT No.: PCT/TR2017/050331
§ 371 (c)(1),
(2) Date: Jan. 21, 2020

(87) PCT Pub. No.: WO2019/017855
PCT Pub. Date: Jan. 24, 2019

(65) Prior Publication Data
US 2020/0327557 A1    Oct. 15, 2020

(51) Int. Cl.
*G06V 20/52* (2022.01)
*G06V 10/44* (2022.01)
(Continued)

(52) U.S. Cl.
CPC .............. *G06Q 30/018* (2013.01); *G06N 3/08* (2013.01); *G06Q 10/087* (2013.01); *G06V 10/44* (2022.01);
(Continued)

(58) Field of Classification Search
None
See application file for complete search history.

(56) References Cited

U.S. PATENT DOCUMENTS 6,662,338 B1    12/2003  Rezzi et al.
8,630,924 B2     1/2014  Groenevelt et al.
(Continued)

FOREIGN PATENT DOCUMENTS

EP    2375365 A1    10/2011

OTHER PUBLICATIONS

Dalal et al., "Histograms of Oriented Gradients for Human Detection", International Conference on Computer Vision & Pattern Recognition, Jun. 2005, pp. 1-8.
(Continued)

*Primary Examiner* — Paul Danneman
(74) *Attorney, Agent, or Firm* — Volpe Koenig

(57) ABSTRACT

In an embodiment, an electronic processing system includes an image-processing circuit, a product-arrangement circuit, and a score circuit. The image-processing circuit is configured to receive an image of products disposed in a display structure having sections, to identify the sections, and to identify at least one respective product within each identified section. The product-arrangement circuit is configured to determine an arrangement of the identified products within
(Continued)

the identified sections of the display structure, and to compare the determined arrangement to a product-arrangement template. And the score circuit is configured to generate a product-arrangement score in response to the comparing of the determined arrangement to the product-arrangement template.

23 Claims, 78 Drawing Sheets

(51) Int. Cl.
  *G06Q 10/08*  (2012.01)
  *G06Q 30/00*  (2012.01)
  *G06N 3/08*  (2006.01)
  *G06V 10/50*  (2022.01)
  *G06N 3/04*  (2006.01)
  *G06Q 10/10*  (2012.01)
  *G06Q 30/02*  (2012.01)
  *G06V 20/68*  (2022.01)

(52) U.S. Cl.
  CPC .............. *G06V 10/50* (2022.01); *G06V 20/52* (2022.01); *G06N 3/04* (2013.01); *G06Q 10/10* (2013.01); *G06Q 30/0282* (2013.01); *G06V 20/68* (2022.01)

(56) References Cited

U.S. PATENT DOCUMENTS

2016/0171336 A1* 6/2016 Schwartz ............... G06V 10/40
                        382/173
2016/0371634 A1 12/2016 Kumar et al.

OTHER PUBLICATIONS

International Searching Authority, "International Search Report and Written Opinion from PCT Application No. PCT/TR2017/050331", dated May 22, 2018, pp. 1-9, Published: WO.
Krizhevsky et al., "ImageNet Classification with Deep Convolutional Neural Networks", Advances in neural information processing systems, Jan. 2012, pp. 1-9.
Navarro, "A Guided Tour to Approximate String Matching", ACM Computing Surveys, Mar. 2001, pp. 31-88, vol. 33, No. 1, ACM.
Stanford University, "CS231n: Convolutional Neural Networks for Visual Recognition", 2017, pp. 1-6.
Wikipedia, "Statistical classification", page last edited Oct. 15, 2019, pp. 1-6, Wikipedia.
Yoruk et al., "An Efficient Hough Transform for Multi-Instance Object Recognition and Pose Estimation", 23rd International Conference on Pattern Recognition, Apr. 22, 2016, pp. 1-6,.
International Bureau, "International Preliminary Report on Patentability from PCT Application No. PCT/TR2017/050331", from Foreign Counterpart to U.S. Appl. No. 16/632,810, dated Jan. 30, 2020, pp. 1-7, Published: WO.

* cited by examiner

300

ELECTRONIC DETECTION OF PRODUCTS AND ARRANGEMENT OF PRODUCTS IN A DISPLAY STRUCTURE, ELECTRONIC DETECTION OF OBJECTS AND ARRANGEMENT OF OBJECTS ON AND AROUND THE DISPLAY STRUCTURE, ELECTRONIC DETECTION OF CONDITIONS OF AND AROUND THE DISPLAY STRUCTURE, AND ELECTRONIC SCORING OF THE DETECTED PRODUCT AND OBJECT ARRANGEMENTS AND OF THE DETECTED CONDITIONS

This application claims priority to International Patent Application No. PCT/TR2017/050331 filed on Jul. 21, 2017.

SUMMARY

Marketing research has shown that the types and arrangement of products in a display structure affect the sales of the displayed products individually and as a group.

Referring to FIG. 1, consider a set 10 of stacked supermarket shelves 12, which define display-structure sections 14 that hold packaged (e.g., in a carton or bottle) beverages 16 such as juices, sodas, non-dairy milk substitutes, and teas. Although not shown in FIG. 1, each beverage location can be more than one beverage deep; that is, there can be a respective horizontal "stack" of beverages 16 behind each of the displayed (front-most) beverages. The beverages 16 (e.g., teas, healthy juices, non-dairy milk substitutes) targeted for health-conscious adults may sell better if disposed on higher ones of the shelves 12, and the beverages targeted for children (e.g., soda and other sugary drinks) may sell better if disposed on lower ones of the shelves, because the higher shelves are at adult eye level and the lower shelves are at child eye level. Furthermore, the arrangement of the beverages 16 (e.g., by types, brands, sizes, prices) on each shelf 12 can affect sales of the beverages on that shelf. For example, the location of a store-brand beverage 16 relative to the location of a national-brand beverage on a shelf 12 can affect the volume of sales of both the store-brand and the national-brand beverages on that shelf. That is, a particular arrangement of the store-brand and the national-brand beverages on a same shelf 12 can maximize the volumes of sales for both brands on that shelf. Moreover, the arrangement of the beverages 16 (e.g., by types, brands, sizes, prices) on a group of shelves 12 can affect the sales of the beverages on those shelves. For example, whether one size of a beverage 16 is above or below another size of the same or a different beverage can affect the volume of sales of both beverages.

Similarly, referring to FIG. 2, consider a freezer cabinet 17 of bins 18, which are display-structure sections that each hold a respective stack of packaged frozen desserts 20 such as ice-cream treats. The arrangement of the desserts 20 (e.g., by types, brands, sizes, prices) within the bins 18 can affect sales of the desserts. For example, whether desserts 20 of a same brand are located in contiguous bins, or are spaced apart by being located in non-contiguous bins, can affect the volume of sales of that brand of dessert, and of one or more other brands of dessert, in the cabinet 17. That is, a particular arrangement of the brands of desserts 20 within the bins 18 can maximize the volumes of sales for all brands in the cabinet 17.

Marketing research also has shown that the relative location of a display structure within a venue, the types and arrangement of non-product objects in, or, or around the display structure, and the conditions of the display structure, the products, the objects, and the conditions in and around the display structure, can affect the sales of the displayed products individually and as a group.

Referring to FIG. 3, consider the freezer cabinet 17 at a small, open-air market 22, and objects around the freezer cabinet, such objects including signs 24, balloons 26, a waste basket 28, a tree 30, an umbrella 32, and price placards (not shown in FIG. 3). The location of the freezer cabinet 17 (here, just outside of the market 22), and the locations, sizes, types, and conditions of the objects relative to the freezer cabinet, can affect sales of the frozen desserts (not shown in FIG. 3) in the cabinet 17. For example, an object (e.g., the tree 30, the umbrella 32) that blocks, or otherwise hinders, a consumer's view of the cabinet 17 can reduce sales of the frozen desserts within the cabinet. Or a sign that is old/worn can reduce sales of the frozen desserts within the cabinet 17.

And marketing research has shown that the conditions of a display structure, around (e.g., in the vicinity of) the display structure, and of the products disposed in the display structure, can affect the sales of the products.

Referring again to FIGS. 1-3, the conditions (e.g., new, old, paint worn) of the set 10 of shelves 12 and of the freezer cabinet 17, and the cleanliness of and around the shelves and cabinet, can affect sales of the products on the shelves and within the cabinet. Furthermore, the level of frost on the viewing glass of the freezer cabinet 17 (or on the viewing glass of freezer shelves) can affect sales of the products in the cabinet (or on the freezer shelves). Moreover, the conditions of the products (e.g., dented, faded or torn label) also can affect sales of the products.

Understanding the above-described market research, companies (e.g., Pepsi®, Coca-Cola®, Minute Maid®, Magnum®, and Corretto®) that produce and market products typically have developed strict guidelines regarding product placement within a display structure, the objects (e.g., price placards) located on and around the display structure, and the conditions of the products and of (e.g., level of frost on viewing glass) and around (e.g., cleanliness) the display structure.

To ensure that product vendors (e.g., markets, supermarkets, grocery stores, department stores) implement and follow all of its guidelines, a product company typically employs one or more field agents that travel around to product-vendor venues in respective geographic areas, and that periodically make "surprise" inspections of vendors' display structures that hold the company's products.

During a visit (typically unannounced) to a product vendor's venue, a field agent typically inspects the display structures in which the product company's products are disposed. During the inspection, the field agent typically notes factors, such as those described above in conjunction with FIGS. 1-3, that can affect sales of the product company's products, and generates a rating that indicates how closely the venue is complying with the product company's guidelines.

Based on the rating, the field agent, or a marketing agent back at the product company's headquarters, can provide valuable and constructive feedback to the manager of the venue, and, more generally, to the product vendor.

Furthermore, the product company can base incentives (e.g., lower prices to the vendor for the company's products) or penalties (e.g., ceasing to use the vendor to sell the company's products) to the vendor on the field agent's rating.

Unfortunately, there are problems associated with using field agents to rate product vendors' compliance with the product company's product-display guidelines.

Because a field agent typically is responsible for visiting and rating product-vendor venues in a relatively large geographical area (e.g., all of California north of San Francisco), or territory, the expenses (e.g., transportation, lodging, meals) that the field agent incurs can be significant.

Furthermore, because of the large number (e.g., 100-200) of product-vendor venues in a field agent's territory, the field agent may be able to visit and rate each venue in his/her territory only up to a few (e.g., 1-4) times per year.

A possible technique for increasing the frequency at which a product company can rate each product-vendor venue that carries the company's products is as follows. First, a person (e.g., an employee of the vendor) at a particular venue uses a device (e.g., a smart phone) to capture one or more images of each display structure and the products in the structures. Next, the person uploads the one or more images to a server. Then, an agent of the product company analyzes the one or more images, and rates the product vendors' compliance with the product company's product-display guidelines based on the image analysis.

Although the latter-described technique can reduce or eliminate the travel and other expenses incurred by field agents, this technique still requires the use of agents and the payment of their wages. Furthermore, while viewing a number of images each day, an agent may become fatigued, may make fatigue-induced errors in the analysis of the images, and, therefore, may make fatigue-induced errors in his/her ratings of product-vendor venues.

Therefore, a need has arisen for technical solution that allows a product company to rate product-vendor venues for compliance with the company's guidelines more frequently than field agents can rate product-vendor venues, and without the expense and error-rate of field agents.

In an embodiment, such a need is fulfilled by an electronic processing system that includes an image-processing circuit, a product-arrangement circuit, and an arrangement-score circuit. The image-processing circuit is configured to receive an image of products disposed in a display structure having sections, to identify the sections, and to identify at least one respective product within each identified section. The product-arrangement circuit is configured to determine an arrangement of the identified products within the identified sections of the display structure, and to compare the determined arrangement to a product-arrangement template. And the arrangement-score circuit is configured to generate a product-arrangement score in response to the comparing of the determined arrangement to the product-arrangement template.

In another embodiment, such a need is further fulfilled by the electronic system including the image-processing circuit, an object-arrangement circuit, and the arrangement-score circuit. The image-processing circuit is further configured to receive an image of the display structure and at least one object outside of the display structure, and to identify the at least one object. The object-arrangement circuit is configured to determine an arrangement of the identified at least one object relative to the display structure, and to compare the determined arrangement of at least one object to an object-arrangement template. And the arrangement-score circuit is further configured to generate an object-arrangement score in response to the comparing of the determined arrangement of at least one object to the object-arrangement template.

As described below, an embodiment of such an electronic system incorporates improvements over currently available technology. For example, the image-processing circuit can be configured to implement newly developed image-processing techniques that allow the image-processing circuit to detect display-structure-section and product boundaries, to identify product locations, and to identify products within the identified product locations. Furthermore, the product-arrangement circuit can be configured to implement newly developed image-processing and image-analysis techniques that allow the product-arrangement circuit to determine an arrangement of the identified products, to compare the determined arrangement to a product-arrangement template, and to detect and identify an error in the determined product arrangement. Similarly, the object-arrangement circuit can be configured to implement newly developed image-processing and image-analysis techniques that allow the object-arrangement circuit to determine an arrangement of the identified objects, to compare the determined arrangement to an object-arrangement template, and to detect and identify an error in the determined object arrangement. And a condition circuit can be configured to implement newly developed image-processing and image-analysis techniques that allow the condition circuit to determine conditions of the identified products and objects, of the display structure, and around the display structure, to compare each determined condition to a respective condition template, and to detect and identify an error in the determined conditions.

DRAWINGS

DETAILED DESCRIPTION

Each non-zero value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle $-18°≤α≤+18°$ between the two planes (|90°| is the maximum angular difference between the two planes, ±20% of |90°| is ±18°, and the two planes are parallel to one another when $α=0°$). For a zero-value, the encompassed range is ±1 of the same units unless otherwise stated. And for a range of values, the encompassed range is the stated range ±20% of the difference between the high and low ends of the stated range. For example, if the stated range is 10-30, then the encompassed range is 10 minus 20% of 20 to 30 plus 20% of 20, and is, therefore, 6-34.

Figure 1:
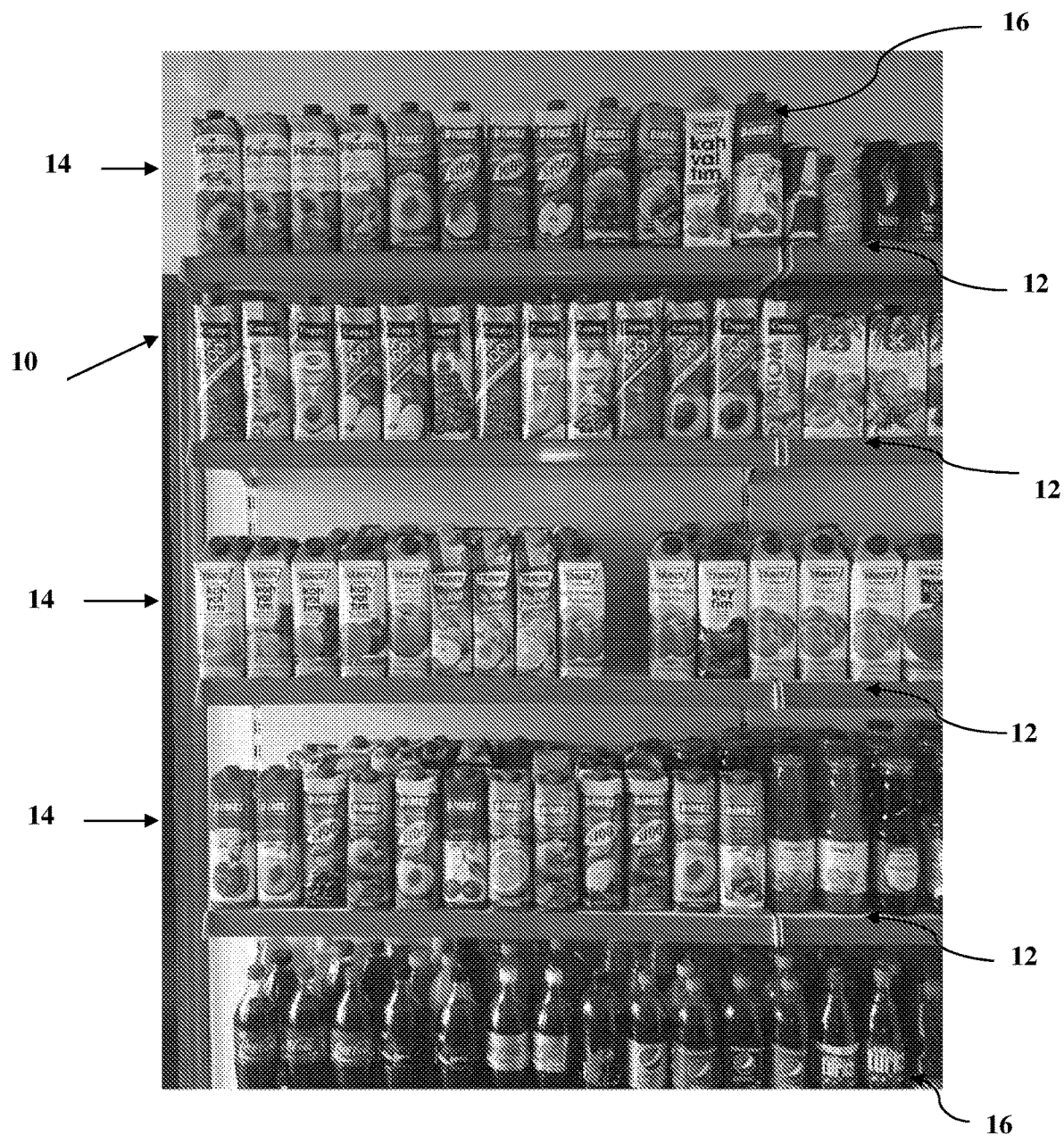
FIG. 1 is a front view of a display structure, which is in the form of a set of shelves that hold and display products for sale.
Figure 2:
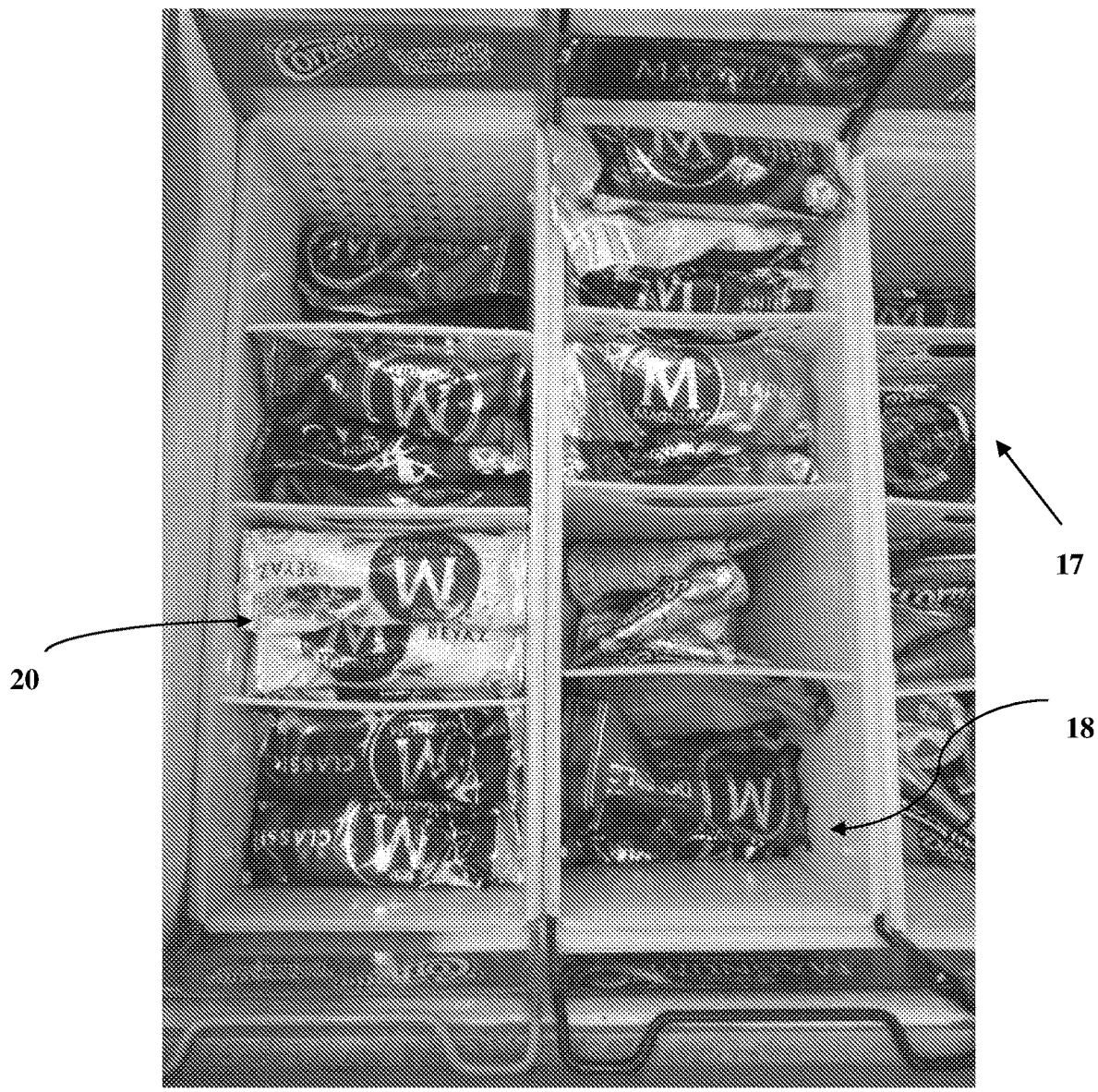
FIG. 2 is a top view of another display structure, which is in the form of a top-open freezer cabinet having a set of bins that hold and display products for sale.
Figure 3:
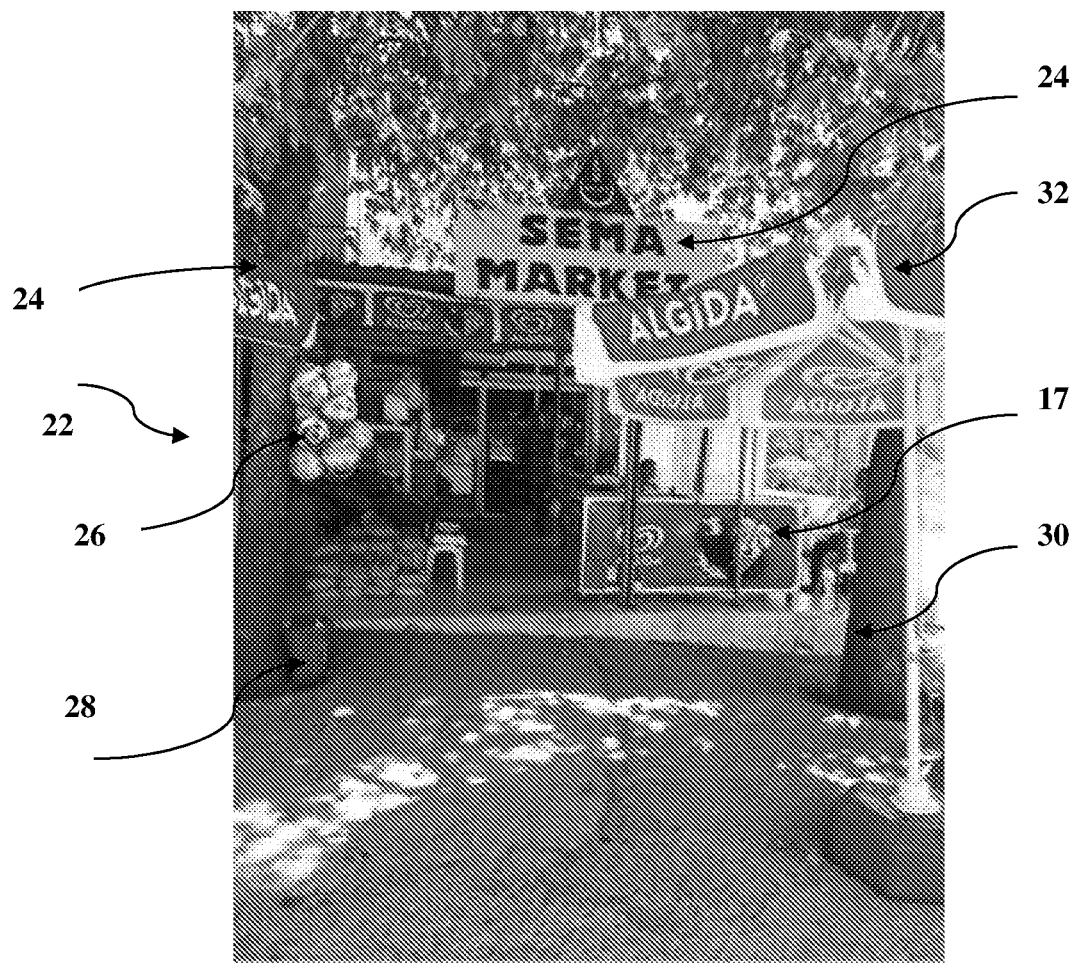
FIG. 3 is a perspective view of a market in which the top-open freezer cabinet of FIG. 2 is located, the view including objects around the cabinet and conditions of and around the cabinet.
Figure 4:
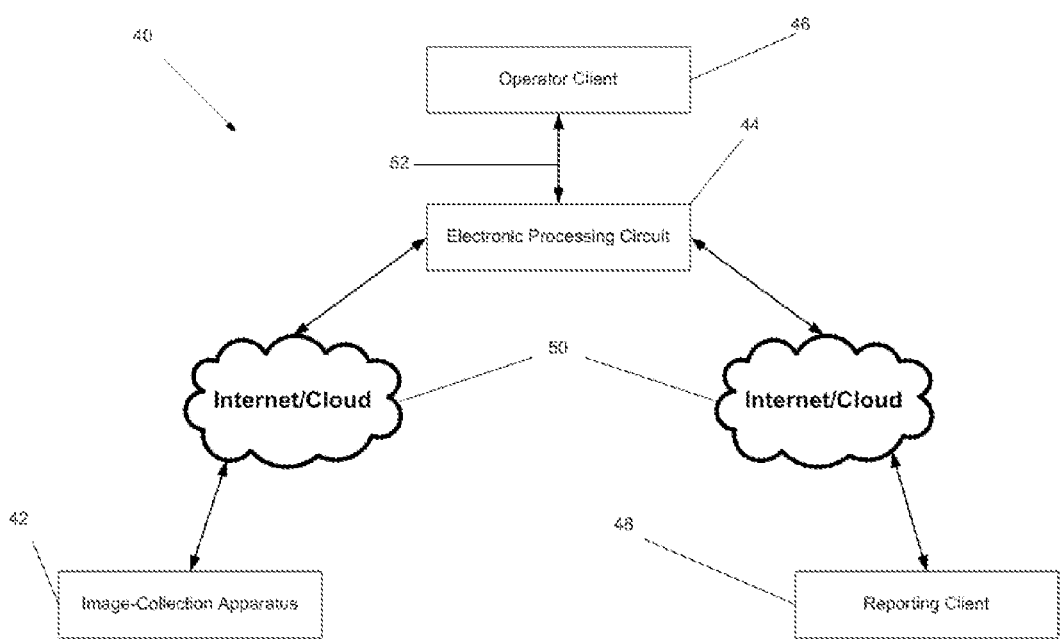
FIG. 4 is a diagram of an electronic system for detecting and rating product placement in a display structure, detecting and rating object placement on and around the display structure, and detecting and rating conditions of the products, of the objects, and of and around the display structure, according to an embodiment.

FIG. 4 is a diagram of an electronic system 40, which is configured to determine an arrangement of the identified products within a display structure (not shown in FIG. 4), and to rate the determined product arrangement for compliance with a product company's product-display guidelines, according to an embodiment. The electronic rating system 40 also can be configured to determine an arrangement of objects on, and around, the display structure, to determine conditions of, and around, the display structure, of the products, and of the objects, and to rate the determined object arrangement and conditions for compliance with the product company's product-display guidelines.

The electronic system 40 includes an image-collection apparatus 42, an electronic processing circuit 44, an operator client 46, and a reporting client 48.

The image-collection apparatus 42 is located at a product vendor's venue, and includes one or more image-capture devices (not shown in FIG. 4) configured to acquire images of one or more product-display structures (e.g., sets of refrigerator, freezer, and open-air shelves, refrigerator and freezer bins), and to upload the acquired images to the electronic processing circuit 44 via the internet/cloud 50. Examples of such image-capture devices include hand-held devices such as a smart phone, computer pad, computer tablet, a digital camera, anda video recorder operated by an employee of the product vendor, and a fixed-mounted camera or video recorder. Where the image-collection apparatus 42 includes a hand-held device, the product company may provide, to the vendor venue, a schedule for an employee of the vendor to capture and to upload images of one or more product-display structures to the electronic processing circuit 44. Where the image-collection apparatus 42 includes a fixed-mounted image-capture device, the image-capture device can be configured (e.g., programmed) to capture and to upload images of one or more product-display structures to the electronic processing circuit 44 automatically and periodically.

Figures 5, 6:
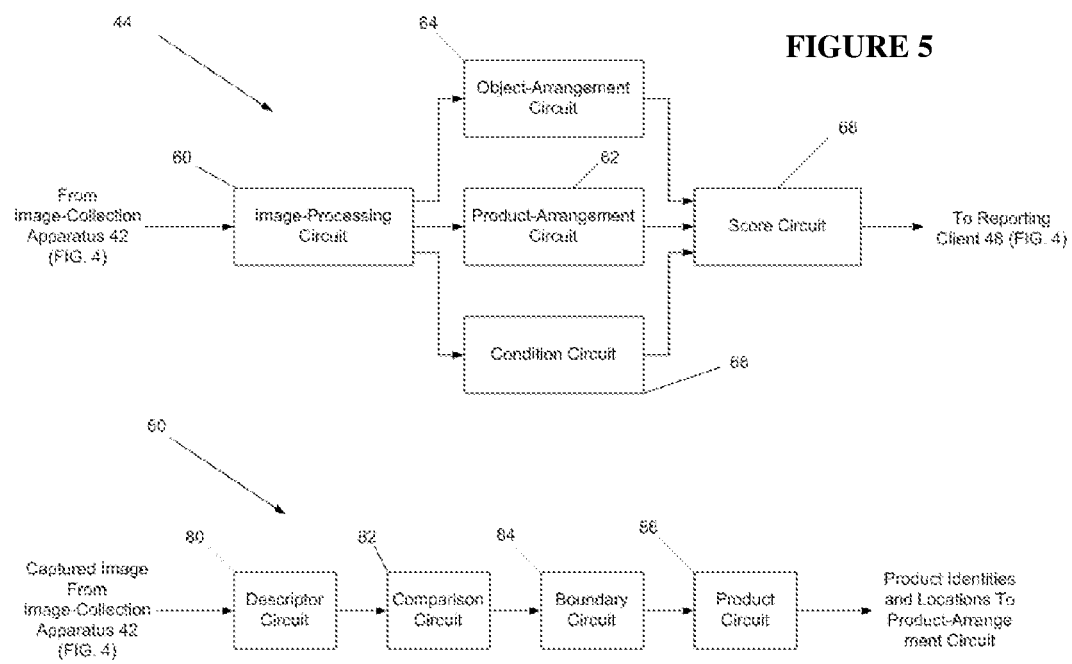
FIG. 5 is a diagram of the electronic processing circuit of the electronic system of FIG. 4, according to an embodiment.
FIG. 6 is a diagram of the image-processing circuit of FIG. 5, according to an embodiment.

The electronic processing circuit 44, which is further described below in conjunction with FIGS. 5-6, is configured to receive images that the image-collection apparatus 42 uploads, to analyze these images, and to rate the arrangement of imaged products in a display structure. The electronic processing circuit 44 also can be configured to rate an arrangement of non-product objects on and around the display structure, and to rate conditions of the imaged products and product-display structure, conditions of the objects, and conditions of, and around, the products, display structure, and objects, assuming that such objects and conditions are captured in the uploaded images. The electronic processing circuit 44 can be, or can include, a programmable computing circuitry such as a microprocessor or microcontroller, circuitry (e.g., a field-programmable gate array (FPGA)) configurable with firmware or another stream of data, application-specific (hardwired) circuitry, or a combination or subcombination of any these types of circuitry.

The operator client 46 can be, or can include, a personal computer (PC), such as a desktop, laptop, pad, or tablet, and can be configured to allow a human operator to interact with the electronic processing circuit 44 via a conventional communication channel (e.g., wired, optical, or wireless) 52. For example, as further described below in conjunction with FIG. 23, the operator client 46 can be configured to allow a human operator to generate a test image that allows an algorithm implemented by the electronic processing circuit 44 to "learn" image parameters that distinguish a boundary region of an image from a non-boundary region of the image. The operator client 46 also can be configured to allow a human operator to configure the electronic processing circuit 44, and to configure an algorithm implemented by the electronic processing circuit, for a particular product company, product type, product, product-display structure, non-product object, and condition.

The reporting client 48 can be, or can include, a personal computer (PC), such as a desktop, laptop, pad, or tablet, configured to display, and to otherwise report, to an agent of a product company a product-arrangement rating, an object-arrangement rating, a condition rating, and other product-display information that the electronic processing circuit 44 generates. The reporting client 48, which is coupled to the electronic processing circuit 44 via the internet/cloud 50, also can be configured to allow the agent to configure the electronic processing circuit 44, and to configure an algorithm implemented by the electronic processing circuit, for a particular product type, product, display structure, non-product object, or condition. Furthermore, the reporting client 48 can be configured to allow the agent to request related data, such as demographics showing and comparing product-arrangement ratings from different venues of the same vendor, and from different vendors, so that the agent can compare levels of compliance between different venues and vendors.

Still referring to FIG. 4, alternate embodiments of the electronic system 40 are contemplated. For example, the system 40 can include components not described, or can omit one or more of the described components. Furthermore, communications over the internet/cloud 50 between the image-collection assembly 42 and the electronic processing circuit 44, and between the electronic processing circuit and the reporting client 48, can be made secure via encryption or other means.

FIG. 5 is a diagram of the electronic processing circuit 44 of FIG. 4, according to an embodiment.

The electronic processing circuit 44 includes an image-processing circuit 60, a product-arrangement circuit 62, an object-arrangement circuit 64, a condition circuit 66, and a score circuit 68. Each of these circuits can be, or can include, respective programmable computing circuitry such as a microprocessor or microcontroller, respective circuitry (e.g., a field-programmable gate array (FPGA)) configurable with firmware or another stream of data, respective application-specific circuitry, or a respective combination or subcombination of any these types of circuitry. Or, one of these circuits can be combined with one or more others of these circuits into a single circuit (e.g., a single integrated-circuit (IC) die, a single IC package) that is configured to perform the functions attributed to the circuits that form the single circuit.

The image-processing circuit 60 is configured to identify product sections and product locations of a product-display structure (not shown in FIG. 5) by detecting boundaries that define the sections and the locations, and to identify the products within the locations. For example, the image-processing circuit 60 can be configured to perform these functions by implementing one or more image-processing algorithms, examples of which are described below in conjunction with FIGS. 7-21 and 24-61.

The product-arrangement circuit 62 is configured to determine an arrangement of the products identified by the image-processing circuit 60, and also can be configured to detect and identify one or more errors in the product arrangement. For example, the product-arrangement circuit 62 can be configured to perform these functions by implementing one or more planogram algorithms, examples of which are described below in conjunction with FIG. 22. Further to this example, the product-arrangement circuit 62 can be configured to detect an error in the determined product arrangement by comparing the determined product arrangement with a product-arrangement template constructed according to product-arrangement guidelines.

The object-arrangement circuit 64 is configured to determine an arrangement of objects identified by the image-processing circuit 60 as being disposed on or around a product-display structure, and also can be configured to detect and identify one or more errors in the determined object arrangement. For example, the object-arrangement circuit 64 can be configured to perform these functions by implementing one or more planogram algorithms, examples of which are described below in conjunction with FIG. 22. Further to this example, the object-arrangement circuit 64 can be configured to detect an error in the determined object arrangement by comparing the determined object arrangement with an object-arrangement template constructed according to object-arrangement guidelines.

The condition circuit 66 is configured to determine one or more conditions identified by the image-processing circuit 60 as being of a product, of an object, or of or around a product-display structure, and also can be configured to detect and identify one or more errors with the identified one or more conditions. For example, the condition circuit 66 can be configured to detect an error with a determined condition (e.g., a level of transparency of a view window for a set of freezer shelves) by comparing the determined condition with a condition template constructed according to condition guidelines.

And the score circuit 68 is configured to rate a product-display structure's compliance with a product provider's product-display guidelines, to generate one or more scores indicative of the rating, and to provide the one or more scores to the reporting client 48 of FIG. 4. For example, the score may range from 0 to 100, with a score of 100 indicating full/perfect compliance, and a score of 0 indicating a complete lack of compliance. The score circuit 68 is configured to generate the one or more scores in response to one or more of the determined product arrangement, the determined object arrangement, the determined conditions, the detected errors in the determined product arrangement, the detected errors in the determined object arrangement, and the detected errors in the determined conditions. If, as described above in conjunction with FIG. 4, the electronic processing circuit 44 is configured to provide additional information, such as charts of rating scores over a number of vendors and venues, to the reporting client 48, then a portion of the electronic processing circuit other than the score circuit 68 can be configured to generate such additional information.

Still referring to FIG. 5, alternate embodiments of the electronic processing circuit 44 are contemplated. For example, the electronic processing circuit 44 can include components not described, or can omit one or more of the described components. Furthermore, alternate embodiments described above in conjunction with the electronic system 40 of FIG. 4 may also be applicable to the electronic processing circuit 44.

FIG. 6 is a diagram of the image-processing circuit 60 of FIG. 5, according to an embodiment.

The image-processing circuit 60 includes a descriptor circuit 80, a comparison circuit 82, a boundary circuit 84, and a product circuit 86. Each of these circuits can be, or can include, respective programmable computing circuitry such as a microprocessor or microcontroller, respective circuitry (e.g., a field-programmable gate array (FPGA)) configurable with firmware or another stream of data, respective application-specific circuitry, or a respective combination or subcombination of any these types of circuitry. Or, one of these circuits can be combined with one or more others of these circuits into a single circuit (e.g., a single integrated-circuit (IC) die, a single IC package) that performs the functions attributed to the circuits that form the single circuit.

The descriptor circuit 80 is configured to segment an image from the image-collection apparatus 42 (FIG. 4) into a number of virtual windows, and to generate, for each window, a respective visual descriptor, which is a multidimensional code (e.g., one or more vectors, one or more multi-dimensional matrices) describing the visual content of the image "neighborhood" inside of the window. Operation of the descriptor circuit 80 is further described below in conjunction with FIGS. 7-8.

The comparison circuit 82 is configured to compare, effectively, each visual descriptor generated by the descriptor circuit 80 to a boundary-visual-descriptor template, and to determine, based on the comparison, the probability that the image window corresponding to the visual descriptor includes an edge (hereinafter boundary) of a section of a product-display structure or of a product within the product-display structure. For example, the comparison circuit 82 can be, or can include, a statistical classifier to perform the effective comparison of the visual descriptor to the boundary-visual-descriptor template. The comparison circuit 82 is further configured to generate, for each window, a boundary score that represents the probability that the image window includes a boundary, the boundary score being a scalar value. The higher a positive boundary score, the more likely the corresponding image window includes a section or product boundary. Operation of the comparison circuit 82 is further described below in conjunction with FIGS. 7-8.

The boundary circuit 84 is configured to generate, in response to the boundary scores from the comparison circuit 82, one or more boundary signals, and is configured to generate, in response to the boundary signals, one or more virtual boundaries of the image. Each boundary signal is a function of location within the image in the dimension of a respective window scan, and identifiesone or more boundaries that extend in a dimension orthogonal to the dimension of the respective window scan. Each point of a boundary signal is a boundary score of a respective window of the image. If the window scan is in the horizontal dimension, then the boundary signal is in the horizontal dimension, and the boundaries that the boundary signal identifies are in the vertical dimension. In contrast, if the window scan is in the vertical dimension, then the boundary signal is in the vertical dimension, and the boundaries that the boundary signal identifies are in the horizontal dimension. Furthermore, the boundary circuit 84 generates virtual boundaries at the locations that the boundary signals identify as being boundary locations. Operation of the boundary circuit 84 is further described below in conjunction with FIGS. 7-8.

And the product circuit 86 is configured to determine, in response to the boundaries generated by the boundary circuit 84, the locations of products within a product-display structure, and the identities (e.g., types, brands) of the products within the determined product locations. Operation of product circuit 86 is further described below in conjunction with FIGS. 7-8.

Still referring to FIG. 6, alternate embodiments of the image-processing circuit 60 are contemplated. For example, the image-processing circuit 60 can include components not described, or can omit one or more of the described components. Furthermore, alternate embodiments described above in conjunction with the system 40 of FIG. 4 and the electronic processing circuit 44 of FIG. 5 also may be applicable to the image-processing circuit 60.

Figure 7:
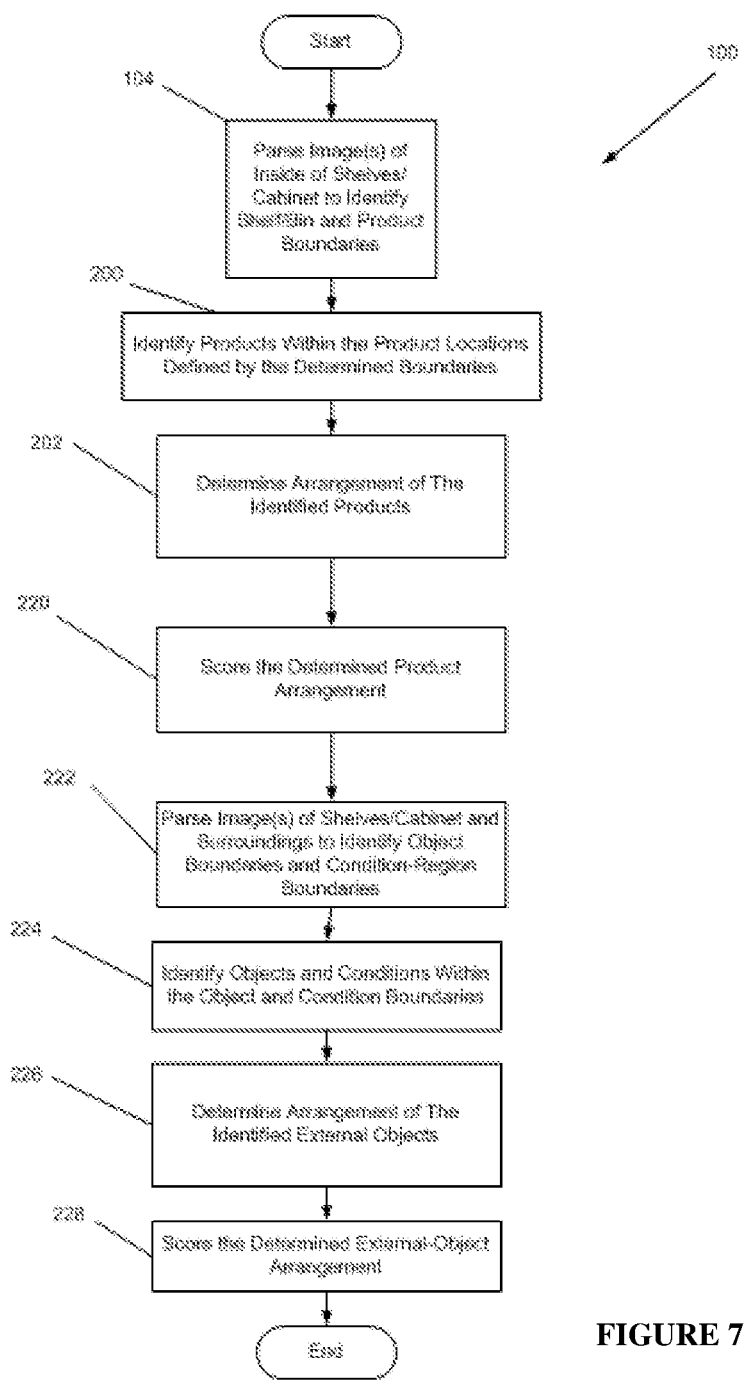
FIG. 7 is a flow diagram of a technique for rating placement of products within a display structure, for rating placement of objects on and around the display structure, and for rating conditions of the products, objects, and of and around the display structure, according to an embodiment.

FIG. 7 is a flow diagram 100 of an algorithm that the electronic processing circuit 44 of FIG. 5 implements to determine and to rate an arrangement of products in a product-display structure, to determine and to rate an arrangement of objects on and around the product-display structure, and to determine and to rate conditions of the products, of around the product-display structure, and of the objects, according to an embodiment.

Figure 8:
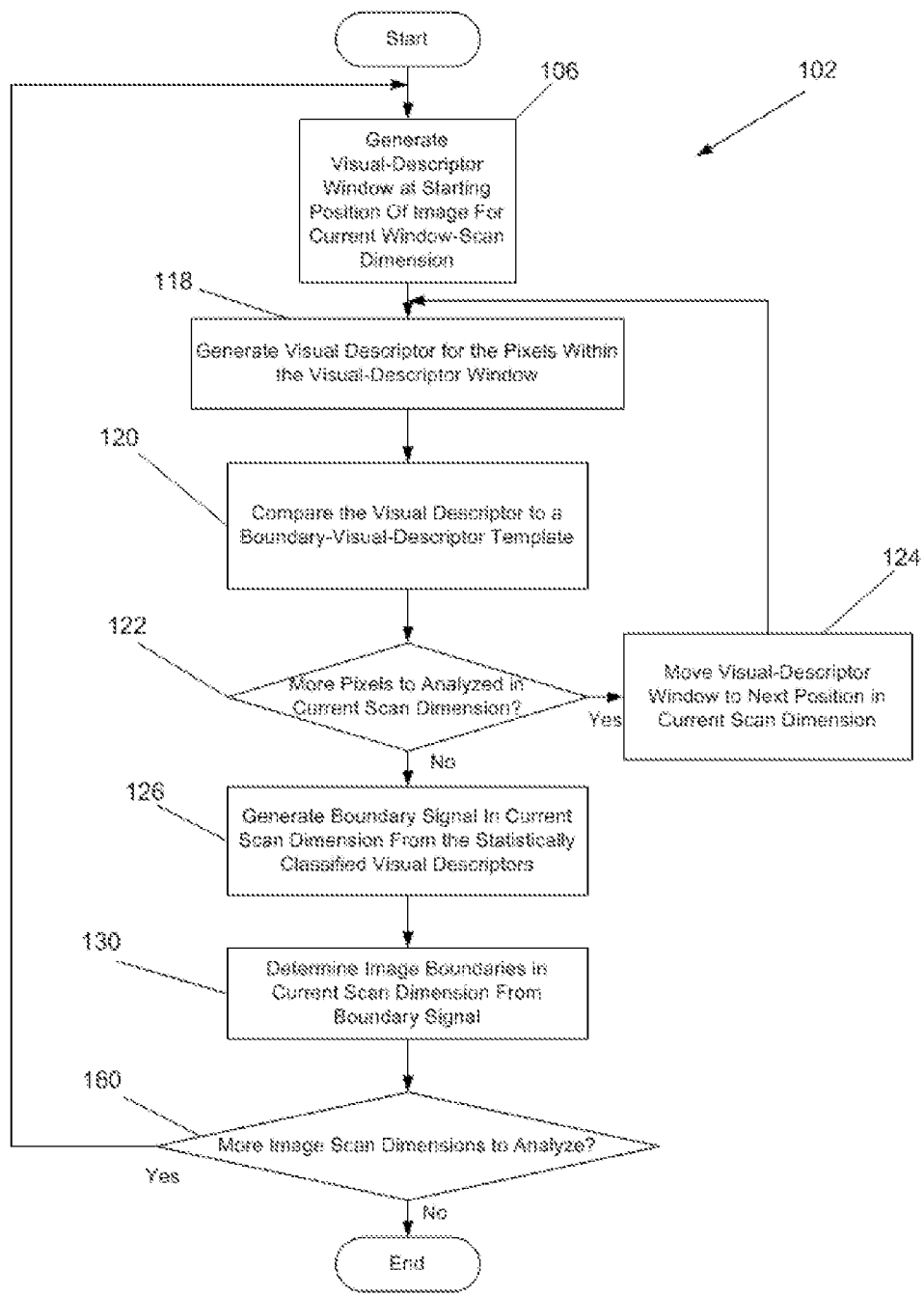
FIG. 8 is a flow diagram of the step of FIG. 7 for parsing an image of a display structure to determine the section and product boundaries within the display structure, according to an embodiment.

FIG. 8 is a flow diagram 102 of a step 104 of FIG. 7, according to an embodiment.

Figure 9:
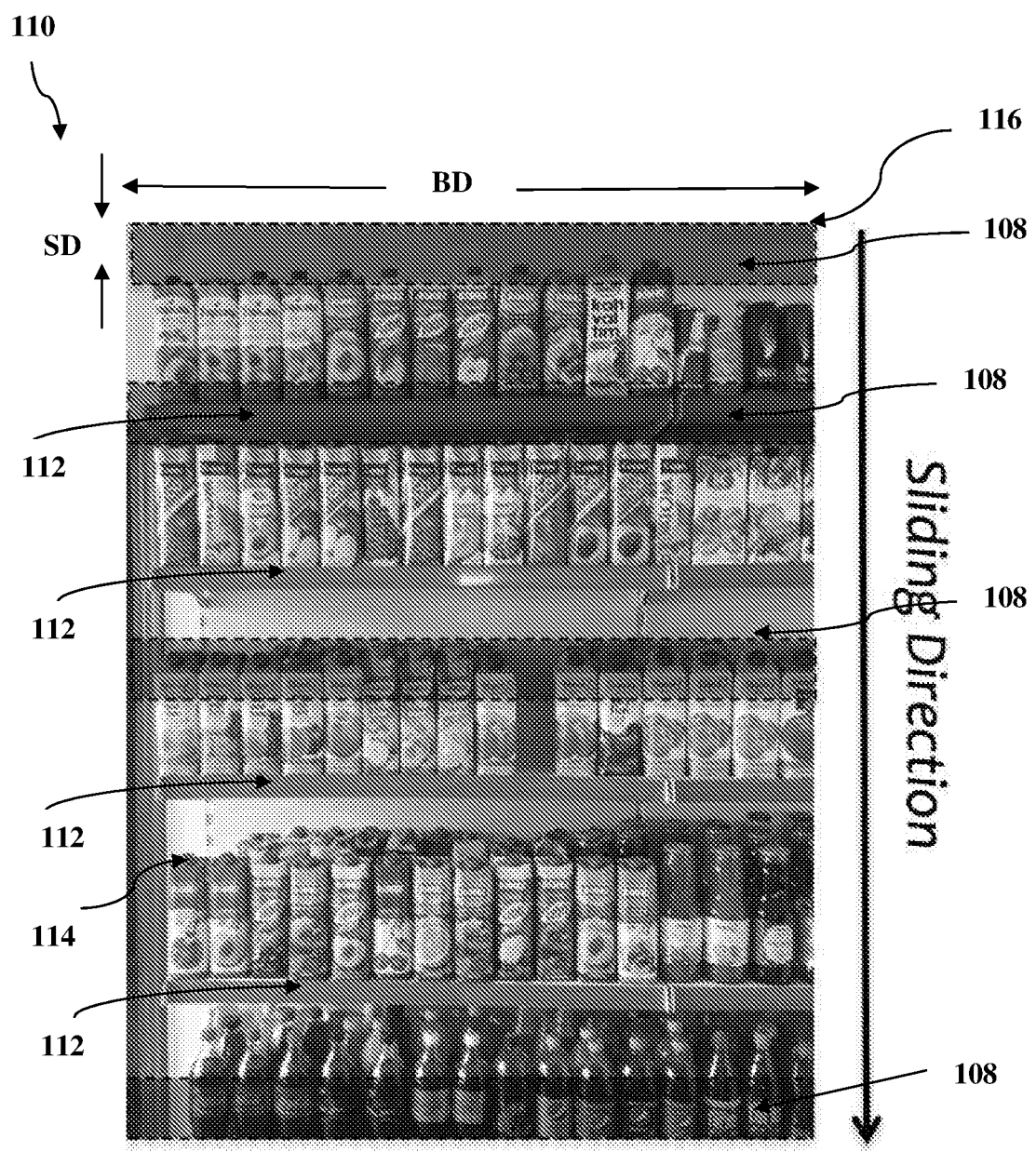
FIG. 9 is an image of a set of shelves overlaid with a virtual scan window during a boundary scan of the image in a vertical dimension, according to an embodiment.

FIG. 9 is an image 109 of a set 110 of shelves 112 overlaid with a virtual scan window 108 during a boundary scan of the image in a vertical dimension, according to an embodiment.

Figure 10:
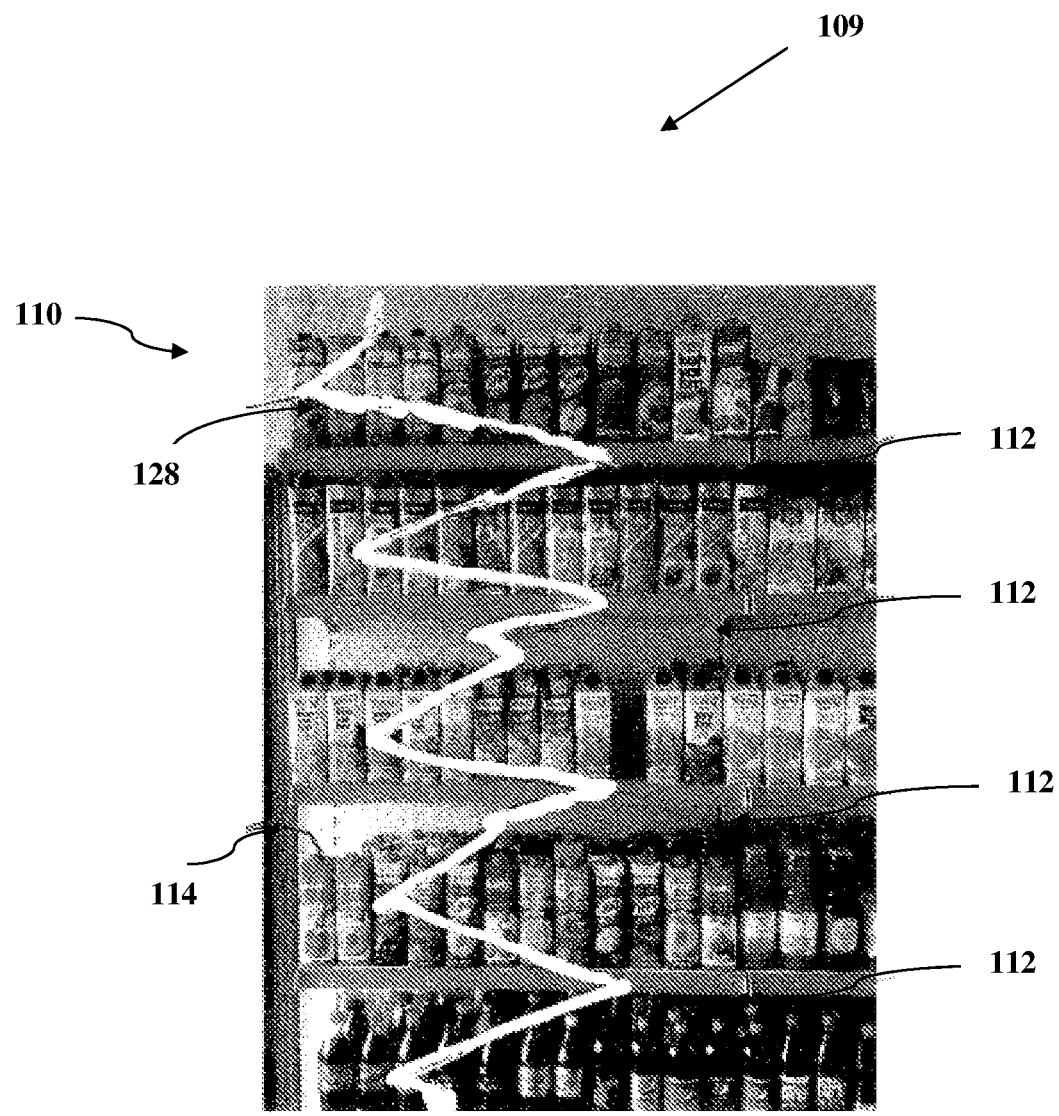
FIG. 10 is the image of FIG. 9 overlaid with a boundary-score signal in the vertical dimension, according to an embodiment.

FIG. 10 is the image 109 of FIG. 9 overlaid with a boundary-score signal 128 in the vertical dimension, according to an embodiment.

Figure 11:
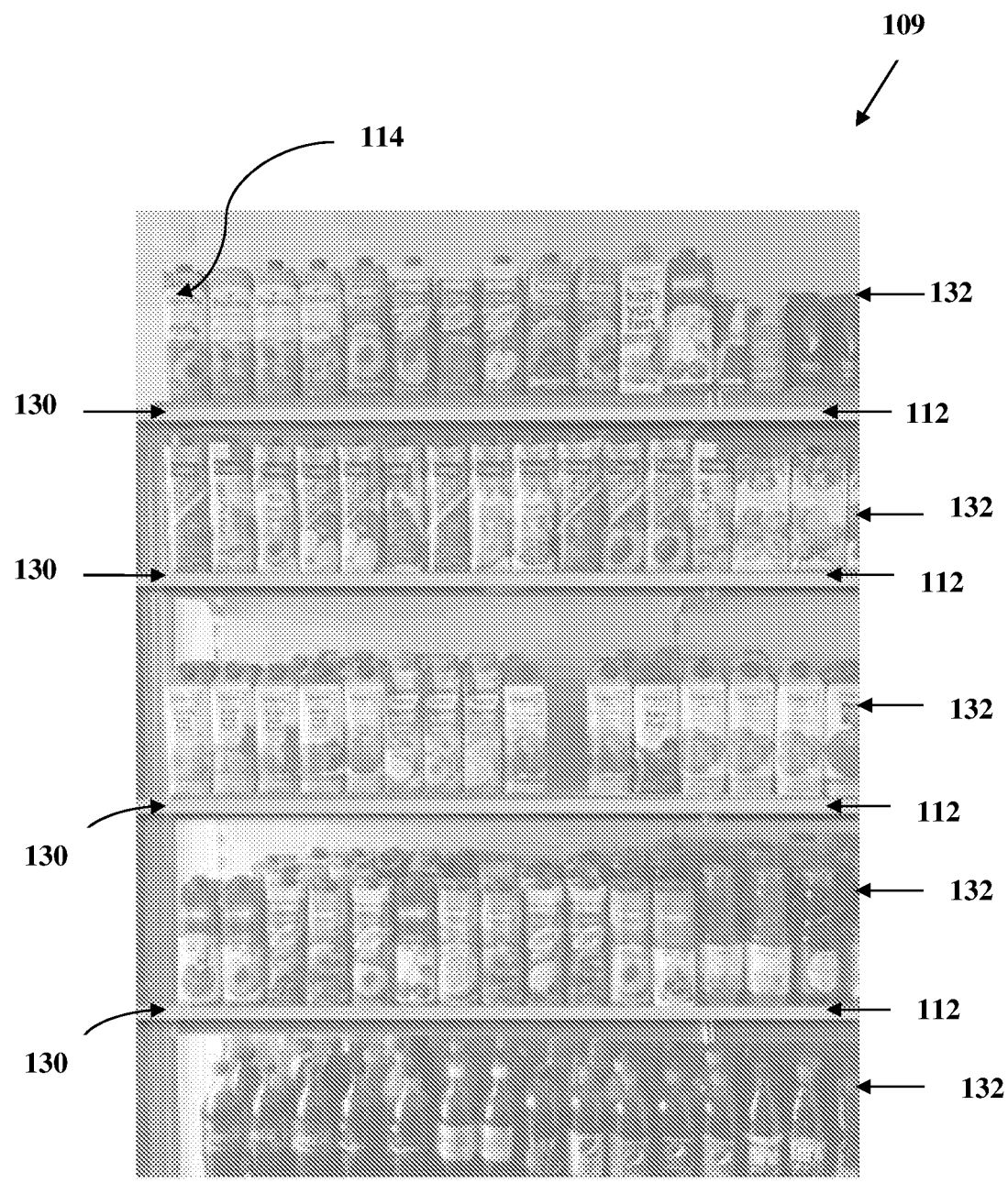
FIG. 11 is the image of FIGS. 9-10 overlaid with horizontal boundaries detected during the vertical boundary scan of the image, according to an embodiment.

FIG. 11 is the image 109 of FIGS. 9-10 overlaid with horizontal boundaries 130 detected during the vertical boundary scan of the image, according to an embodiment.

Figure 12:
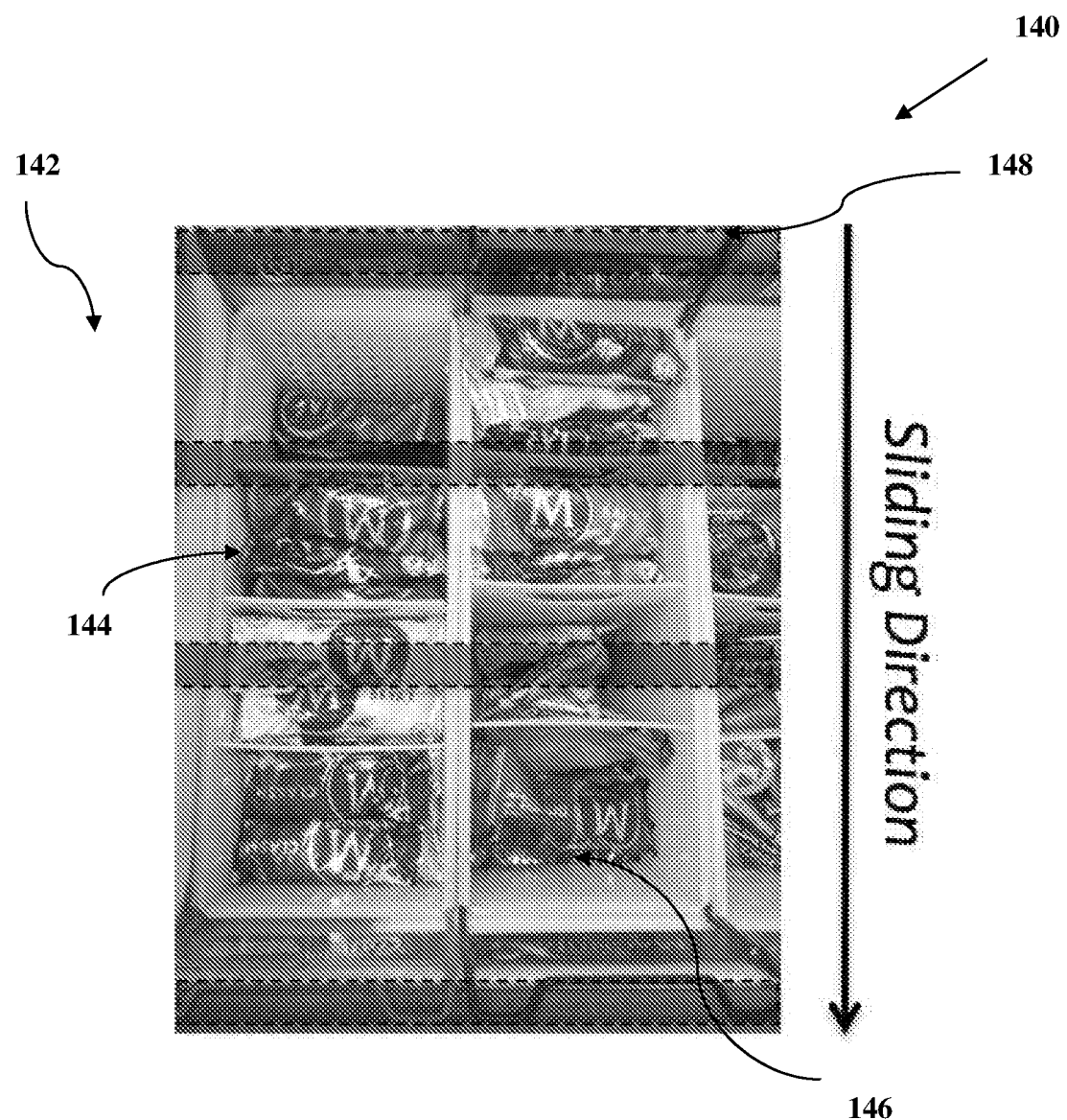
FIG. 12 is an image of a set of freezer-cabinet bins overlaid with a virtual scan window during a boundary scan of the image in a vertical dimension, according to an embodiment.

FIG. 12 is an image 140 of a freezer-cabinet 142 with bins 148 overlaid with a virtual scan window 146 during a boundary scan of the image in a vertical dimension, according to an embodiment.

Figure 13:
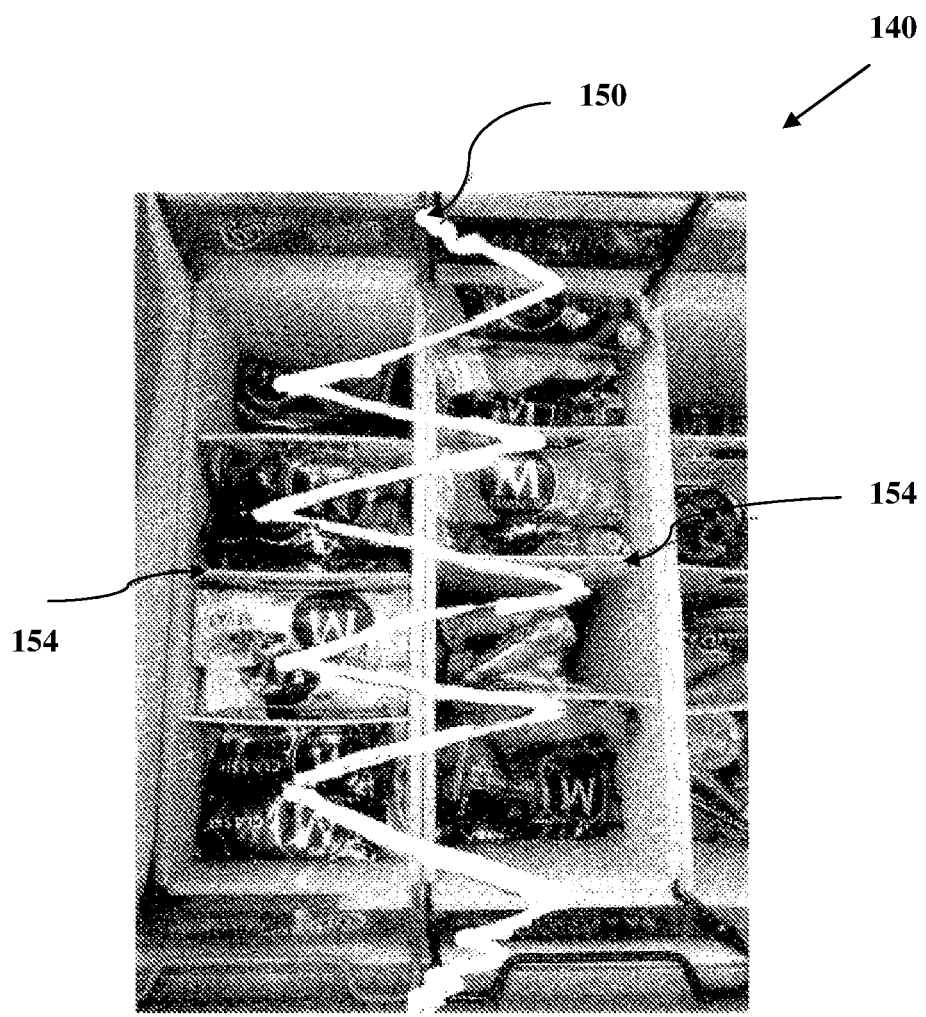
FIG. 13 is the image of FIG. 12 overlaid with a boundary-score signal in the vertical dimension, according to an embodiment.

FIG. 13 is the image 140 of FIG. 12 overlaid with a boundary-score signal 150 in the vertical dimension, according to an embodiment.

Figure 14:
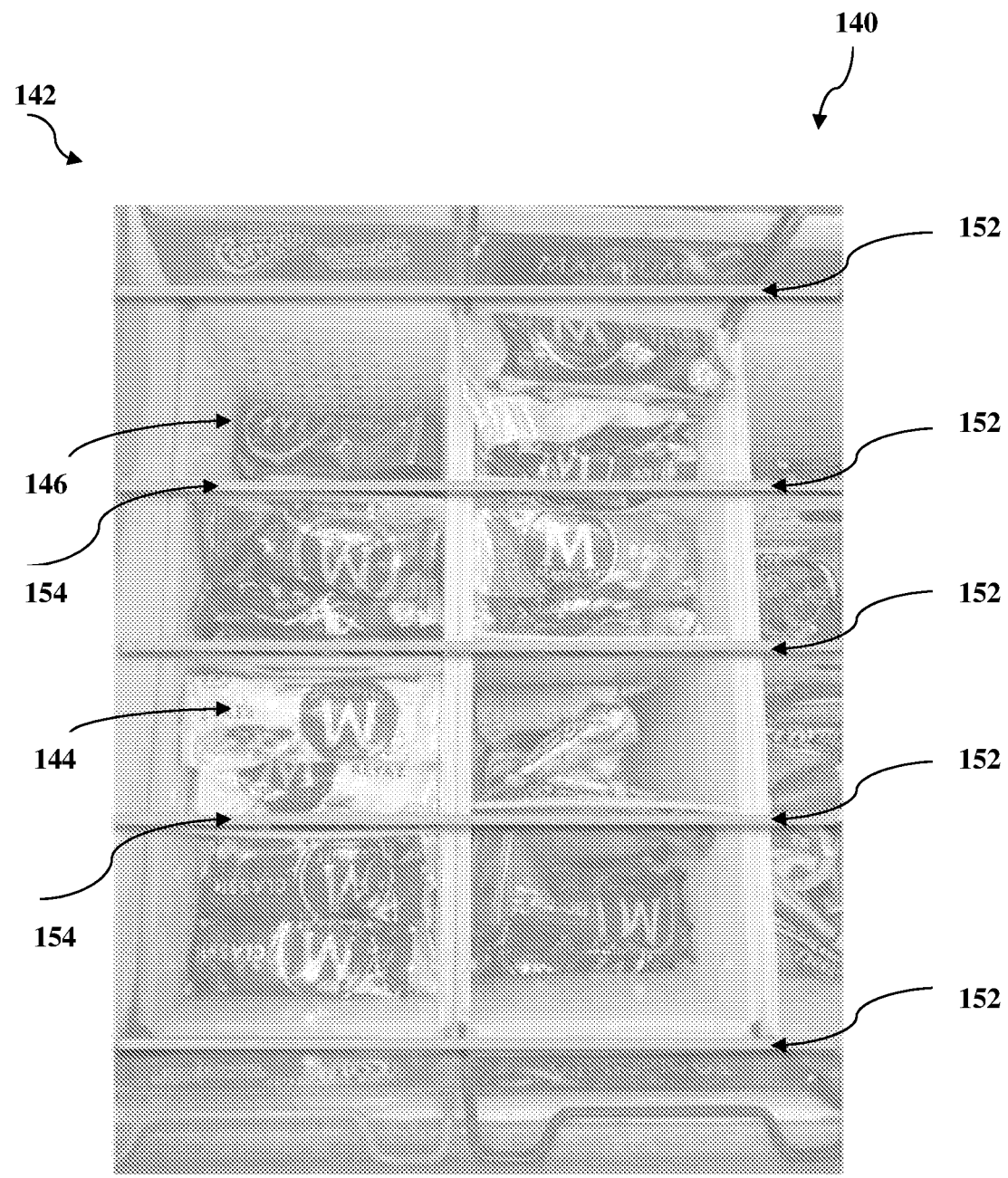
FIG. 14 is the image of FIGS. 12-13 overlaid with horizontal boundaries detected during the vertical boundary scan of the image, according to an embodiment.

FIG. 14 is the image 140 of FIGS. 12-13 overlaid with horizontal boundaries 152 detected during the vertical boundary scan of the image, according to an embodiment.

Figure 15:
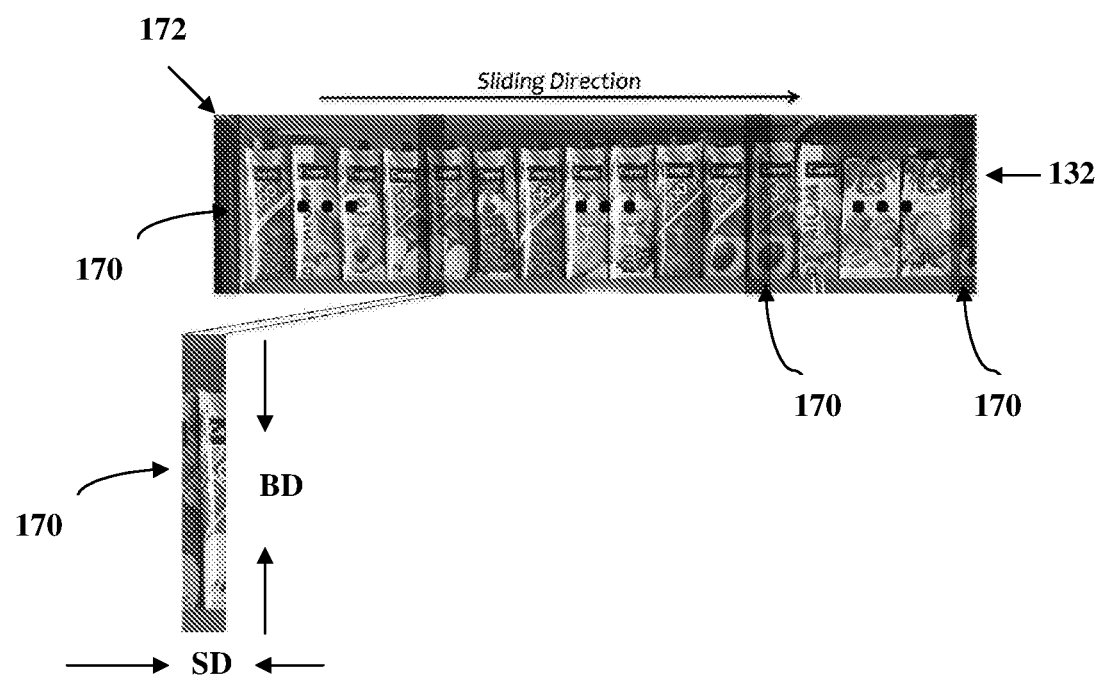
FIG. 15 is a portion of the image of FIGS. 9-11 overlaid with a virtual scan window during a boundary scan of the image in a horizontal dimension, according to an embodiment.

FIG. 15 is a portion of the image 109 of FIGS. 9-11 overlaid with a virtual scan window 170 during a boundary scan of a shelf section 132 of the image in a horizontal dimension, according to an embodiment.

Figure 16:
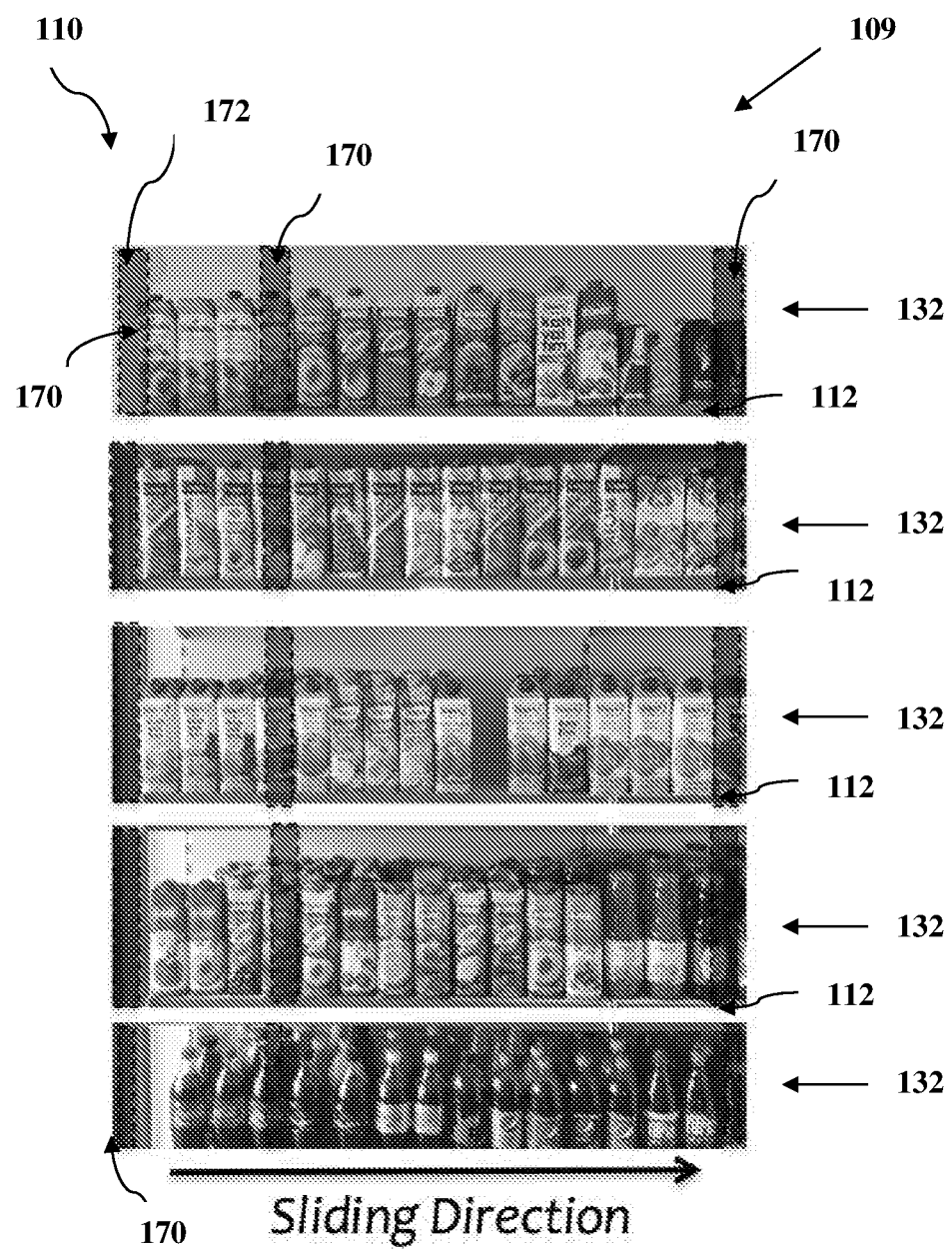
FIG. 16 is the image of FIGS. 9-11 overlaid with a virtual scan window during a boundary scan of all of the shelf sections of the image in the horizontal dimension, according to an embodiment.

FIG. 16 is the image 109 of FIGS. 9-11 overlaid with the virtual scan window 170 during a boundary scan of all of the shelf sections 132 of the image in the horizontal dimension, according to an embodiment.

Figure 17:
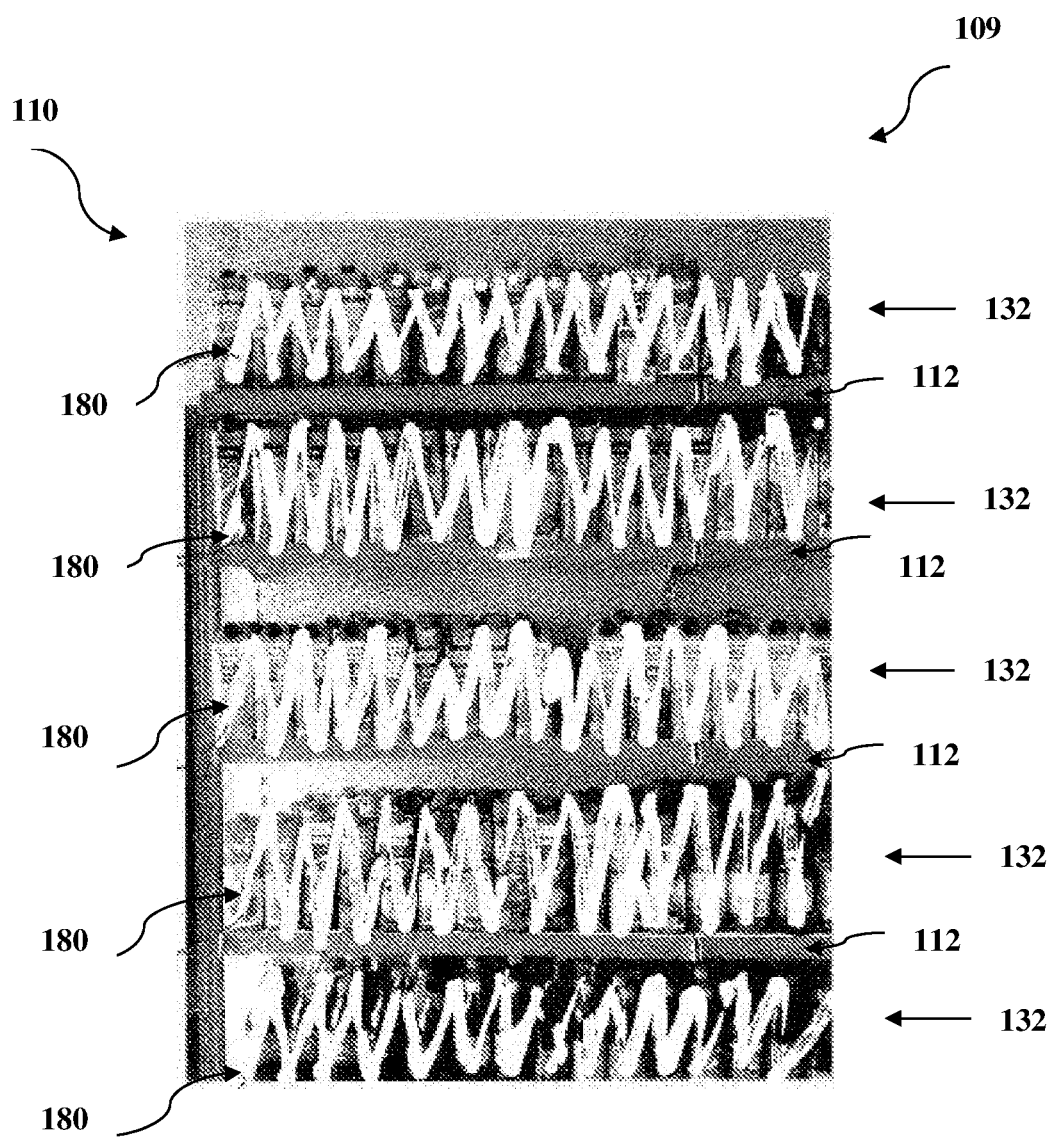
FIG. 17 is the image of FIGS. 9-11 and 16 overlaid with boundary-score signals (one per shelf section) in the horizontal dimension, according to an embodiment.

FIG. 17 is the image 109 of FIGS. 9-11 and 16 overlaid with boundary-score signals 180 (one per shelf section 132) in the horizontal dimension, according to an embodiment.

Figure 18:
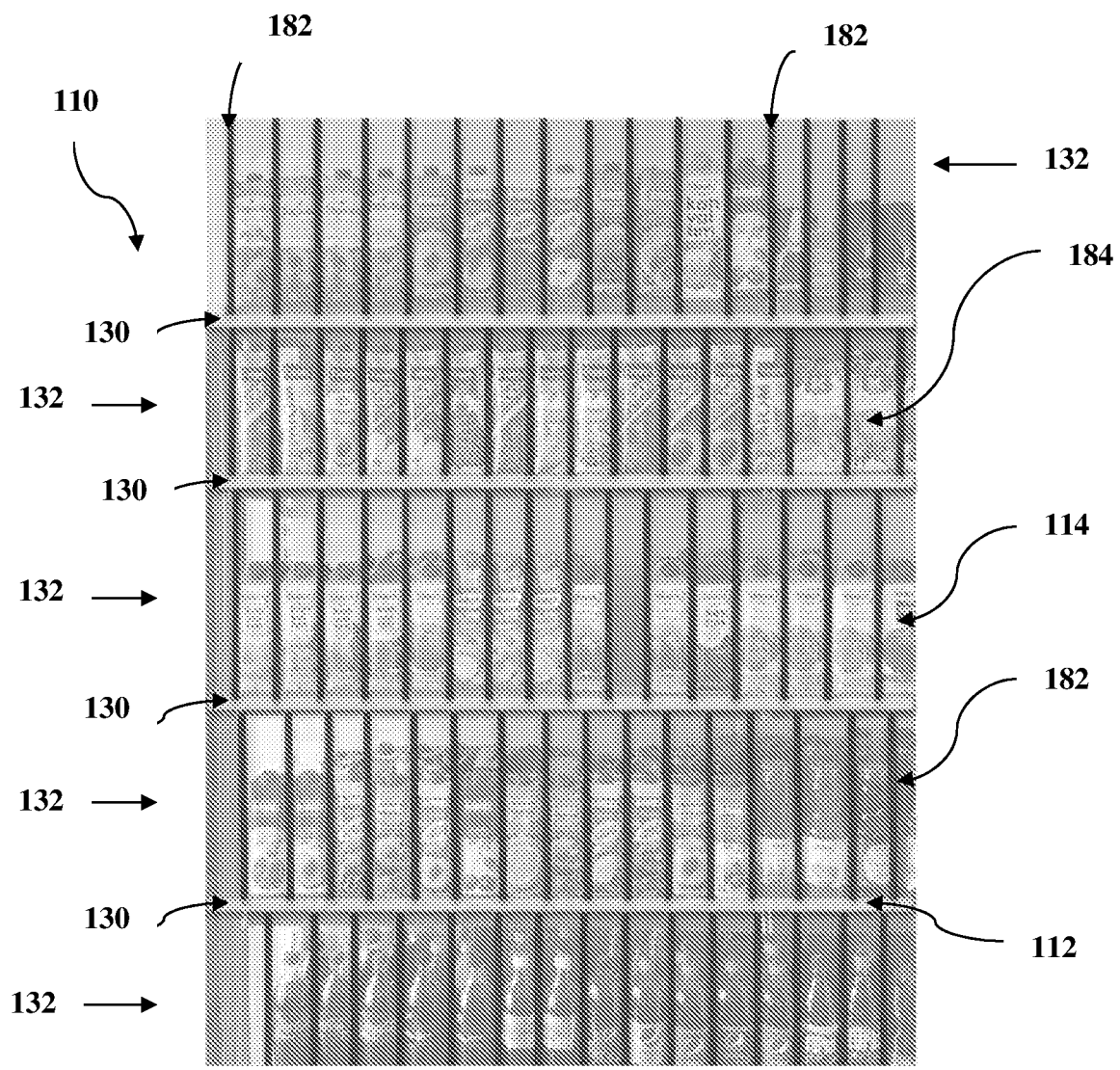
FIG. 18 is the image of FIGS. 9-11 and 16-17 overlaid with vertical boundaries detected during the boundary scan of the image in the horizontal dimension, and overlaid with horizontal boundaries detected during the boundary scan of the image in the vertical dimension, according to an embodiment.

FIG. 18 is the image 109 of FIGS. 9-11 and 16-17 overlaid with vertical boundaries 182 detected during the boundary scan of the image in the horizontal dimension, and overlaid with the horizontal boundaries 130 detected during the previous boundary scan of the image in the vertical dimension, according to an embodiment.

Figure 19:
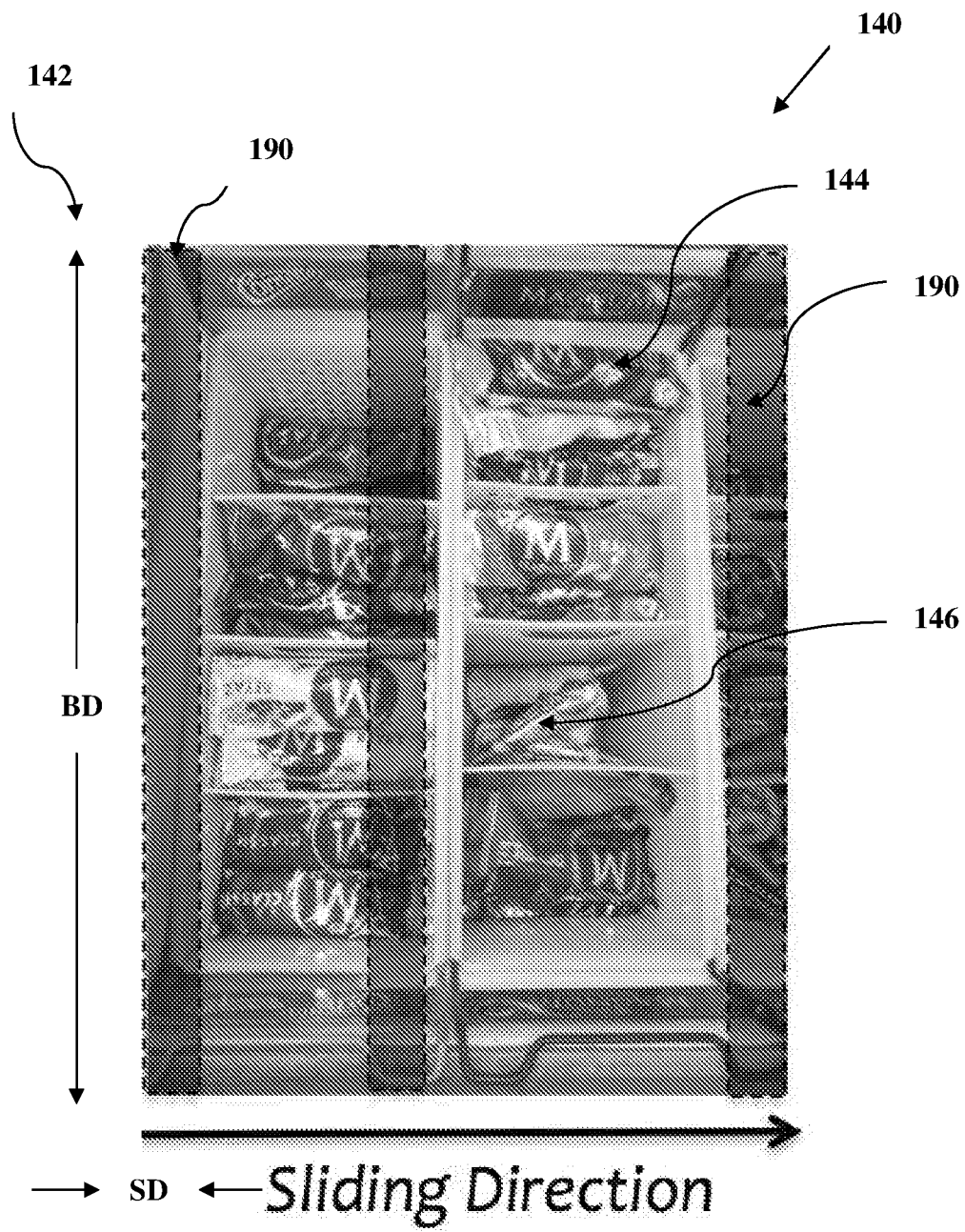
FIG. 19 is the image of FIGS. 12-14 overlaid with a virtual scan window during a boundary scan of all of the bins of the image in the horizontal dimension, according to an embodiment.

FIG. 19 is the image 140 of FIGS. 12-14 overlaid with a virtual scan window 190 during a boundary scan of all of the freezer bins 146 of the image in the horizontal dimension, according to an embodiment.

Figure 20:
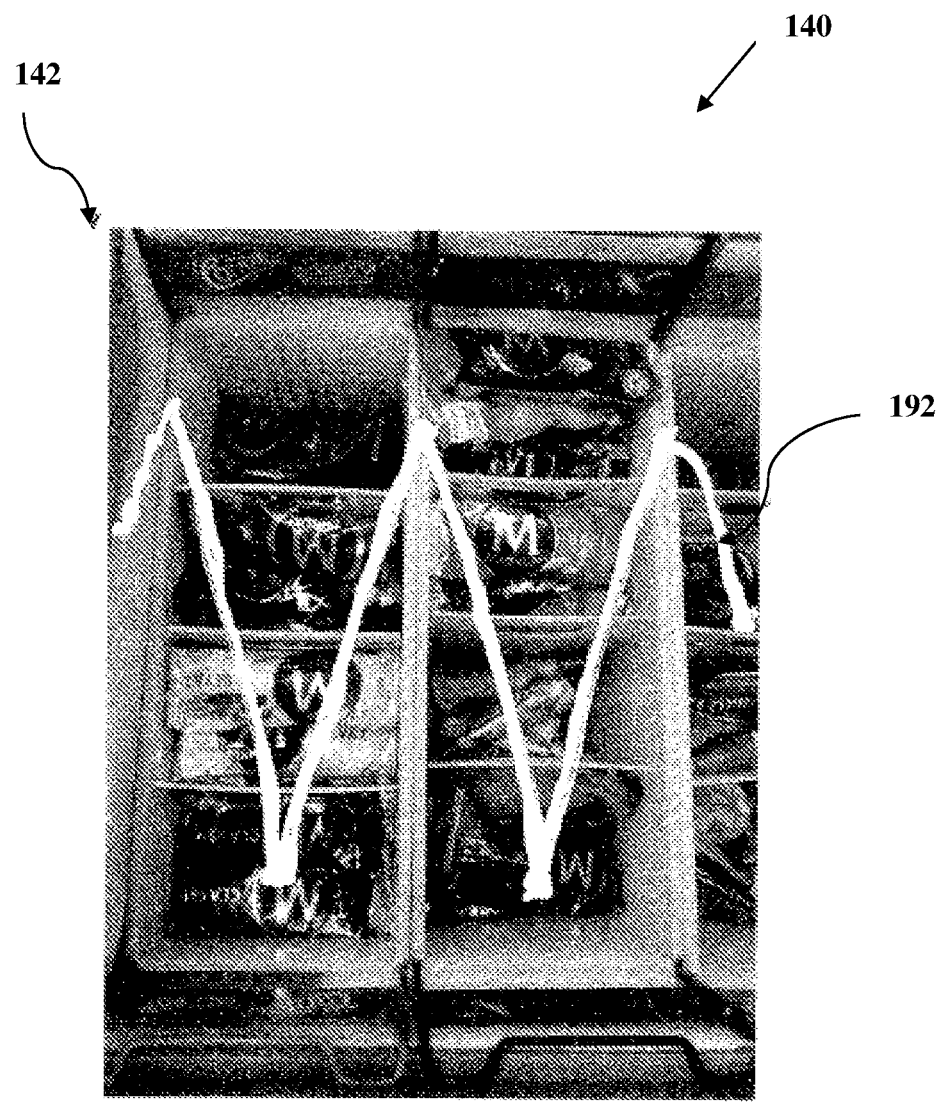
FIG. 20 is the image of FIGS. 12-14 and 19 overlaid with a boundary-score signal in the horizontal dimension, according to an embodiment.

FIG. 20 is the image 140 of FIGS. 12-14 and 19 overlaid with a boundary-score signal 192 in the horizontal dimension, according to an embodiment.

Figure 21:
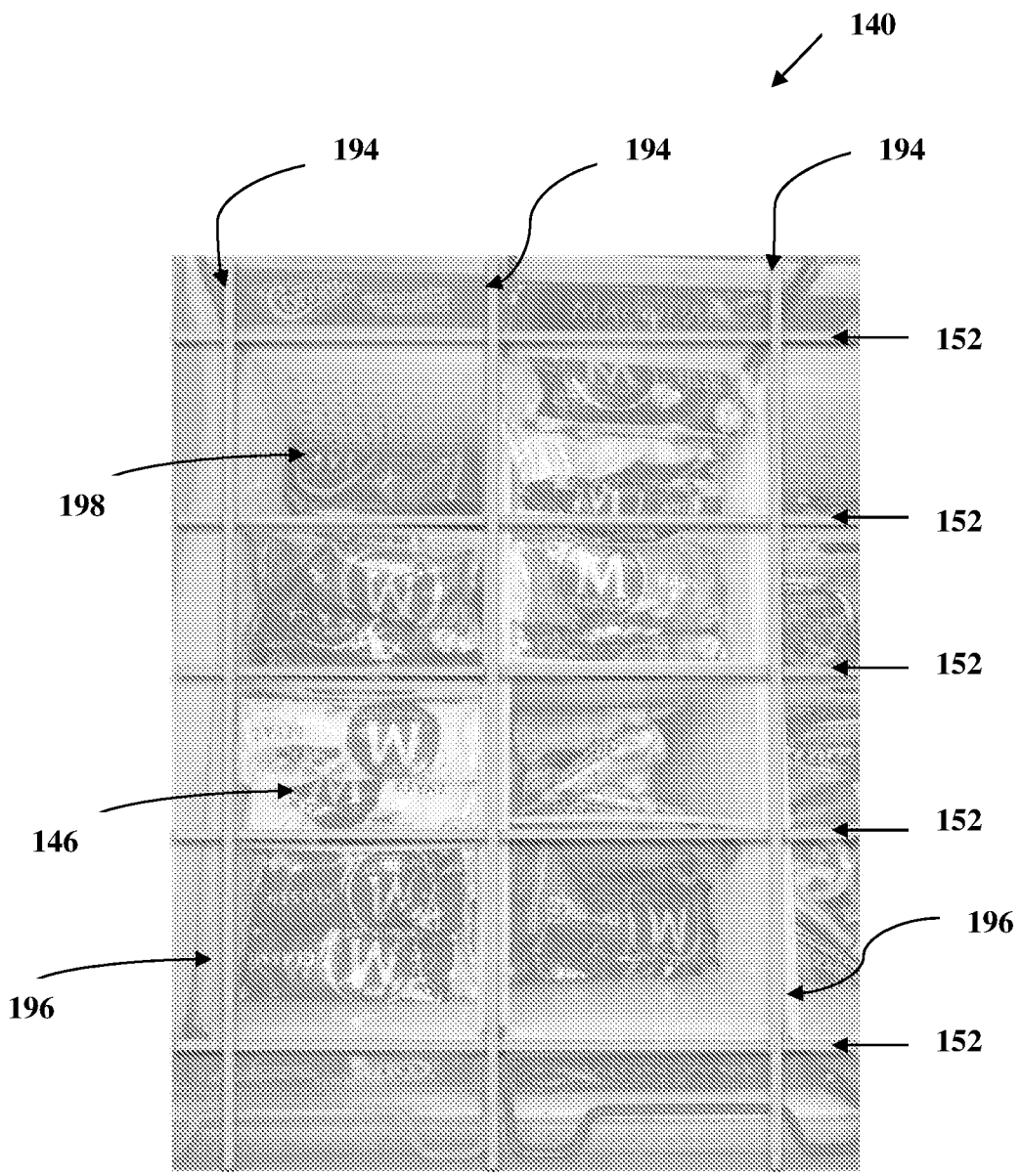
FIG. 21 is the image of FIGS. 12-14 and 19-20 overlaid with vertical boundaries detected during the boundary scan of the image in the horizontal dimension, and overlaid with horizontal boundaries detected during the boundary scan of the image in the vertical dimension, according to an embodiment.

FIG. 21 is the image 140 of FIGS. 12-14 and 19-20 overlaid with vertical boundaries 194 detected during the boundary scan of the image in the horizontal dimension, and overlaid with the horizontal boundaries 152 detected during the previous boundary scan of the image in the vertical dimension, according to an embodiment.

Referring to FIGS. 5-21, operation of the electronic processing circuit 44 is described, according to an embodiment.

Referring to the step 104 of the flow diagram 100 of FIG. 7, the image-processing circuit 60 (FIGS. 5-6) processes an image of a product-display structure received from the image-collection apparatus 42 (FIG. 4) to detect and identify boundaries between sections of the structure, and between products disposed on or in the structure.

Referring to FIG. 8, the flow diagram 102 describes the details of the step 102 of the flow diagram 100 of FIG. 7.

Referring to a step 106 of the flow diagram 104 of FIG. 8, and to FIG. 9, the descriptor circuit 80 effectively generates a visual-descriptor window 108 configured to detect one or more horizontal boundaries (e.g., shelves) of a product-display structure within a captured image 109; in this example, the product-display structure is a set 110 of shelves 112 on which are disposed products 114. The window 108, which is a virtual window, has a boundary dimension BD and a scan dimension SD; in this example, the window's boundary dimension BD coincides with the horizontal dimension of the image 109 so that the image-processing circuit 60 can detect one or more horizontal boundaries, here the shelves 112, of the set 110 of shelves. The boundary dimension BD is typically significantly longer than the scan dimension SD, and the boundary dimension BD typically extends across the entire image 109. For example, the image-processing circuit 60 can be configured to down-convert the image 109, using a standard down-converting algorithm, such that the horizontal dimension of the image is down converted to 128 pixels or 256 pixels wide. Therefore, such down-converting effectively normalizes the boundary dimension BD to 128 or 256 pixels regardless of the width, in pixels, of the image 109 prior to down conversion. And the scan dimension SD is typically approximately 1 to 5 pixels wide, depending, for example, on the difference between the resolution of the image 109 before the down converting and the resolution after the down converting. The narrower the scan dimension SD, the higher the resolution and precision with which the image-processing circuit 60 can detect and identify horizontal boundaries defined by the shelves 112, but the more time consuming the computation; conversely, the wider the scan dimension SD, the lower the resolution and precision with which the image-processing circuit 60 can detect and identify the horizontal boundaries defined by the shelves, but the faster the computation.

Still referring to the step 106, the descriptor circuit 80 (FIG. 6) effectively generates the virtual visual-descriptor window 108 at a starting position 116, which, in this example, is at the top of the image 109, and indexes the window by its position. Although shown as being at the top of the image 109, the starting position 116 can be anywhere in the image.

Next, at a step 118 of the flow diagram 102 (FIG. 8), the descriptor circuit 80 (FIG. 6) generates a visual descriptor X from the pixels of the down-converted image 109 inside of the window 108 at the starting position 116. The visual descriptor X is a multidimensional code (e.g., in the form of vectors or one or more matrices) describing and coding the visual content (e.g., luminance, chroma) of the image "neighborhood" inside of the window. Details of a histogram-of-oriented-gradients (HOG) technique for constructing the visual descriptor X are described below in conjunction with FIGS. 24-55b, and details of a convolutional-neural-networks (CNN) technique for constructing the visual descriptor X are described below in conjunction with FIGS. 56-61.

Then, at a step 120 of the flow diagram 104 (FIG. 8), the comparison circuit 82 (FIG. 6) effectively compares the visual descriptor X to a boundary-visual-descriptor template, which is a visual descriptor of a known boundary region, and generates a comparison score that is related to the probability that the portion of the image 109 within the window 108 (FIG. 9) is a boundary. In more detail, the comparison circuit 82 generates the comparison score equal to $f(X;W)$, where W is a set of parameters that specify the function $f( )$ and that were previously "learned" from one or more "training" visual descriptors of known image boundaries (e.g., of known shelves such as the shelves 112 of FIG. 9). Like the visual descriptor X, the parameters W are in the form of a multidimensional code (e.g., in the form of vectors or one or more matrices) describing and coding the visual content (e.g., luminance, chroma) of image "neighborhoods" inside many previously "learned" image windows that are known to be of boundary regions. That is, W describes and codes sort of an "average" of the visual content of many (e.g., hundreds to thousands) test or "teaching" image "neighborhoods" that are known to be boundary regions. If $f(X;W)$ is positive, then the comparison circuit 82 determines that the portion of the image 109 (FIG. 9) within the window 108 is within a boundary region, and the higher (i.e., the more positive) $f(X;W)$, the more likely the comparison circuit determines that the portion of the image within the window is, or includes, a boundary (a shelf 112 in this example); conversely, if $f(X;W)$ is negative, then the comparison circuit 82 determines that the portion of the image within 109 the window 108 is outside of a boundary region, i.e., is within a non-boundary region, and, therefore, is not a boundary (is not a shelf in this example). Details of a HOG technique for "learning" the parameters W and for generating the comparison score $f(X; W)$ are described below in conjunction with FIGS. 24-55b, and details of a CNN technique for "learning" the parameters W and for generating the comparison score $f(X;W)$ are described below in conjunction with FIGS. 56-61.

Next, at a step 122 of the flow diagram 102 (FIG. 8), the image-processing circuit 60 (FIGS. 5-6) determines whether there are more pixels in the image 109 (FIG. 9) to analyze. That is, the image-processing circuit 60 determines whether the window 108 (FIG. 9) has occupied all possible window positions within the image 109.

If, at the step 122, the image-processing circuit 60 determines that there are more pixels in the image 109 to analyze in the current scan dimension (the vertical dimension in this example), then the image-processing circuit proceeds to a step 124 of the flow diagram 102 (FIG. 8).

At the step 124 of the flow diagram 102 (FIG. 8), referring to FIG. 9, the descriptor circuit 80 effectively "slides" the virtual window 108 to a next position within the image 109, and indexes the window at this next position, thus effectively generating another window of the image. In more detail, the descriptor circuit 80 effectively moves, or scans, the virtual window 108 downward in the vertical dimension by one or more pixels (e.g., by a number of pixels in an approximate range of 1-5 pixels). If the window 108 is more than one pixel wide in the scan dimension SD, then the window in its current position may overlap the window in one or more of its prior positions; that is, the current window may overlap one or more of the prior windows. In contrast, if the window 108 is one pixel wide in the scan dimension SD and the descriptor circuit 80 moves the window in increments of one pixel, then the window in its current position does not overlap the window in any prior position; that is, the current window does not overlap any prior windows. Furthermore, the next position of the window 108 need not be immediately adjacent to the window's immediately prior position. That is, the descriptor circuit 80 can move the window 108 to any position of the image 109 that the window has not yet occupied.

After moving the window 108 to a next position at the step 124, the descriptor circuit 80 returns to the step 118, and the descriptor circuit and the comparison circuit 82 respectively repeat steps 118, 120, 122, and 124 for each next window position until the window 108 has occupied all window positions in the vertical dimension of the image 109 (four arbitrary positions of the window 108 are shown in FIG. 9).

After repeating the step 120 for all positions of the window 108 in the vertical dimension of the image 109 (FIG. 9), the comparison circuit 82 has generated a respective comparison score $f(X;W)$ for each vertical window position. That is, the comparison circuit 82 has generated a respective comparison score for each window position/index in the vertical dimension.

After the descriptor circuit 80 and comparison circuit 82 perform steps 118-124 for all vertical window positions, i.e., for all values of the window index, in the vertical dimension, at the step 122, the image-processing circuit 60 determines that there are no more pixels of the image 109 (FIG. 9) to analyze in the current scan dimension, and proceeds to a step 126 of the flow diagram 102 (FIG. 8).

At the step 126, referring to FIG. 10, the boundary circuit 84 (FIG. 6) generates a boundary signal 128 for the image 109 in the vertical dimension from the comparison scores generated by the comparison circuit 82 at step 120. The boundary signal 128 is a function of the window position, or the window index, in the vertical dimension, such that the value of the boundary signal at any window position y equals the value of the comparison score $f(X;W)$ that the comparison circuit 82 generated from the visual descriptor for the same window position y.

Next, at a step 130 of the flow diagram 102 (FIG. 8), referring to FIGS. 10-11, the boundary circuit 84 determines and identifies horizontal boundaries 130 of the image 109 from the boundary signal 128. The horizontal boundaries 130 are at the same positions as the positive peaks of the boundary signal 128 (the rightmost peaks in FIG. 10), and are at approximately the same positions as the shelves 112. That is, the positive peaks of the boundary signal 128 indicate the approximate positions of the shelves 112. By detecting the positions of the shelves 112, and by generating the horizontal boundaries 130 to represent the shelves, the boundary circuit 84 also determines and identifies horizontal sections 132 of the set 110 of shelves (i.e., determines and identifies the regions between the shelves) in which the products 114 are located.

Referring to FIGS. 5-8 and 12-14, the image-processing circuit 60 (FIGS. 5-6) can perform the steps 106, 118, 120, 122, 124, and 126 of the flow diagram 102 (FIG. 8) in a manner similar to that described above for an image 140 of a freezer cabinet 142 having bins 144 in which products 146 are disposed. In more detail, the descriptor circuit 80, comparison circuit 82, and boundary circuit 84 (FIG. 6) can operate in a manner similar to that described above to generate and to scan an image window 148 in a vertical dimension, to generate a vertical boundary signal 150, and to generate, at the positive peaks (the rightmost peaks in FIG. 13) of the vertical boundary signal, horizontal boundaries 152, which represent horizontal bin separators 154. Even though horizontally adjacent bin separators 154 may not be perfectly aligned with one another, in this example they are aligned closely enough for the image-processing circuit 60 to generate a single horizontal boundary 152 for each row of horizontally adjacent bin separators.

After the step 130 of the flow diagram 102 (FIG. 8) at which the boundary circuit 84 (FIG. 6) detected and identified the horizontal boundaries 130 of the set 110 of shelves 112 (FIG. 11), the image-processing circuit 60 (FIGS. 5-6) proceeds to a step 160 of the flow diagram 102.

At the step 160, the image-processing circuit 60 (FIGS. 5-6) determines whether there are any more dimensions of the image 109 (FIGS. 9-11) in which it has not yet scanned a virtual window.

If the image-processing circuit 60 determines that there is a dimension of the image 109 in which it has not yet scanned a virtual window, then the image-processing circuit returns the step 106 of the flow diagram 102 (FIG. 8).

In this example, because the image-processing circuit 60 determines that it has not yet scanned a window in the horizontal dimension of the image 109 to detect vertical boundaries within the image, the image-processing circuit returns to the step 106.

Referring to the step 106 of the flow diagram 102 (FIG. 8), and to FIGS. 15-16 (FIG. 15 is a close-up view of the top section 132 of the set 110 of shelves of FIG. 16), the descriptor circuit 80 effectively generates a virtual visual-descriptor window 170 configured to detect one or more vertical boundaries (e.g., product edges, or spaces between products) within each of the horizontal sections 132 of the set of shelves. The window 170 has a boundary dimension BD and a scan dimension SD; in this example, the window's boundary dimension BD coincides with the vertical dimension of the image 109 so that the image-processing circuit 60 can detect one or more vertical boundaries, here the edges of the products 114, or the spaces between the products. The boundary dimension BD of the window 170 does not span the entire vertical height of the image 109, but instead spans the height of only one section 132 between adjacent horizontal boundaries 130; this is because the products in one section 132 may not be aligned with products in another section 132. As described above for the vertical-scan window 108 of FIG. 9, the resolution of the image 109 can be down converted via a standard down-converting technique such that the boundary dimension BD of the horizontal-scan window 170 can be 128 or 256 pixels. And the scan dimension SD of the window 170 is typically approximately 1 to 5 pixels wide.

Still referring to the step 106 (FIG. 8) and to FIGS. 15-16, the descriptor circuit 80 effectively generates the visual-descriptor window 170 at a starting position 172, which, in this example, is at the top left of the image 109, and indexes the window by its position. But although described as being at the top left of the image 109, the starting position 172 can be anywhere in the image.

Next, at the step 118 of the flow diagram 102 (FIG. 8), the descriptor circuit 80 generates a visual descriptor X from the pixels of the image inside of the window 170 at the starting position 172.

Then, at the step 120 of the flow diagram 102 (FIG. 8), the comparison circuit 82 effectively compares the visual descriptor X to a boundary-visual-descriptor template, which is a visual descriptor of a known boundary region, and generates a comparison score that is related to the probability that the portion of the image within the window 170 (FIGS. 15-16) is a boundary. In more detail, the comparison circuit 82 generates the comparison score equal to $f(X;W)$, where W is a set of parameters that specify the function $f( )$ and that were previously "learned" from one or more (typically hundreds or thousands) "training" visual descriptors of known image boundary regions. Like the visual descriptor X, the parameters W are in the form of a multi-dimensional code (e.g., in the form of vectors or one or more matrices), and describe and codean "average" of the visual content (e.g., luminance, chroma) of many (e.g., hundreds to thousands) image "neighborhoods" inside of image windows that are known to contain a boundary region of an image. If $f(X;W)$ is positive, then the comparison circuit 82 determines that the portion of the image 109 (FIGS. 15-16) within the window 170 is within a boundary region of the image, and the higher $f(X;W)$, the comparison circuit determines the more likely that the portion of the image within the window is, or includes, a boundary (an edge of a product 114, or a space between products, in this example). Conversely, if $f(X;W)$ is negative, then the comparison circuit 82 determines that the portion of the image 109 within the window 170 is outside of a boundary region, i.e., is within a non-boundary region, and, therefore, is not a boundary of the image. Although W is described as being the same for shelves and products, W can be different for shelves than it is for products. If the comparison circuit 82 uses different sets of parameters W for shelves and products, and does not "know," a priori, whether the visual descriptors that it is analyzing are of shelf boundaries or product boundaries, then the comparison circuit can compare each visual descriptor to both the "shelf" W and the "product" W, and then pass along to the boundary circuit 84 the set of visual descriptors having the higher positive-peak values.

Next, at the step 122 of the flow diagram 102 (FIG. 8), the image-processing circuit 60 (FIGS. 5 and 6) determines whether there are more pixels in the image 109 (FIGS. 15-16) to analyze in the current (here, horizontal) scan dimension. That is, the image-processing circuit 60 determines whether the window 170 (FIGS. 15-16) has occupied all possible window positions in the horizontal dimension of the image 109.

If, at the step 122, the image-processing circuit 60 determines that there are more window positions to analyze in the horizontal-scan dimension, then the image-processing circuit proceeds to the step 124 of the flow diagram 102 (FIG. 8).

At the step 124, referring to FIG. 16, the descriptor circuit 80 effectively "slides" the virtual window 170 horizontally to a next position within the image 109, and indexes the window at this next position, thus effectively generating another window of the image. In more detail, the descriptor circuit 80 effectively moves, or scans, the virtual window 170 rightward in the horizontal dimension by one or more pixels (e.g., by a number of pixels in an approximate range of 1-5 pixels). If the window 170 is more than one pixel wide in the scan dimension SD, then the window in its current position may overlap the window in one or more of its prior positions; that is, the current window may overlap one or more of the prior windows. In contrast, if the window 170 is one pixel wide in the scan dimension SD and the descriptor circuit 80 moves the window in increments of one pixel, then the window in its current position does not overlap the window in any prior position; that is, the current window does not overlap any prior windows. Furthermore, the next position of the window 170 need not be immediately adjacent to the window's immediately prior position. That is, the descriptor circuit 80 can move the window 170 to any horizontal position of the image 109 that the window has not yet occupied, for example, a position in another section 132.

After moving the window 170 to a next position at the step 124, referring to FIG. 16, the descriptor circuit 80 returns to the step 118, and the descriptor circuit and the comparison circuit 82 respectively repeat steps 118, 120, 122, and 124 for each next window position until the window 170 has occupied all window positions in the horizontal dimension of the image 109 (fifteen arbitrary positions of the window 170 are shown in FIG. 16). For example, where the descriptor circuit 80 first moves the window 170 one step at a time across the entire top section 132, then the descriptor circuit next can move the window to the leftmost end of the next highest section 132 and can step the window across that section, and then the next section, and so on, until the descriptor circuit 80 has stepped the window across all of the sections 132. Furthermore, because the heights of the sections 132 may not be uniform, the descriptor circuit 80 can change the height of the window 170 as needed so that the boundary dimension BD spans the entire height of each section 132. Therefore, the number of pixels in the boundary dimension BD of the window 170, and, therefore, the height of the boundary dimension BD, can change from section 132 to section 132 of the image 109.

After repeating the step 120 for all positions of the window 170 in the horizontal dimension of the image 109 (FIG. 16) for each horizontal section 132, the comparison circuit 82 has generated a respective comparison score $f(X;W)$ for each horizontal window position. That is, the comparison circuit 82 has generated a respective comparison score for each window index in the horizontal dimension.

After the descriptor circuit 80 and comparison circuit 82 perform steps 118-124 for all horizontal positions of the window 170, i.e., for all values of the window index in the horizontal dimension, at the step 122 (FIG. 8), the image-processing circuit 60 determines that there are no more pixels of the image 109 (FIG. 16) to analyze in the horizontal dimension, and proceeds to the step 126 of the flow diagram 102 (FIG. 8).

At the step 126, referring to FIG. 17, the boundary circuit 84 (FIG. 6) generates a respective boundary signal 180 for each section 132 of the image 109 in the horizontal dimension from the comparison scores generated by the comparison circuit 82 at the step 120. Each boundary signal 180 is a function of the window position, or the window index, in the horizontal dimension, such that the value of the boundary signal at any window position z equals the value of the comparison score $f(X;W)$ that the comparison circuit 82 generated from the visual descriptor for the same window position z.

Next, at the step 130 of the flow diagram 102 (FIG. 8), referring to FIGS. 17-18, the boundary circuit 84 determines vertical boundaries 182 of the image 109 from the boundary signals 180. The vertical boundaries 182 are at the same positions as the positive peaks of the boundary signals 180 (the topmost peaks in FIG. 17), and are at approximately the same positions as the edges of the products 114. That is, positive peaks of the boundary signals 180 indicate the positions of the edges of the products 114. Because the products 114 are relatively close together in this example, a single positive peak of a boundary signal 180 indicates adjacent edges of two products 114. If the products 114 were farther apart, then the boundary signal 180 could have two adjacent positive peaks, one for each adjacent product edge. But because shelf space is at a premium for vendors, it is rare for there to be a space between adjacent products 114 large enough to produce two adjacent positive peaks. By detecting the positions of the vertical edges of the products 114, and by generating the vertical boundaries 182 to represent the vertical product edges, the boundary circuit 84 determines and identifies locations 184 of the products, the product locations 184 being bounded in the vertical dimension by adjacent vertical boundaries 182, and being bounded in the horizontal dimension by adjacent horizontal boundaries 130, as shown in FIG. 18.

Referring to FIGS. 5-8 and 19-21, the image-processing circuit 60 (FIGS. 5-6) can perform the steps 106, 118, 120, 122, 124, and 126 of the flow diagram 102 (FIG. 8) in a manner similar to that described above for the image 140 of the freezer cabinet 142 having the bins 144 in which the products 146 are disposed. In more detail, the descriptor circuit 80, comparison circuit 82, and boundary circuit 84 (FIG. 6) can operate in a manner similar to that described above to generate and scan an image window 190 (FIG. 19) in a horizontal dimension, to generate a horizontal boundary signal 192 (FIG. 20), and to generate, at the positive peaks (the topmost peaks in FIG. 20) of the horizontal boundary signal, vertical boundaries 194 (FIG. 21), which represent vertical bin separators 196. Even though vertically adjacent bin separators 196 may not be perfectly vertically aligned with one another, in this example they are aligned closely enough for the image-processing circuit 60 to generate a single vertical boundary 194 for each column of vertically adjacent bin separators. Furthermore, because each bin 144 includes only a single stack of products (i.e., only one product 146 per bin in the two dimensions of the image 140), the descriptor circuit 80 can generate a single horizontal-scan window 190 having a boundary dimension BD that spans the entire height of the image, and need not generate a separate window per section as it does for the shelf sections 132 as described above. Therefore, the boundary circuit 84 determines and identifies product locations 198, which are defined by the horizontal and vertical boundaries 152 and 194, and which are approximately the same as, and thus represent, the bins 144. The image-processing circuit 60 can be configured to determine that the image 140 is of a freezer cabinet 142, and, therefore, that the image does not need sectioned windows, from information (e.g., a tag) that accompanies the image from the image-collection apparatus 42 (FIG. 4), or from information that the image-processing circuit gleans from its vertical-dimension window scan of the image. Similarly, the image-processing circuit 60 can be configured to determine that the image 109 (FIGS. 15-18) is of a set 110 of shelves 112, and, therefore, that the image does need sectioned windows in the horizontal scan dimension, from information (e.g., a tag) that accompanies the image from the image-collection apparatus 42 (FIG. 4), or from information that the image-processing circuit gleans from its vertical-dimension window scan of the image. Or, the default configuration of the image-processing circuit 60 can be to "assume" that an image is of a set of shelves unless the image-processing circuit is notified, or determines, otherwise.

Referring to FIG. 6 and to the flow diagram 100 (FIG. 7), after the descriptor circuit 80, the comparison circuit 82, and the boundary circuit 84 have operated as described above in conjunction with FIGS. 5-21, at a step 200, the product circuit 86 identifies the shelf products 114 in the product locations 184 (FIG. 18); similarly, the product circuit can identify the freezer products 146 in the product locations 196 (FIG. 21). The product circuit 86 can identify the products 114 and 146 by identifying one or more of product type (e.g., juice, soda, ice-cream), product brand (e.g., Pepsi®, Minute Maid®, Magnum®), product size, product shape, and other product characteristics (e.g., organic, cage free, not genetically modified (non GMO)). Furthermore, the product circuit 86 can identify the products 114 and 146 using any suitable image-processing algorithm, such as a stock-keeper-unit (SKU) detector, a bar-code reader, a QR code reader, or a label detector.

Next, referring to FIG. 5 and to a step 202 of the flow diagram 100 (FIG. 7), the product-arrangement circuit 62 determines the arrangement of the products in the product-display structure. For purposes of example, operation of the product-arrangement circuit 62 is described in conjunction with products in a freezer cabinet, it being understood that the operation of the product-arrangement circuit can be similar for detecting an arrangement of products on a set of shelves or in another type of product-display structure.

Figure 22:
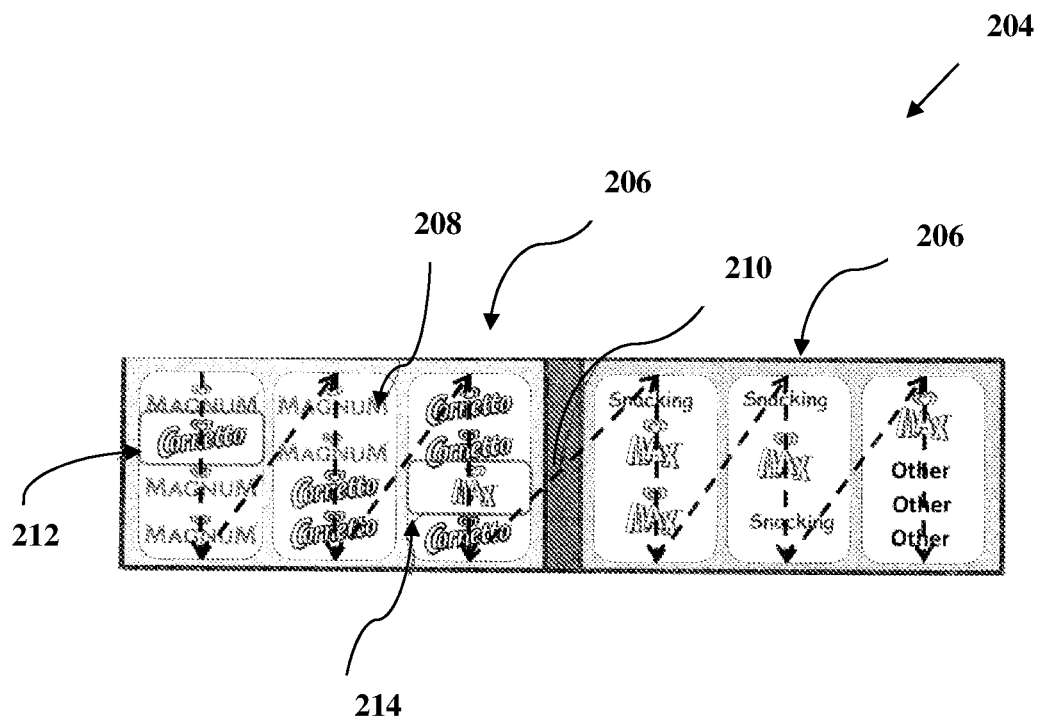
FIG. 22 is a diagram of products in a freezer cabinet overlaid with a vector representing the arrangement of the products, according to an embodiment.

FIG. 22 is a diagram of a freezer cabinet 204 having bins 206 each containing a respective single stack of frozen products 208 (only the top product of each stack is shown in FIG. 22). In the following example, the freezer cabinet 204 holds the following brands of products 208: Magnum® (M), Corretto® (C), Snacking Max® (S), and various other brands (O). Furthermore, the guidelines governing the product arrangement in the freezer cabinet 204 indicate that starting from the top left of the freezer cabinet, all Magnum® products should be linearly adjacent, followed by all Corretto® products, all Snacking Max® products, and all other products. The guidelines do not govern how many of each product brand the freezer cabinet 204 holds, only that the products of each brand are linearly adjacent. And here, "linearly adjacent" means adjacent along a zig-zag line 210 if the line were effectively horizontally "pulled" and straightened.

Referring to FIG. 5, the step 202 of the flow diagram 100 (FIG. 7), and FIG. 22, the product-arrangement circuit 62 first receives, or determines from the guidelines governing the freezer cabinet 204, a product-arrangement-template vector with elements MCSO. Therefore, this template vector represents the linear product order that the guidelines specify.

Next, the product-arrangement circuit 62 generates a product-arrangement vector that represents the arrangement of the products 208 along the zig-zag line 210, the vector having the elements MCMMMMCCCCSCSSSSSSSOOO. Therefore, this product-arrangement vector represents the actual linear order of the products 208.

Because, as described above, the number of consecutive products of the same brand is not specified by the guidelines (a "don't care" condition), the product-arrangement circuit 62 modifies the product-arrangement vector by collapsing each group of same-brand products to a single element. Therefore, the resulting modified product-arrangement vector has the elements MCMCSCSO.

Next, the product-arrangement circuit 62 effectively compares the modified product-arrangement vector MCMCSCSO to the guideline vector MCSO.

Because the modified product-arrangement vector and the guideline vector are unequal, the product-arrangement circuit 62 determines that the arrangement of the products 208 is erroneous.

Then, the product-arrangement circuit 62 determines the number of errors in the arrangement of the products 208 by determining the minimum number of changes needed to "convert" the modified product-arrangement vector to the guideline vector. In this example, the product-arrangement circuit 62 first determines that it must reverse the order of the "CM" string (the second and third elements) in the modified product-arrangement vector MCMCSCSO to obtain the initial "MC" string of the guideline vector MCSO. The product-arrangement circuit 62 counts the error that results in the need for an order reversal as one error 212. After correction of the first error 212 in the modified product-arrangement vector (the product-arrangement circuit 62 does not, and typically cannot, correct the first error 212 in the freezer cabinet 204), the one-time-corrected modified product-arrangement vector is MCSCSO.

Furthermore, because the reversal is from "CM" to "MC," the product-arrangement circuit 62 can determine that the location of the error is in the sequence of Magnum® products (if the product-arrangement circuit is configured to analyze the original product-arrangement vector, then it can determine the location of the error within the sequence of Magnum® products).

Next, the product-arrangement circuit 62 compares the one-time-corrected modified product-arrangement vector MCSCSO to the guideline vector MCSO.

Because the one-time-corrected modified product-arrangement vector and the guideline vector are unequal, the product-arrangement circuit 62 determines that the arrangement of the products 208 has at least one more error.

Then, the product-arrangement circuit 62 determines that it must reverse the order of the "SC" string (third and fourth elements) in the one-time-corrected modified product-arrangement vector MCSCSO to obtain the ending "SO" string of the guideline vector MCSO. The product-arrangement circuit 62 counts the error that results in the need for the second order reversal as a second error 214. After correction of the second error 214 in the one-time-corrected modified product-arrangement vector (the product-arrangement circuit 62 does not, and typically cannot, correct the second error 214 in the freezer cabinet 204), the two-times-corrected modified product-arrangement vector is MCSO.

Furthermore, because the reversal is from "SC" to "CS," the product-arrangement circuit 62 can determine that the location of the error is in the sequence of Corretto® products (if the product-arrangement circuit is configured to analyze the original product-arrangement vector, then it can determine the location of the error within the sequence of Corretto® products).

Next, the product-arrangement circuit 62 compares the two-times-corrected modified product-arrangement vector MCSO to the guideline vector MCSO.

Because the two-times-corrected modified product-arrangement vector and the guideline vector are equal, the product-arrangement circuit 62 determines that the arrangement of the products 208 has a total of two errors.

Therefore, not only can the product-arrangement circuit 62 determine whether the arrangement of products 208 is erroneous, the product-arrangement circuit can determine the number, and can determine the location(s), of the error(s) in the arrangement of products.

To determine whether a product arrangement is erroneous, and to determine the number and locations of the errors in an erroneous product arrangement, as described above, the product-arrangement circuit 62 can implement a planogram-analysis algorithm such as a modified edit-distance algorithm or a string-matching algorithm. An example of a suitable string-matching algorithm is disclosed in Navarro, G., *A Guided Tour to Approximate String Matching*, ACM Computing Surveys (CSUR), 33(1), 31-88 (2001), http://users.csc.calpoly.eda/~dekhtyar/570-Fall2011/papers/navarro-approximate.pdf, which reference is incorporated by reference.

After the product-arrangement circuit 62 has determined whether the arrangement of products 208 is erroneous, and, if so, has determined one or both of the number and the location of each error, the product-arrangement circuit provides this information to the score circuit 68 (FIG. 5).

Next, referring to FIG. 5 and the flow diagram 100 (FIG. 7), at a step 220 the score circuit 68 determines a product-arrangement score in response to the product-arrangement information generated and provided by the product-arrangement circuit 62. The score circuit 68 can determine the product-arrangement score according to any suitable algorithm specified in product-display guidelines. Furthermore, the score circuit 68 can provide the product-arrangement score to the reporting client 48 (FIG. 4) via the internet/cloud 50 at the request of the reporting client or otherwise.

Then, still referring to FIG. 5 and the flow diagram 100 of FIG. 7, at a step 222, the descriptor circuit 80, the comparison circuit 82, and the boundary circuit 84 cooperate to detect and to identify, in one or more captured images from the image-collection apparatus 42 (FIG. 4), one or more boundaries of objects on and around the product-display structure, and one or more boundaries of condition (e.g., view-window frost) regions on and around the product-display structure. The circuits 80, 82, and 84 can be configured to detect and identify such boundaries according to any suitable algorithm, such as the visual-descriptor algorithm described above in conjunction with FIGS. 5-21.

Next, at a step 224 of the flow diagram 100 (FIG. 7), the product circuit 86, or another circuit that can be similar to the product circuit, determines and identifies objects within the identified object boundaries, and conditions within the identified condition-region boundaries. Examples of such objects include signage, umbrellas, waste receptacles, and other product-display structures, and examples of such conditions include view-window fog and frost, cleanliness, state of repair, and color. The product circuit 86, or other circuit, can be configured to determine and identify such objects and conditions according to any suitable algorithm.

Then, at a step 226 of the flow diagram 100 (FIG. 7), the object-arrangement circuit 64 determines the arrangement of the one or more objects identified by the product circuit 86 or other circuit, and the condition circuit 66 determines one of more characteristics (e.g., severity, view transparency) of each of the one or more conditions identified by the product circuit or other circuit. If the arrangement of the one or more objects is erroneous, then the object-arrangement circuit 64 also can determine the number and location of errors in the object arrangement. For example, the object-arrangement circuit 64 can determine the arrangement of the one or more identified objects, the number of errors in the object arrangement, and the location(s) of the error(s) in the object arrangement, in a manner similar to the manner in which the product-arrangement circuit 62 determines the arrangement of products, the number of errors in the product arrangement, and the location(s) of the error(s) in the product arrangement as described above in conjunction with FIG. 22.

Next, at a step 228 of the flow diagram 100 (FIG. 7), the score circuit 68 determines one or both of an object-arrangement score and a condition score in response to the object-arrangement information and the condition information respectively generated and provided by the object-arrangement circuit 64 and the condition circuit 66. The score circuit 68 can determine the object-arrangement score and the condition score according to any suitable respective algorithms specified in product-display guidelines. Furthermore, the score circuit 68 can provide one or both of the object-arrangement score and the condition score to the reporting client 48 (FIG. 4) via the internet/cloud 50 at the request of the reporting client or otherwise. Moreover, the score circuit 68 can generate a combined score in response to two or more of the product-arrangement score, the object-arrangement score, and the condition score.

Referring again to FIGS. 7-22, alternate embodiments of the described algorithms, procedures, and methods are contemplated. For example, the algorithms, procedures, and methods can include steps not described, can omit one or more of the described steps, or can perform the steps in an order different from the described order. Furthermore, alternate embodiments described above in conjunction with the system 40 of FIG. 4, the electronic processing circuit 44 of FIG. 5, and the image-processing circuit 60 of FIG. 6 may also be applicable to the algorithms, procedures, and methods described in conjunction with FIGS. 7-22.

Figure 23:
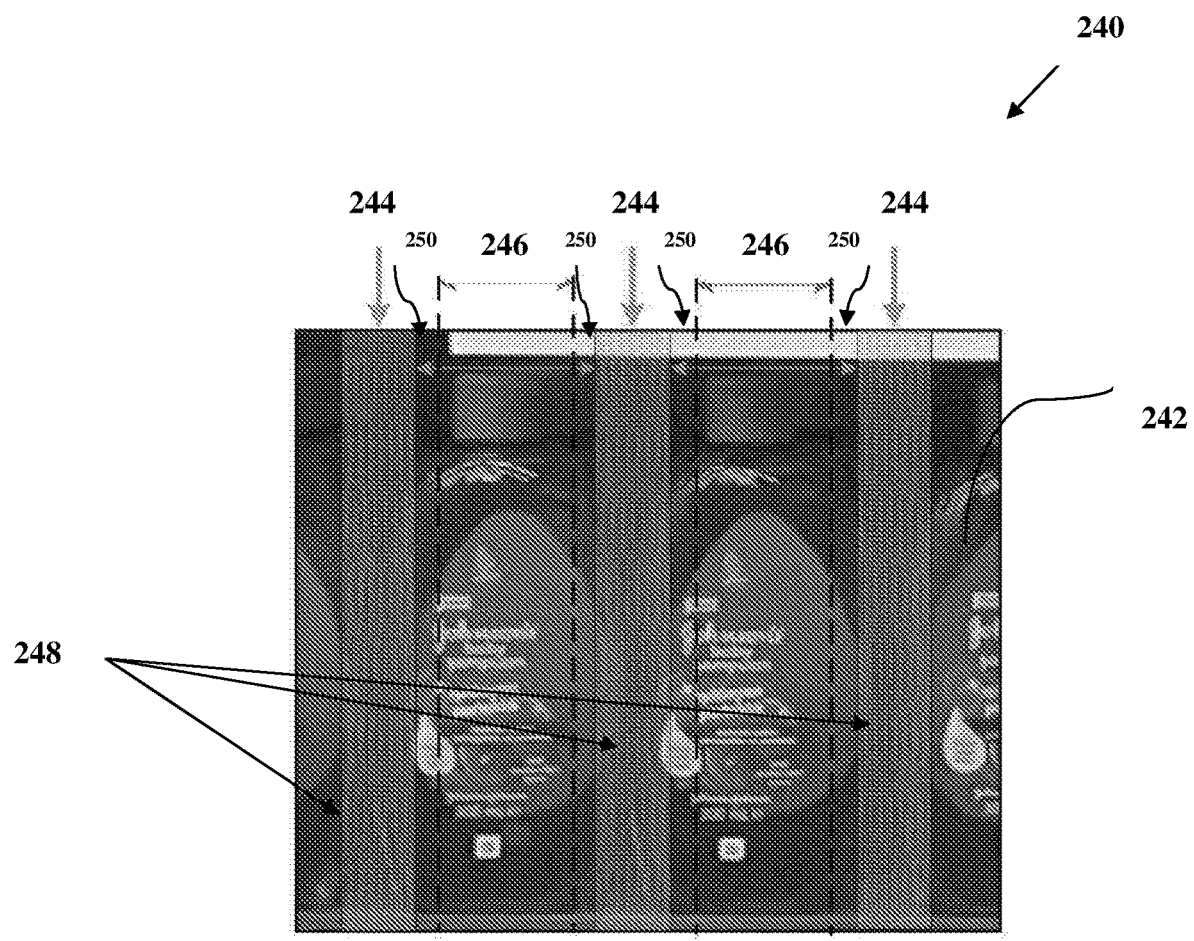
FIG. 23 is an image of products on a shelf, the image suitable for statistical learning of boundary descriptors and non-boundary descriptors used to detect display-structure and product boundaries, according to an embodiment.

FIG. 23 is an image 240 of products 242 having boundary regions 244 and non-boundary regions 246, according to an embodiment.

Referring to FIGS. 6 and 23, "training" of the comparison circuit 82 is described, according to an embodiment.

First, a human operator (not shown in FIG. 23) selects a point in each boundary region 244. For example, the human operator operates a mouse (not shown in FIG. 23) of the operator client 46 (FIG. 4), and clicks on respective image points 248, which the operator considers to be at or between the edges of respective products 242. The comparison circuit 82, or a separate training circuit, saves these click points in an annotation file on an electronic memory (e.g., volatile, non-volatile) that can be part of the electronic processing circuit 44 (FIGS. 4-5). Ideally, the human operator selects each image point 248 to be at the scan-dimension center of a respective boundary region 244. For example, for each boundary region 244, the human operator ideally selects, as a respective image point 248, a point that is horizontally centered between the edges of two adjacent products 242. In this way, the comparison circuit 82 is "trained" to give approximately the scan-dimension center of each boundary region the highest boundary score, which, as described above, corresponds to the positive peaks of the boundary signal. For example, referring again to FIG. 10, the comparison circuit 82 was "trained" in the above-described manner to give the centers of the shelves 112 (in the vertical scan dimension) approximately the highest positive boundary scores, and was thus "trained" to identify the approximate vertical centers of the shelves as the boundaries 130 (FIG. 11). Further to this example, if the scan window is more than one pixel wide, for example, as wide as the boundary region 244, then the comparison circuit can be configured to identify to give the highest positive boundary scores to the centers of the scan windows that respectively align with the boundary regions 244.

The comparison circuit 82, or a separate training circuit, then defines each boundary region 244 by expanding outward from a respective click point 248 in both horizontal directions a specific distance (e.g., 100 pixels in each horizontal direction).

Next, the descriptor circuit 80, or a separate training circuit, scans a window horizontally across each boundary region 244, and generates, from the pixels in each window, a respective visual descriptor.

Because each visual descriptor is of a known boundary region 244, the comparison circuit 82, or the separate training circuit, "expects" the visual descriptor, when it is statistically classified according to the classifier algorithm, to yield a positive boundary score, with a visual descriptor from a window position closer to the center vertical axis of a boundary region yielding a higher positive value than a visual descriptor from a window position further from the center vertical axis. That is, the comparison circuit 82, or the separate training circuit, can "tune" the statistical-classifier algorithm (e.g., tune the algorithm coefficients) to yield the expected results.

The comparison circuit 82, or a separate training circuit, also defines each non-boundary region 246 by forming a buffer region 250 around each boundary region 244, and defining each non-boundary region as the region between adjacent buffer regions. For example, each buffer region 250 can have a particular width (e.g., 30 pixels).

Next, the descriptor circuit 80, or the separate training circuit, scans a window horizontally across each non-boundary region 246, and generates, from the pixels in each window, a respective non-boundary visual descriptor.

Because each non-boundary visual descriptor is of a known non-boundary region 246, the comparison circuit 82, or the separate training circuit, "expect" the visual descriptor, when it is statistically classified according to the classifier algorithm, to yield a negative boundary score, with a visual descriptor from a window position closer to the center vertical axis of a non-boundary region yielding a more-negative score than a visual descriptor from a window position further from the center vertical axis. That is, the comparison circuit 82, or the separate training circuit, can further "tune" the statistical-classifier algorithm (e.g., tune the algorithm coefficients) to yield the expected results.

The above-described "tuning" of the statistical-classifier algorithm is performed using hundreds, or thousands, of images having a diversity of boundaries (e.g., a diversity of products and product-display structures) such that the comparison circuit 82 can use the "tuned" statistical-classifier algorithm to detect boundaries in images of all sorts of product-display structures.

Furthermore, such "tuning" can be performed a priori "offline" while the image-processing circuit 60 (FIG. 5) is not being used to identify boundaries and product locations within images.

Or, such "tuning" can be ongoing, i.e., can be performed using images that the image-processing circuit 60 is currently processing to identify boundaries and product locations. That is, the comparison circuit 82, or other circuitry of the image-processing circuit 60, can "tune" the statistical-classifier algorithm with an image while it is also identifying boundaries and product locations within the same image (any change to the algorithm from such "tuning" typically will be applied for a subsequent image but not for the current image).

Still referring to FIG. 23, alternate embodiments of the described training/tuning algorithms, procedures, and methods are contemplated. For example, the algorithms, procedures, and methods can include steps not described, can omit one or more of the described steps, or can perform the steps in an order different from the described order. Furthermore, although described as using boundaries between products 242 for "training" the statistical-classifier algorithm, the comparison circuit 82, or other circuit, can use other boundaries (e.g., shelves, bin separators) for "training" the statistical-classifier algorithm. Moreover, alternate embodiments described above in conjunction with the system 40 of FIG. 4, the electronic processing circuit 44 of FIG. 5, the image-processing circuit 60 of FIG. 6, and the algorithms, procedures, and methods described above in conjunction with FIGS. 7-22 may also be applicable to the algorithms, procedures, and methods described in conjunction with FIG. 23.

FIGS. 24-55b are images and diagrams that describe an HOG algorithm that the descriptor circuit 80 and the comparison circuit 82 (FIG. 6) can be configured to implement to generate visual descriptors, and to classify, statistically, the visual descriptors to generate a boundary score, according to an embodiment. Although the below description is in terms of training/tuning a statistical classifier that the comparison circuit 82 is configured to implement, it is to be understood that the description also applies to detecting boundaries of product-display structures and products in images.

A method is tried and implemented to detect product boundaries in shelf images automatically, according to an embodiment. The method is explained in detail. Measured performance and results are documented.

Given

A set of training shelf images $I=\{I^{(n)}\}_{n=1}^{N}$ where N is the number of training images.

A set of training annotation lists $A=\{a^{(n)}\}_{n=1}^{N}$. Every annotation list $a=\{x^{(m)}\}_{m=1}^{M_a}$ (where $M_a$ is the number of annotations in the annotation list a) includes the column indices ($x^{(m)}$) of hand annotated boundaries of its corresponding training image.

A set of query shelf images $J=\{J^{(q)}\}_{q=1}^{Q}$.

A set of test annotation lists $B=\{b^{(n)}\}_{q=1}^{Q}$ (unknown at test time, used only for performance evaluation).

Figure 24:
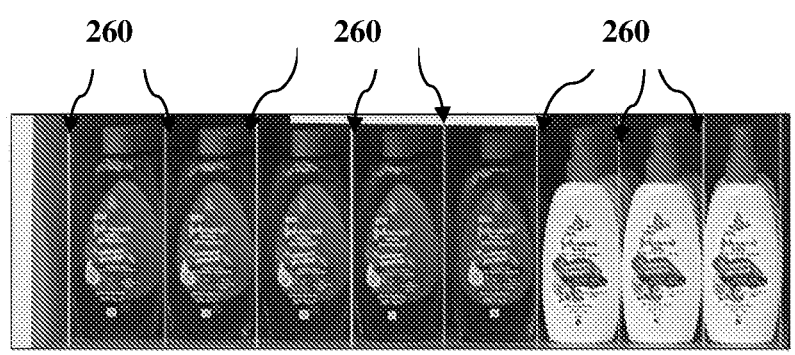
FIGS. 24-55b are respective images and diagrams that describe a Histogram of Oriented Gradients (HOG) technique for determining, and statistically classifying, visual descriptors used to detect and to identify section and product boundaries within a display structure, according to an embodiment.

FIG. 24 is a sample training image with corresponding boundary annotations marked with lines 260, according to an embodiment.

(A) Preprocessing

All test and training images are resized to match an image height of 256 pixels (preserving the aspect ratio). The resized images are then converted to 8 bit grayscale.

(B) Building Positive and Negative Sample Sets

From every training image and corresponding annotation list, positive and negative samples of column indices are selected.

Positive samples are selected from the neighborhood of boundary annotations. The neighborhood half-width parameter (IMAGEROWSIZE) is chosen to be around 15. All column indices in this neighborhood are selected as positive samples. For instance, when the neighborhood half width is 15, an annotation y produces 31 positive samples [y−15 to y+15]. A few different neighborhood half-width values are tried such as 15, 16, and 17.

Negative samples are randomly selected from a safe zone within the intervals between the positive samples. The width of the safe zones are 90% of the corresponding intervals. Another percentage value (SAFETYPARAMETER) 50% is tried as well. The number of negative samples to be selected from a safe zone is proportional to the width of the safe zone. The total number of negative samples is approximately equal to the number of positive samples.

Figure 25:
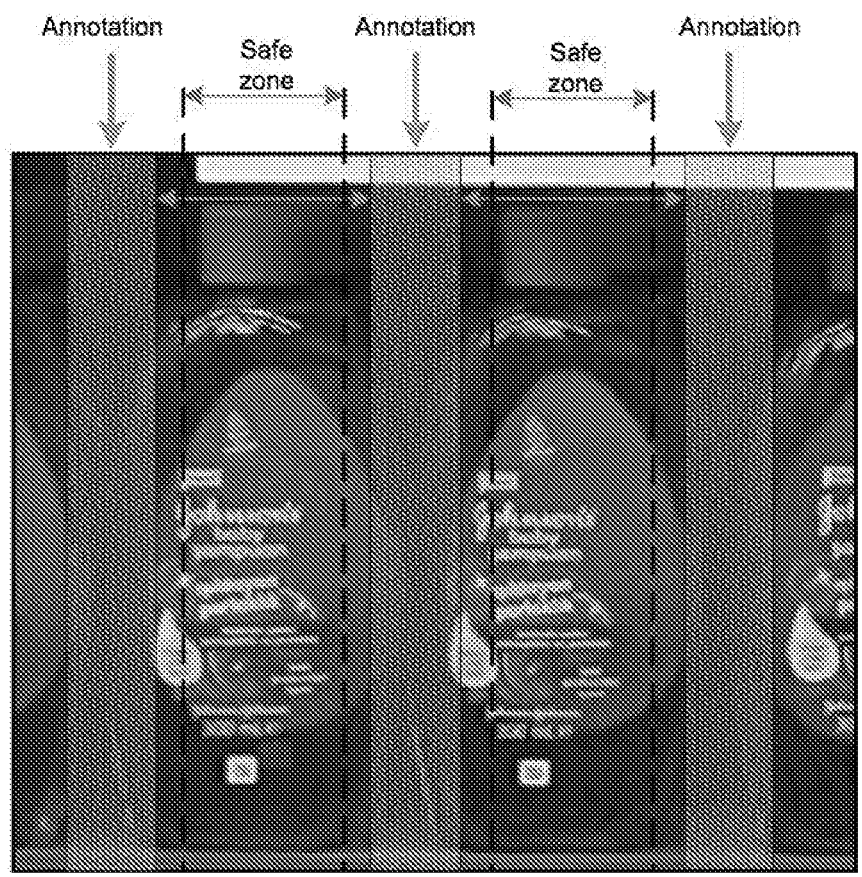

FIG. 25 is an image with a sample region from a shelf image with annotations and zones marked, according to an embodiment. Here, all columns in the half width neighborhoods of annotations (green zones) are selected as positive samples. Some random columns from safe zones are selected as negative samples.

Figure 26:
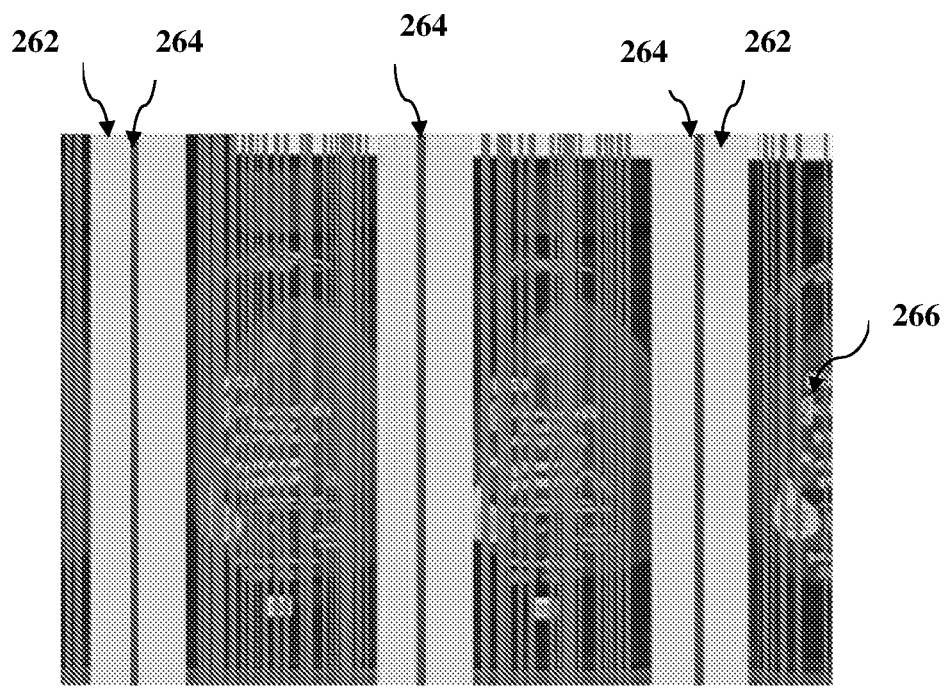

FIG. 26 shows positive (262, 264) and negative (266) column indices from the sample region shown in FIG. 25, according to an embodiment. The columns 264 mark the annotation indices.

Figure 27:
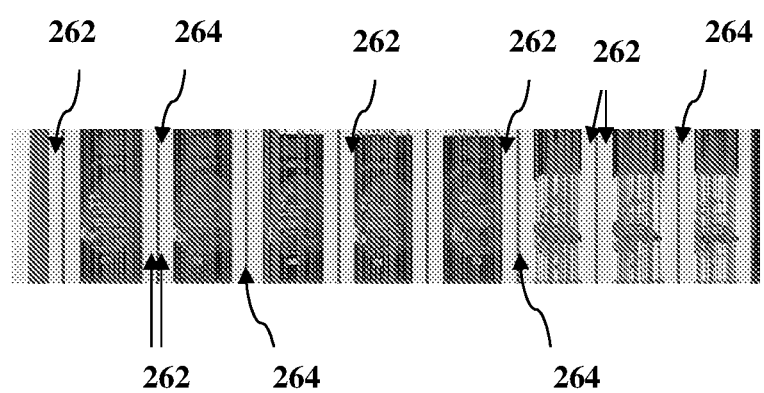

FIG. 27 shows a complete set of positive (262, 264) and negative (266) column indices sampled from the sample query image, according to an embodiment.

(B) Feature Extraction

For every positive and negative training sample, a HOG feature vector is calculated. Positive and negative HOG feature vectors are accumulated in separate sets.

HOG feature calculation steps are explained below:

(1) From the mother image (which has intensity values in the range [0-255]), x and y image gradients ($I_x$ and $I_y$) are calculated using Gradient Operators with size 5. Various sizes (SOBEL_SIZE) are tried as well. (x is for horizontal and y is for vertical dimension)

(a) $\begin{bmatrix} -1 & -2 & 0 & 2 & 1 \\ -4 & -8 & 0 & 8 & 4 \\ -6 & -12 & 0 & 12 & 6 \\ -4 & -8 & 0 & 8 & 4 \\ -1 & -2 & 0 & 2 & 1 \end{bmatrix}$ for $I_x$ and $\begin{bmatrix} -1 & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{bmatrix}$ for $I_y$ for size = 5

(b) $\begin{bmatrix} -1 & 0 & 1 \\ -2 & 0 & 2 \\ -1 & 0 & 1 \end{bmatrix}$ for $I_x$ and $\begin{bmatrix} -1 & -2 & -1 \\ 0 & 0 & 0 \\ 1 & 2 & 1 \end{bmatrix}$ for $I_y$ for size = 3

-continued (c) $[-1 \ 0 \ 1]$ for $I_x$ and $\begin{bmatrix} -1 \\ 0 \\ 1 \end{bmatrix}$ for $I_y$ for size = 1

(2) Gradient magnitude image M and phase image P are calculated using $I_x$ and $I_y$.

$$M = I_x^2 + I_y^2$$

The range of M is dependent on the kernels used for gradient calculation.

When the kernels at (1)(a) are used, $I_x$ and $I_y$ have ranges [−12240, 12240]. Thus M has [0, 13042.44).

When the kernels at (1)(b) are used, $I_x$ and $I_y$ have ranges [−1020, 1020]. Thus M has [0, 1140.39].

When the kernels at (1)(c) are used, $I_x$ and $I_y$ have ranges [−255, 255]. Thus M has [0,360.62).

Magnitude values are not normalized to fit in a range.

$$P = \begin{cases} \arctan\left(\frac{I_y}{I_x}\right), & \text{if } I_y > 0 \\ \arctan\left(\frac{I_y}{I_x}\right) + \pi, & \text{if } I_y < 0 \\ 0, & \text{if } I_y = 0 \text{ and } I_x > 0 \\ \pi, & \text{if } I_y = 0 \text{ and } I_x < 0 \\ \text{undefined}, & \text{if } I_y = 0 \text{ and } I_x < 0 \end{cases}$$

where arc tan has range [0, π). Thus P has range [0,2π)

(3) For every sample column index c, a stripe magnitude image $M_c$ and a stripe phase image $P_c$ are extracted (centered around the sample column index) from magnitude and phase images consecutively. These stripe images will produce the HOG vector. The width (HOG_STRIPEWIDTH) of the stripe images is selected as 16. Various widths are tried as well. The height of the stripe images is equal to the heights of magnitude and phase images.

(4) Stripe phase and stripe magnitude images are divided into cells vertically and horizontally. Various number of horizontal and vertical divisions are applied. HOG_CELLSPERROW parameter determines the number of cells horizontally, and HOG_CELLSPERCOLUMN parameter determines the number of cells vertically.

Figure 28:
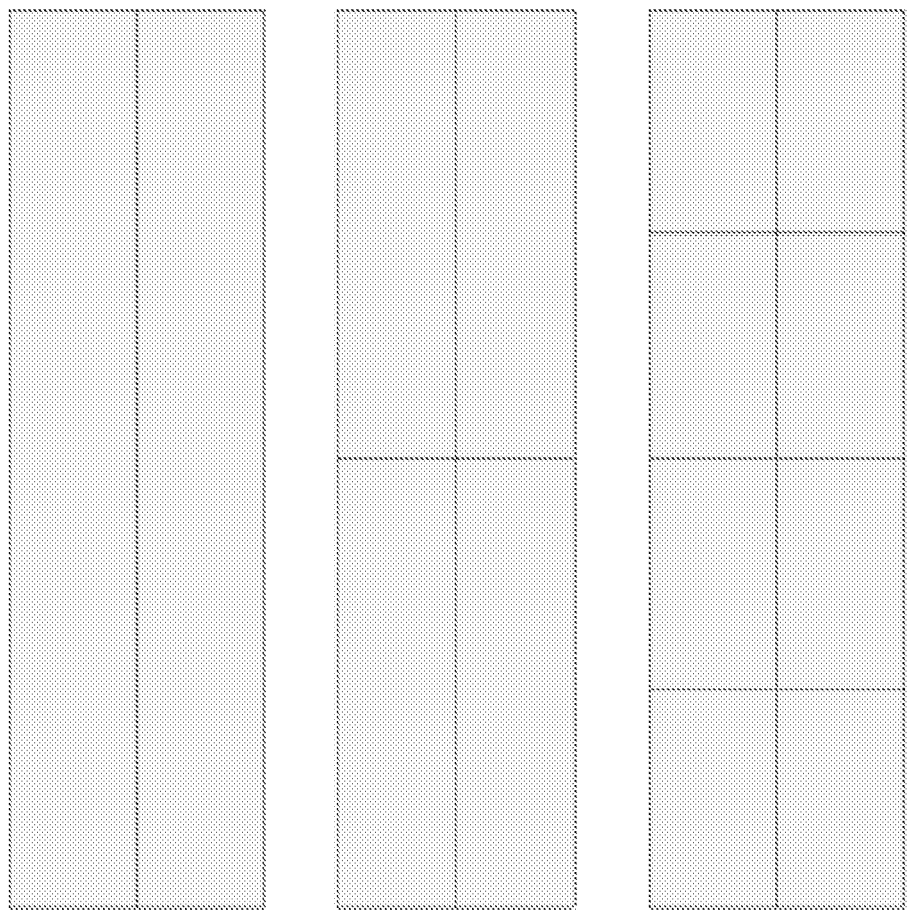

FIG. 28 shows some cell division patterns used, here 1×2, 2×2, and 4×2, consecutively, according to an embodiment.

(5) For every cell, the histogram of gradients is calculated and normalized. Various histogram calculation methods are tried. Methods differ in various stages.

(a) Using signed or unsigned phase gradients.

The phase image consists of signed gradient phases. Its range is [0,2π).

(a1) Signed phase gradients: Phase image is used as is. Two types of binning are tried for signed phase gradients. The binning types are shown below. Various θ values (HOG_VERTICALEDGEANGLE) are tried as well.

Figure 29A:
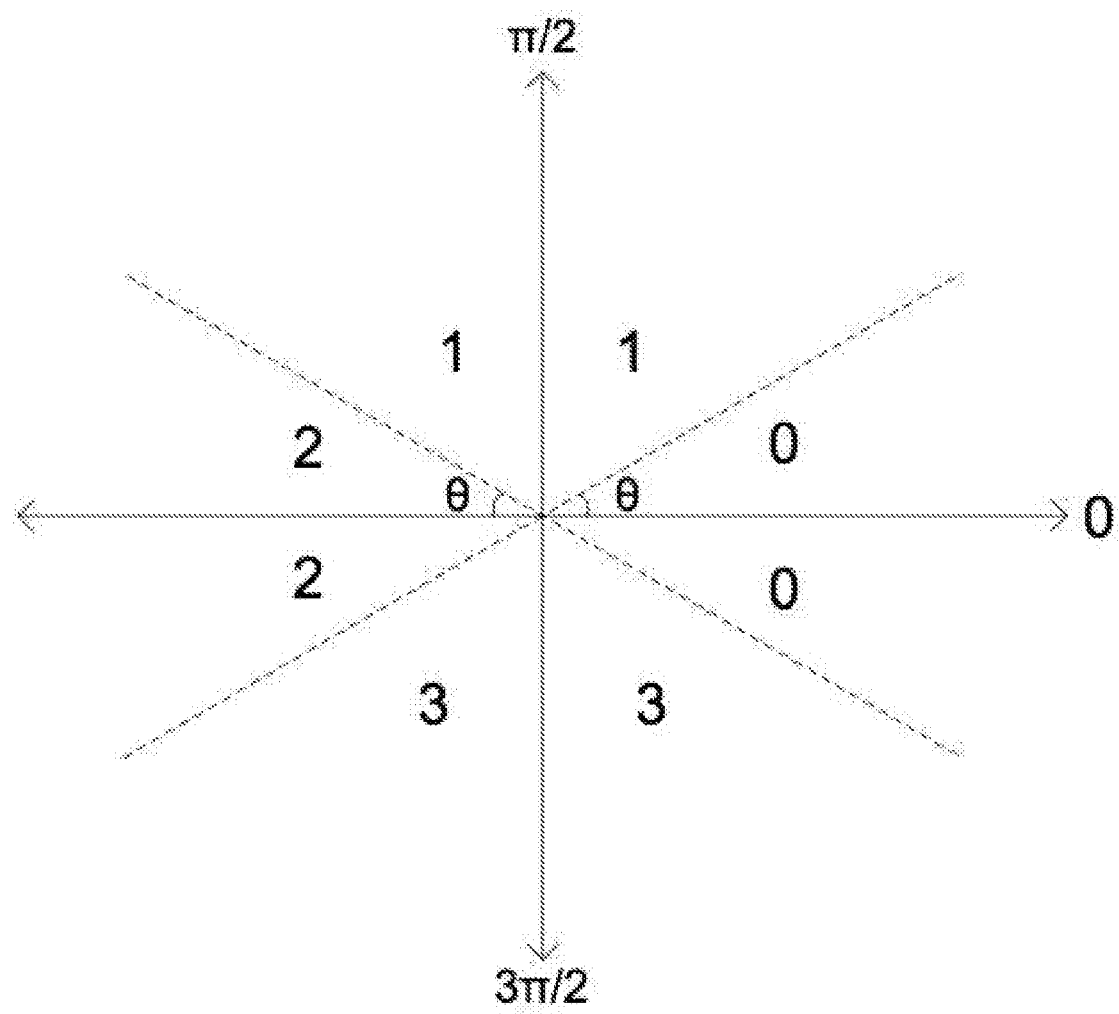
Figure 29B:
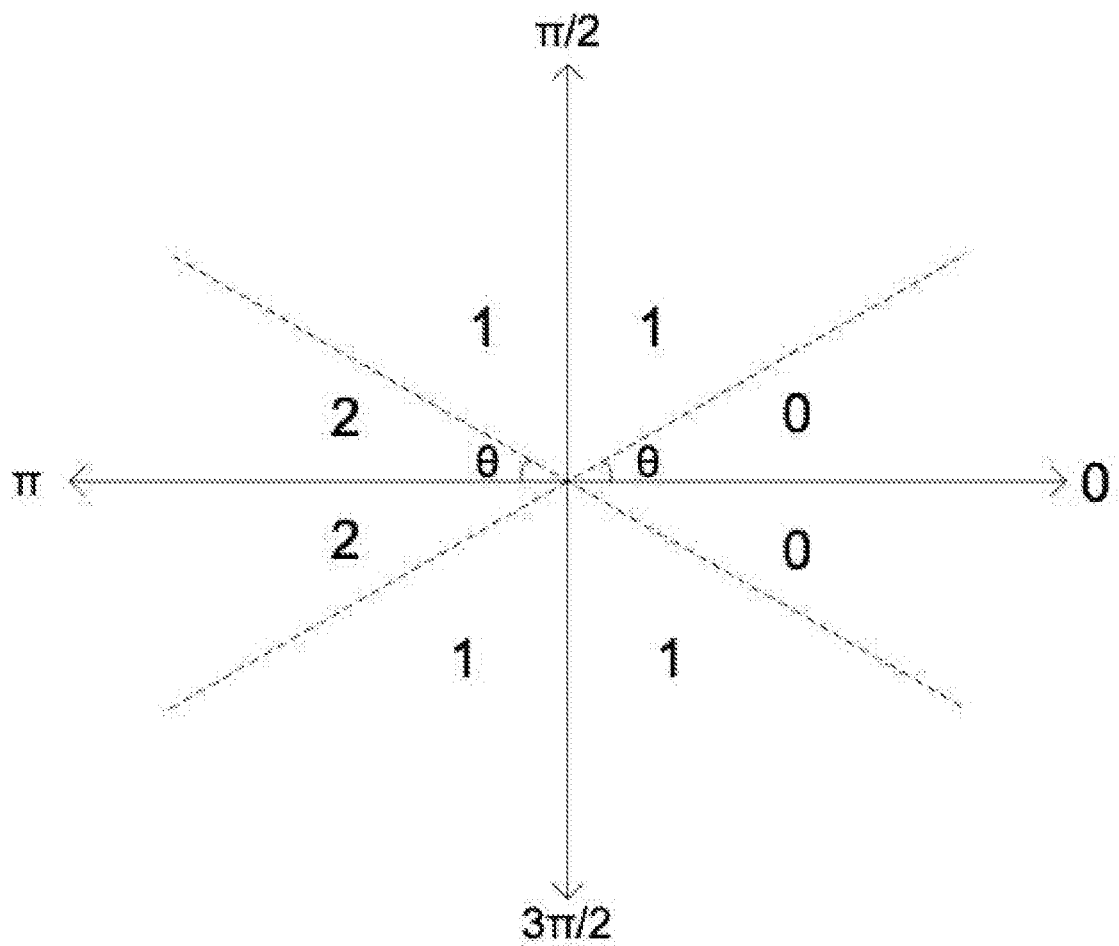

FIGS. 29a and 29b show binning structures for signed phase gradients, according to an embodiment.

The boolean parameter HOG_SIGNEDORIENTATION determines whether signed or unsigned phase gradients will be used.

(a2) Unsigned phase: The phase values greater than π are mapped to π subtracted versions. When unsigned phases are used, light to dark and dark to light transitions cannot be differentiated. Three various types of binning are tried for unsigned phase gradients. The binning types are shown below. Various θ values are tried as well.

Figure 30A:
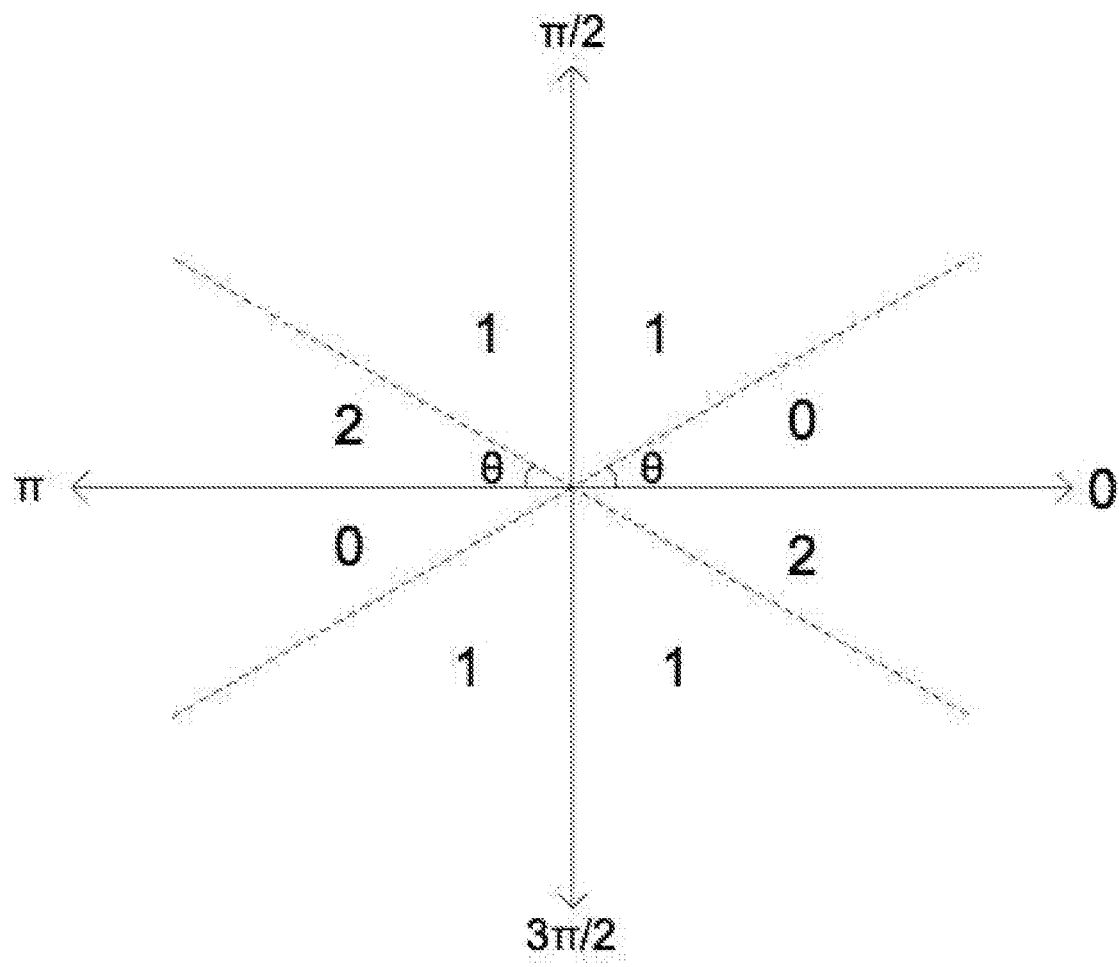
Figure 30B:
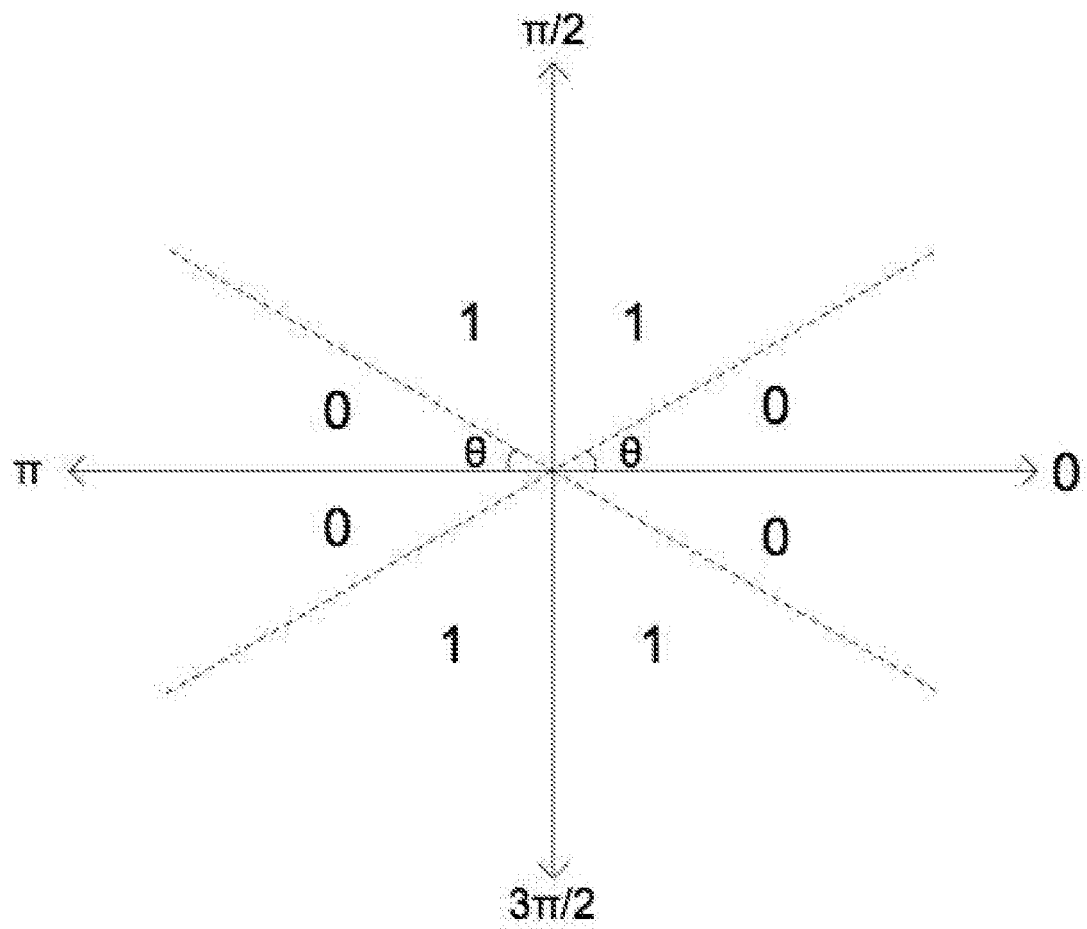
Figure 30C:
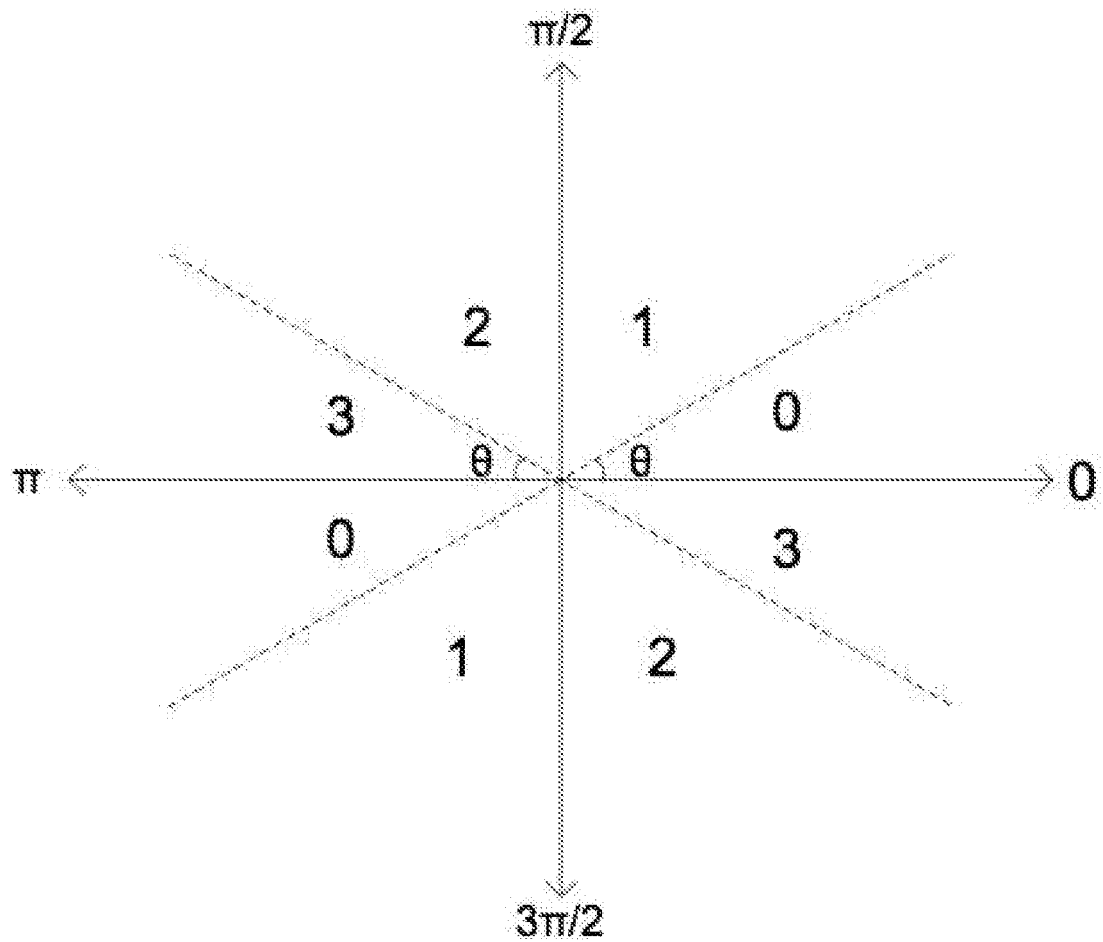

FIGS. 30a-30c show binning structures for unsigned phase gradients, according to an embodiment.

(b) Using magnitude threshold or not.

(b1) Not using magnitude threshold: every gradient $P_c(x, y)$, increases the bin its phase falls into, by its magnitude $M_c(x, y)$.

(b2) Using magnitude threshold: an extra bin—reserved for small magnitude gradients—is added to the histogram. Each of the gradients with a magnitude greater than the magnitude threshold increases the bin its phase falls into by 1. Each of the gradients with a magnitude smaller than the magnitude threshold increases the extra bin by 1. Various magnitude threshold parameters (HOG_GRADIENTMAGNITUDETHRESHOLD) are used.

Before selecting the magnitude threshold parameter, the training data is observed. The magnitude images usually do not span their entire range. Because the differences between neighboring pixels in natural images are not usually high, the gradient magnitude values tend to be smaller than the possible maximum values. For instance, when 3×3 Sobel kernels are used, the gradient magnitude images may have an intensity value of 1140 theoretically. However atypical gradient magnitude image usually has a maximum intensity of around 900.

A sample image is randomly selected to observe the magnitude image histograms.

Figure 31:
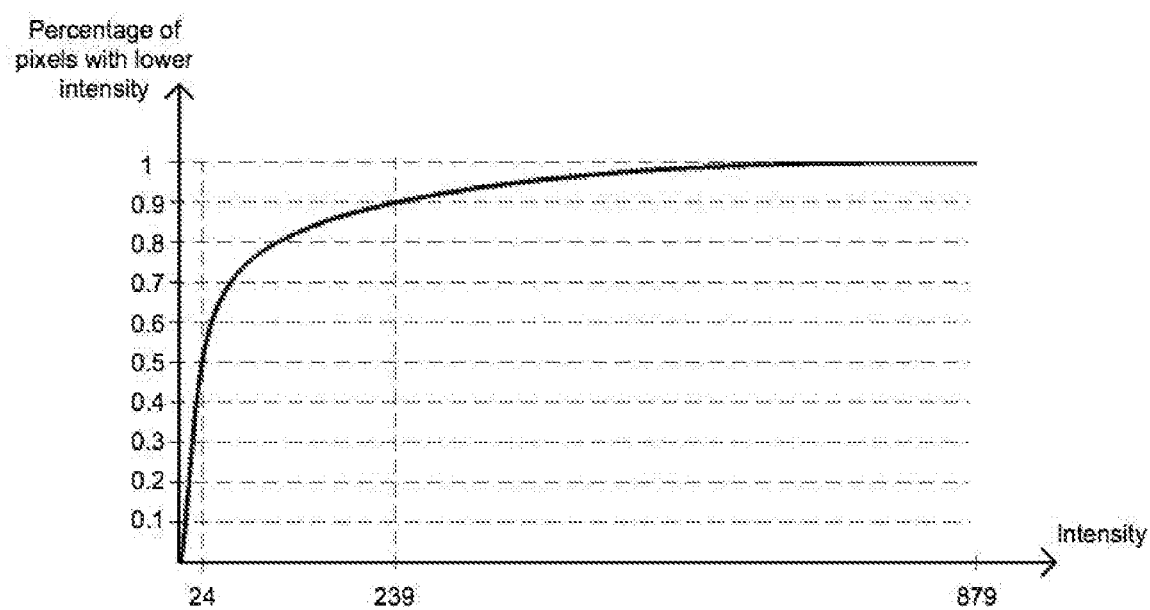

FIG. 31 shows the cumulative histogram of the magnitude image, according to an embodiment. That is, FIG. 31 is the cumulative intensity histogram of a sample magnitude image created with 3×3 Sobel kernels.

Moreover, most of the intensity values are swarmed in the lower side of the histogram. Even though the highest intensity in the sample gradient image is 879, 90 percent of the pixels have intensity values less than 239.

For an image like this, a magnitude threshold parameter of 24 will put half of the pixels in the extra bin. Thus, the selected threshold values for the gradient images created by a 3×3 Sobel kernel are 8 and 16.

When a 5×5 Sobel kernel is used, the same input image will result in a different gradient image with a different intensity range.

Figure 32:
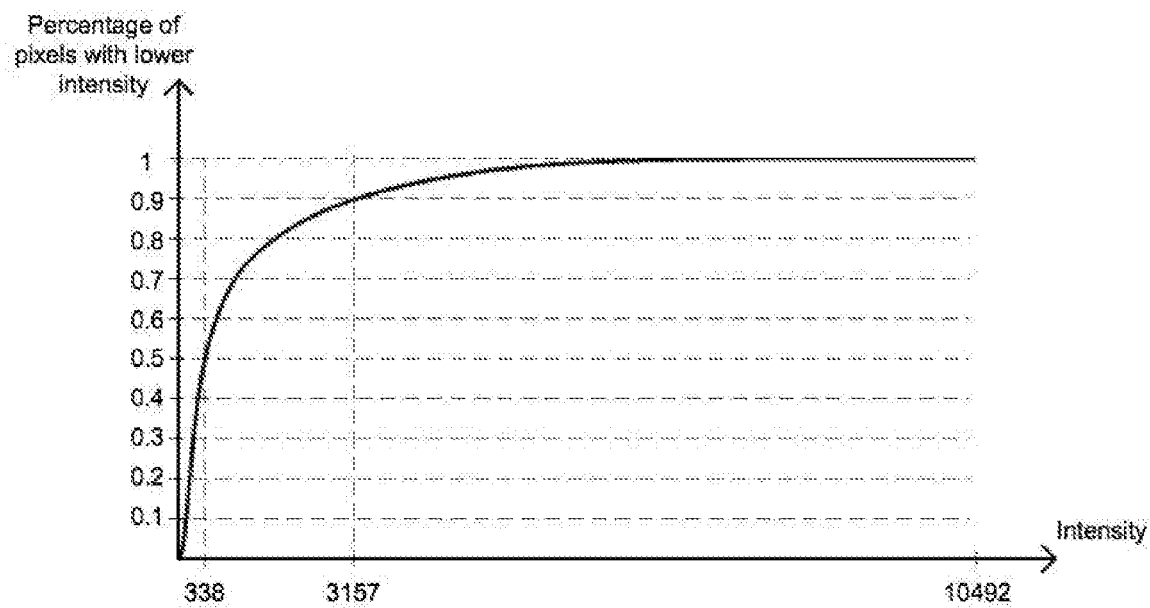

FIG. 32 is a cumulative intensity histogram of the sample magnitude image created with 5×5 Sobel kernels, and shows the cumulative histogram of the different gradient image with the different intensity range, according to an embodiment.

The selected threshold values for the gradient images created by a 5×5 Sobel kernel are 50, 96, and 150.

(5) The histograms are concatenated, forming the feature vector.

(C) Quadratic Classifier

The mean feature vectors and inverse covariance matrices are calculated for positive and negative training feature vector sets. The classifier calculates the Mahalanobis distance between the query vector and the mean vectors. A "boundariness" score is calculated by subtracting these distances.

(D) Test

Given a test image, for all columns in the image, feature vectors are calculated using the same algorithm as in the training feature vector construction stage. The feature vectors are fed into the classifier and the boundariness scores for all column indices are calculated.

Figure 33:

FIG. 33 is a sample graph of Score vs. Column Index, according to an embodiment; that is, FIG. 33 is an example "score vs. column index" graph aligned over its test image. The scores are linearly mapped to fit over the test image for visualization purposes.

The decision to declare a column as a boundary is done by processing this score signal. The steps are explained below.

(1) Smoothing

The score signal is smoothed in order to suppress noisy peaks. A box kernel of width (QUERY_SMOOTHING-SIZE) 35 is used for smoothing. A different width value of 5 is tried as well.

Figure 34A:
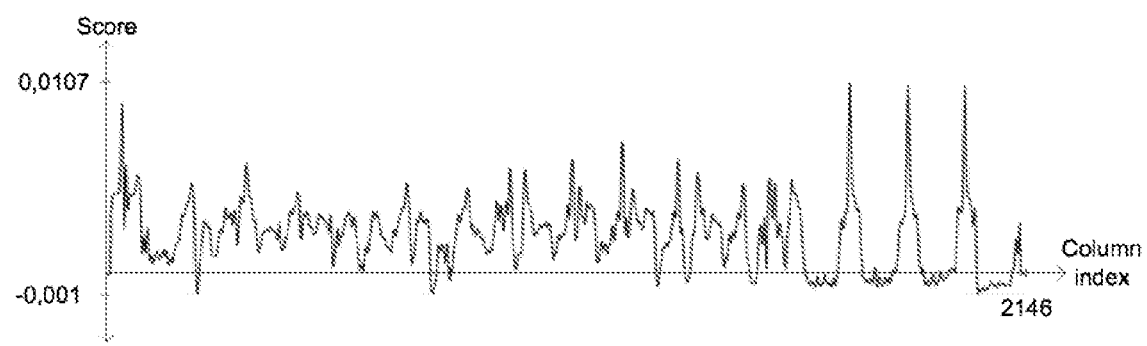

FIG. 34a is a graph of the score signal before smoothing, according to an embodiment.

Figure 34B:
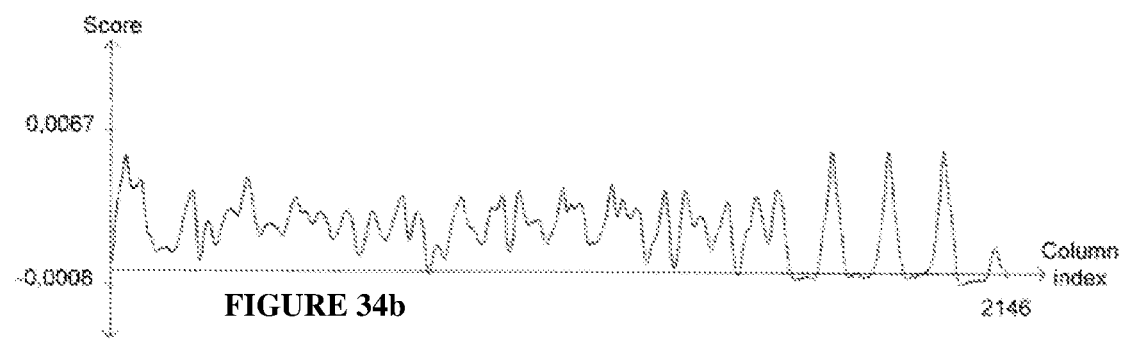

FIG. 34b is a graph of the score signal after smoothing, according to an embodiment.

(2) Normalization

The smoothed score values are normalized to span the interval [0,1]. The linear mapping is score−minScore/maxScore−minScore where maxScore and minScore are minimum and maximum values of the smoothed score signal.

Figure 35:
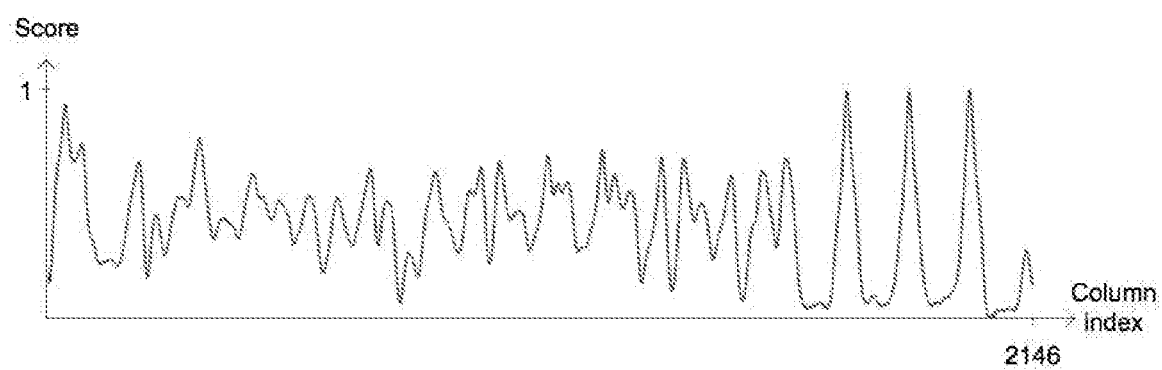

FIG. 35 is a graph of the score signal after normalization, according to an embodiment.

Figure 36:
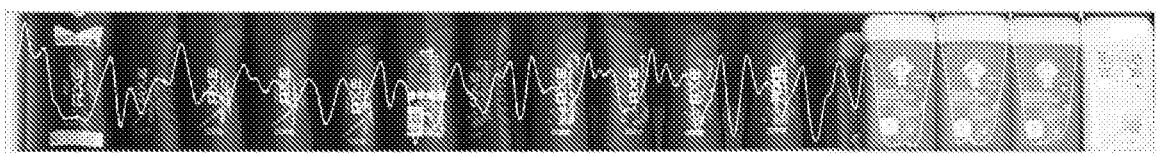

FIG. 36 is a graph of the normalized score signal overlaying a test image, according to an embodiment.

(3) Adaptive thresholding

In some cases, a shelf image consists of a single type of product. For such cases, a global threshold is suitable since the peak scores created by same type of product edges tend to be similar. However in some cases, shelf images consist of multiple types of products. For such cases, a global threshold may not be suitable since the peak scores created by different product edges may be very different. In the shelf images with multiple product types, the same types of products are located together. With this assumption, the adaptive threshold signal is found by implementing a normalized box low-pass filter to the normalized score signal. The width of the low-pass filter is selected as one third of the width of the query image. Later, the adaptive threshold values are amplified by a multiplier. Various amplifier values (ADAPTIVECONFIDENCETHRESHOLDMULTIPLIER) are tried such as 0.5, 1, 1.1 etc.

The score values smaller than the corresponding adaptive threshold values are set to zero.

(4) Fixed thresholding

In order to suppress the peaks with low scores, a fixed threshold is implemented on the adaptive-thresholded score signal. The fixed value (FIXEDCONFIDENCETHRESHOLD) is selected as 0.3. Various threshold values are tried as well such as 0.1, 0.5, and 0.9.

Figure 37:
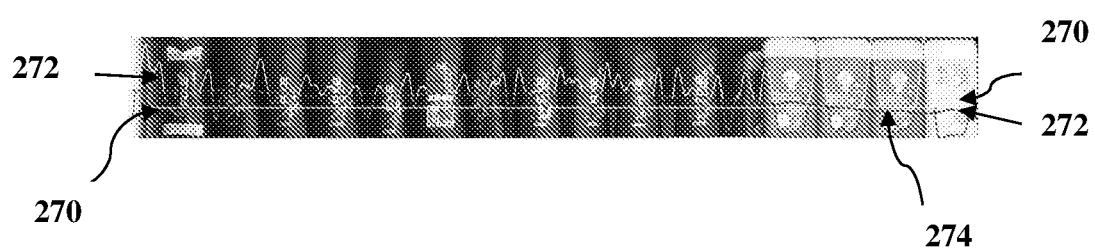

FIG. 37 is a graph of fixed threshold 270 of 0.3 and an adaptive threshold 272 (without amplifier, amplifier=1), aligned over the normalized score signal, and the score values smaller than the corresponding adaptive threshold values are set to zero, according to an embodiment. The scores eliminated by the thresholds are represented by curves 274.

(5) Peak detection with non-maximum suppression

After thresholding, the peaks are detected by non-maximal suppression. Firstly, the values which are the maximums of their neighborhoods are found by comparing the gray level dilated version of the signal. Secondly, the maximums which are also the minimums of their neighborhoods (plateaus regions) are suppressed. This is done by comparing the gray level eroded version of the signal. The neighborhood width (MAXIMANBSIZE) is chosen as 50. Various values are tried as well.

Before selecting the neighborhood width parameter, the training data is observed.

Figure 38:
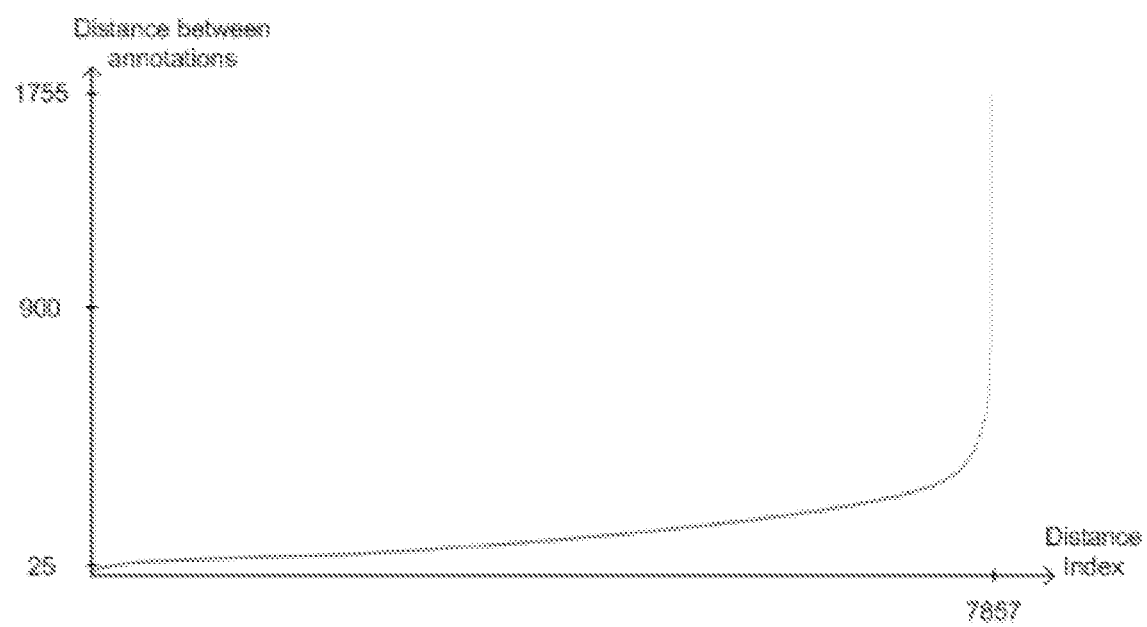

FIG. 38 is a graph of the sorted distances between the training annotations (after normalized to fit over the resized image) in 1000 random training images, according to an embodiment.

Among 7857 distances, 130 of them are smaller than 25. Thus, selecting the neighborhood width parameter as 50 will discard approximately 130 true peaks.

Selecting a larger neighborhood width will result in more number of wrongly suppressed peaks.

A smaller neighborhood width will result in a less effective suppression.

Figure 39:
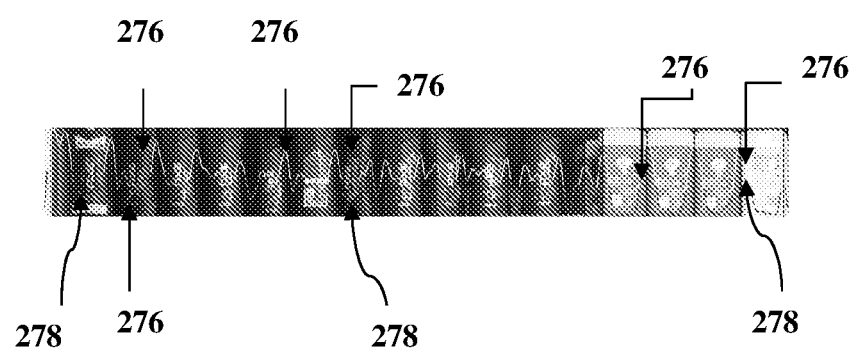

FIG. 39 is a graph of the detected peak indices 276 after non maximum suppression overlaying an image of products on a shelf, according to an embodiment. The curves 278 represent scores that are mapped to zero.

The column indices where a peak is detected are declared as detected boundaries.

(E) Test Result Evaluation

Figure 40:
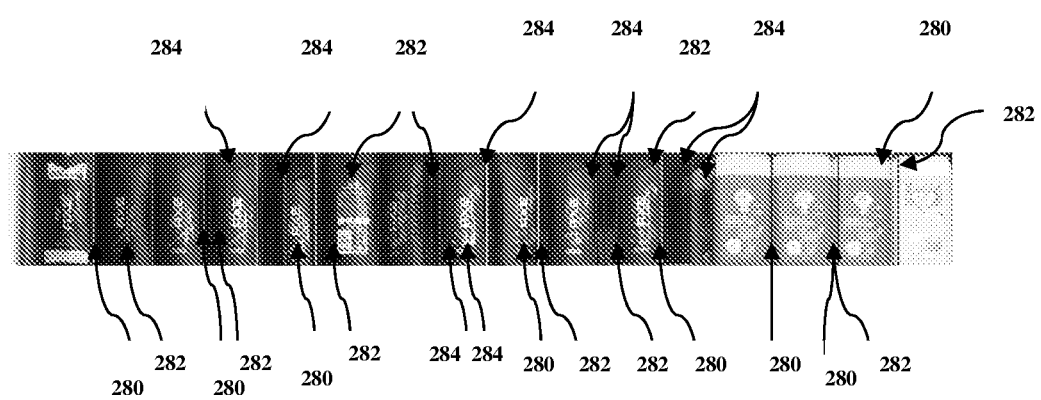

FIG. 40 is a graph of true boundaries and detected boundaries overlaying an image of products on a shelf.

After a test image is tested, the detected peaks are compared to the ground truth (hand annotated test boundaries). If at least one true boundary is present in a neighborhood of a detected peak, it is accepted as true positive 280). If there is none, the detection is deemed as false positive 282. The ground truth column annotations are labeled 284. The neighborhood half width (truePosCriteriaWindowSize) is selected same as the half width parameter in Step (B).

After all the query images are tested, the recall and precision of the detection system is calculated as:

$$\text{Recall} = \frac{\text{number of true positives}}{\text{number of true boundaries}}$$

$$\text{Precision} = \frac{\text{number of true positive}}{\text{number of detected boundaries}}$$

Also the F measure is calculated as the harmonic mean of precision and recall values.

(F) Performance (1) Dataset 1

Initial implementations are performed on a set with 522 images and corresponding annotation lists. This set is used as a training and test set at the same time. An Initial set of parameters is chosen as below.

| | |
|---|---|
| WINDOWSIZE | 15 |
| SAFETYPARAMETER | 0.5 |
| HOG_VERTICALEDGEANGLE | 45 |
| HOG_STRIPEWIDTH | 16 |
| HOG_CELLSPERROW | 2 |
| HOG_CELLSPERCOL | 1 |
| HOG_NUMBEROFBINS | 4 |
| HOG_GRADIENTMAGNITUDETHRESHOLD | 0 |
| HOG_SIGNEDORIENTATION | true |
| SOBEL_SIZE | 3 |
| ADAPTIVECONFIDENCETHRESHOLDMULTIPLIER | 0 |
| QUERY_SMOOTHINGSIZE | 5 |
| QUERY_MAXIMANBSIZE | 60 |
| truePosCriteriaWindowSize | 15 |

Different "FIXEDCONFIDENCETHRESHOLD" values are tried and below performance measures are attained. As expected precision increased with higher threshold while recall decreased.

| FIXEDCONFIDENCETHRESHOLD | 0.7 | 0.6 | 0.55 | 0.45 |
|---|---|---|---|---|
| Number of true boundaries | 4201 | 4201 | 4201 | 4201 |
| Number of detected boundaries | 2632 | 3506 | 3906 | 4592 |
| Number of true positive | 1984 | 2596 | 2872 | 3291 |
| Precision | 75.38% | 74.04% | 73.53% | 71.67% |
| Recall | 47.23% | 61.79% | 68.36% | 78.34% |
| F | 58.07% | 67.37% | 70.85% | 74.85% |

When "HOG_GRADIENTMAGNITUDETHRESHOLD" is set to 8, below performance measures are attained for different "FIXEDCONFIDENCETHRESHOLD" values.

| FIXEDCONFIDENCETHRESHOLD | 0.7 | 0.45 | 0.3 |
|---|---|---|---|
| Number of true boundaries | 4201 | 4201 | 4201 |
| Number of detected boundaries | 2590 | 4457 | 5124 |
| Number of true positive | 1976 | 3260 | 3566 |
| Precision | 76.29% | 73.14% | 69.59% |
| Recall | 47.04% | 77.60% | 84.88% |
| F | 58.19% | 75.31% | 76.48% |

When "HOG_GRADIENTMAGNITUDETHRESHOLD" is set to 16, below performance measures are attained for different "FIXEDCONFIDENCETHRESHOLD" values.

| FIXEDCONFIDENCETHRESHOLD | 0.7 | 0.45 |
|---|---|---|
| Number of true boundaries | 4201 | 4201 |
| Number of detected boundaries | 2473 | 4318 |
| Number of true positive | 1910 | 3173 |
| Precision | 77.23% | 73.48% |
| Recall | 45.47% | 75.53% |
| F | 57.24% | 74.49% |

When "HOG_VERTICALEDGEANGLE" is changed to 30, and "FIXEDCONFIDENCETHRESHOLD" is set to 0.45 different performance measures are attained for different "GRADIENTMAGNITUDETHRESHOLD" values.

| GRADIENTMAGNITUDETHRESHOLD | 0 | 8 | 16 |
|---|---|---|---|
| Number of true boundaries | 4201 | 4201 | 4201 |
| Number of detected boundaries | 4373 | 4162 | 4015 |
| Number of true positive | 3160 | 3081 | 2984 |
| Precision | 72.26% | 74.03% | 74.32% |
| Recall | 75.22% | 73.34% | 71.03% |
| F | 73.71% | 73.68% | 72.64% |

In later trials "SOBEL_SIZE" is set as 5, "FIXEDCONFIDENCETHRESHOLD" is set as 0.45 and "HOG_GRADIENTMAGNITUDETHRESHOLD" is set as 96. Different performance measures are attained for different "QUERY_SMOOTHINGSIZE" and "SAFETYPARAMETER" values.

| SAFETYPARAMETER | 0.5 | 0.5 | 0.9 | 0.9 |
|---|---|---|---|---|
| QUERY_SMOOTHINGSIZE | 5 | 35 | 5 | 35 |
| Number of true boundaries | 4201 | 4201 | 4201 | 4201 |
| Number of detected boundaries | 3974 | 3958 | 4197 | 4194 |
| Number of true positive | 2987 | 2972 | 3152 | 3150 |
| Precision | 75.16% | 75.09% | 75.10% | 75.11% |
| Recall | 71.10% | 70.75% | 75.03% | 74.98% |
| F | 73.08% | 72.85% | 75.07% | 75.04% |

When "QUERY_SMOOTHINGSIZE" is set as 35 and "SAFETYPARAMETER" is set as 0.9, different performance measures are attained for different "HOG_GRADIENTMAGNITUDETHRESHOLD".

| HOG_GRADIENTMAGNITUDETHRESHOLD | 0 | 50 |
|---|---|---|
| Number of true boundaries | 4201 | 4201 |
| Number of detected boundaries | 4343 | 4200 |
| Number of true positive | 3176 | 3150 |
| Precision | 73.13% | 75.00% |
| Recall | 75.60% | 74.98% |
| F | 74.34% | 74.99% |

Total training time with 522 images is 35 seconds and total test time of 522 images is 50 seconds. Test and training times are independent of the parameters.

(2) Dataset 2

Dataset 2 is selected to form a test set. 4 training sets are formed with 500, 1000, 2000, 4000, 10000, and 20000 random images. Test and training sets are discrete sets.

Set of parameters are chosen as below.

| WINDOWSIZE | 16 |
|---|---|
| SAFETYPARAMETER | 0.9 |
| HOG_VERTICALEDGEANGLE | 30 |
| HOG_STRIPEWIDTH | 16 |
| HOG_CELLSPERROW | 2 |
| HOG_CELLSPERCOL | 1 |
| HOG_NUMBEROFBINS | 4 |
| HOG_GRADIENTMAGNITUDETHRESHOLD | 50 |
| HOG_SIGNEDORIENTATION | true |
| SOBEL_SIZE | 5 |

-continued

| FIXEDCONFIDENCETHRESHOLD | 0.3 |
|---|---|
| ADAPTIVECONFIDENCETHRESHOLDMULTIPLIER | 0 |
| QUERY_SMOOTHINGSIZE | 35 |

-continued

| | |
|---|---|
| QUERY_MAXIMANBSIZE | 60 |
| truePosCriteriaWindowSize | 16 |

Different performance measures are attained for different training sets.

| Training set size | 500 | 1000 | 2000 | 4000 | 10000 | 20000 |
|---|---|---|---|---|---|---|
| Number of true boundaries | 43450 | 43450 | 43450 | 43450 | 43450 | 43450 |
| Number of detected boundaries | 46618 | 46195 | 46650 | 46688 | 46631 | 46534 |
| Number of true positive | 32549 | 32170 | 32138 | 32300 | 32287 | 32239 |
| Number of false positive | 14069 | 14025 | 14512 | 14388 | 14344 | 14295 |
| False positive per test image | 2.81 | 2.81 | 2.90 | 2.88 | 2.87 | 2.86 |
| Precision | 69.82% | 69.64% | 68.89% | 69.18% | 69.24% | 69.28% |
| Recall | 74.91% | 74.04% | 73.97% | 74.34% | 74.31% | 74.20% |
| F | 72.28% | 71.77% | 71.34% | 71.67% | 71.68% | 71.65% |

Precision and recall vs. "FIXEDCONFIDENCETH-RESHOLD" is different.

| FIXEDCONFIDENCETHRESHOLD | 0.2 | 0.3 | 0.35 | 0.5 | 0.6 | 0.75 | 0.8 | 0.85 | 0.95 | 0.98 |
|---|---|---|---|---|---|---|---|---|---|---|
| Precision (%) | 62.90 | 69.82 | 72.55 | 78.63 | 80.91 | 82.92 | 83.30 | 83.25 | 82.16 | 81.43 |
| Recall (%) | 78.05 | 74.91 | 72.52 | 62.16 | 52.05 | 34.19 | 22.34 | 22.34 | 12.64 | 10.48 |

Figure 41:
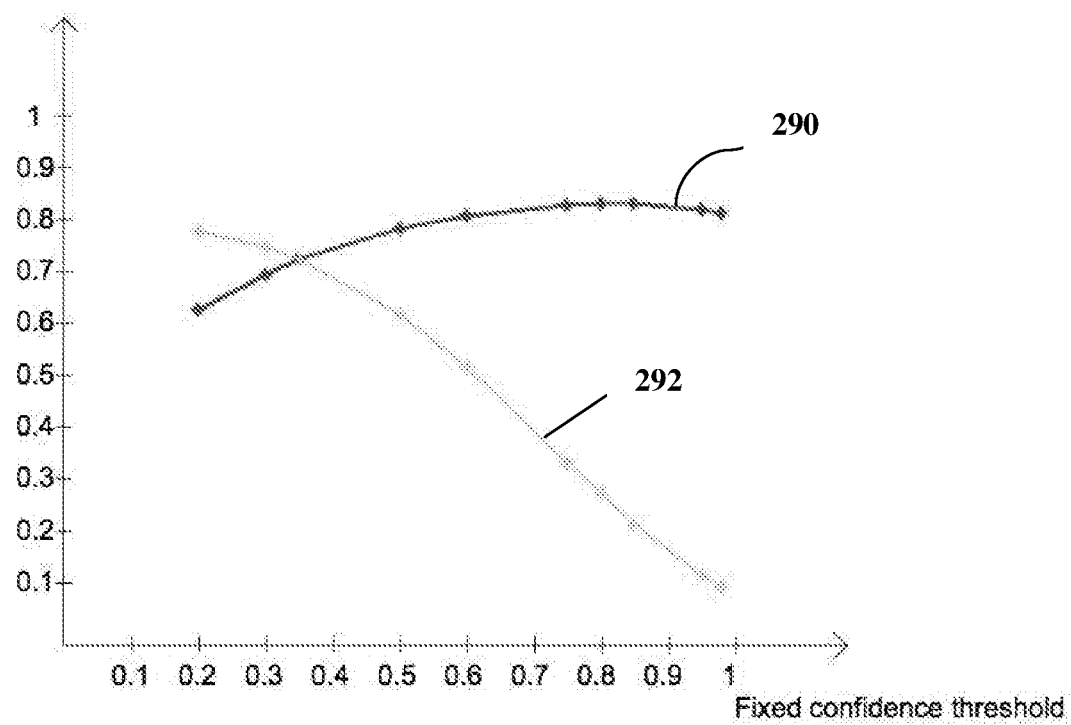
Figure 42A:
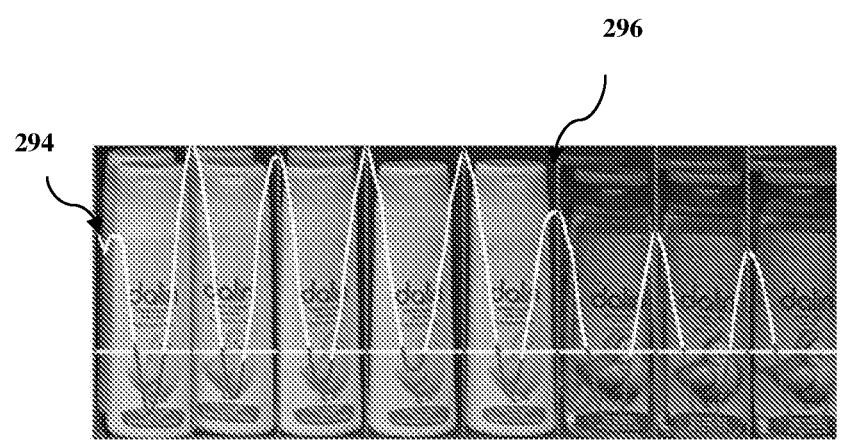
Figure 42B:
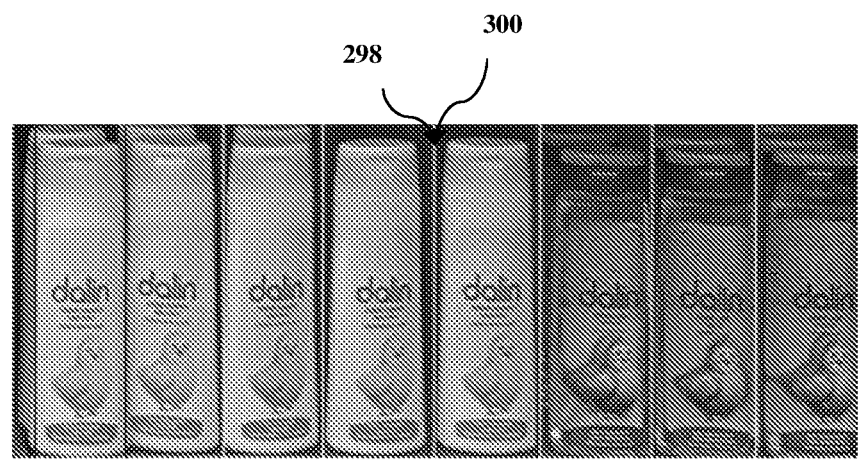
Figure 43A:
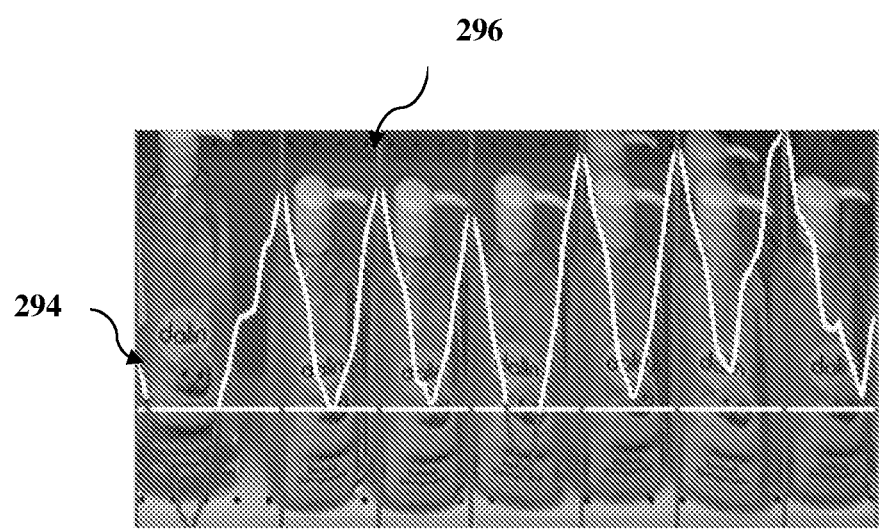
Figure 43B:
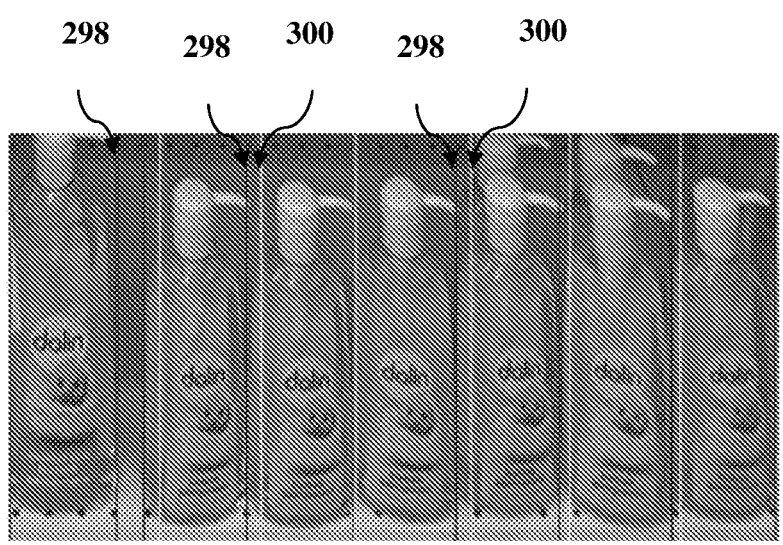
Figure 44A:
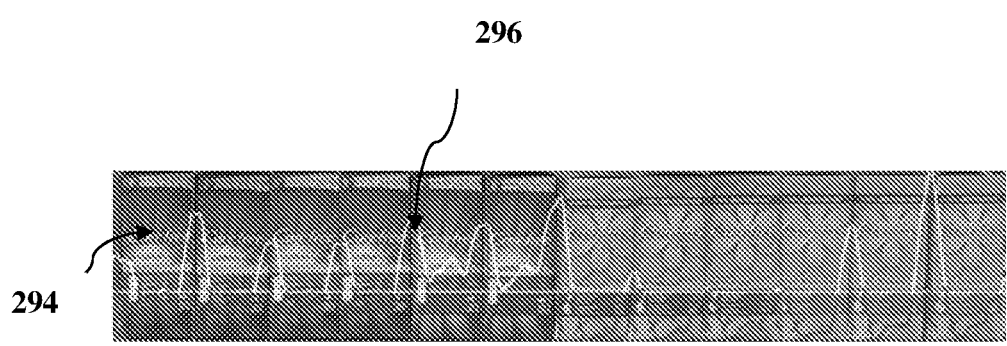
Figure 44B:
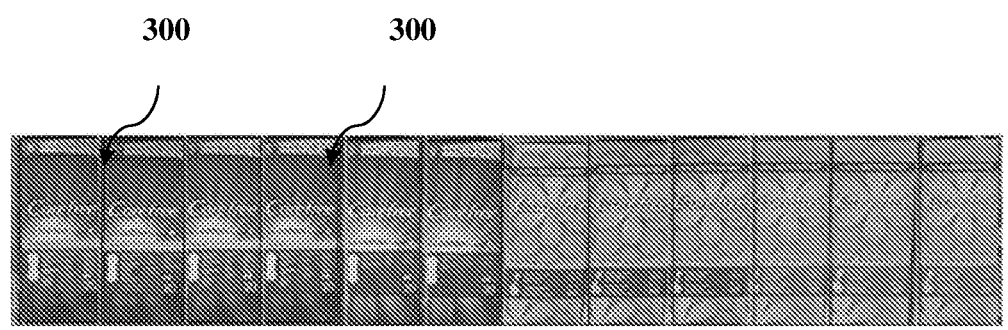
Figure 45A:
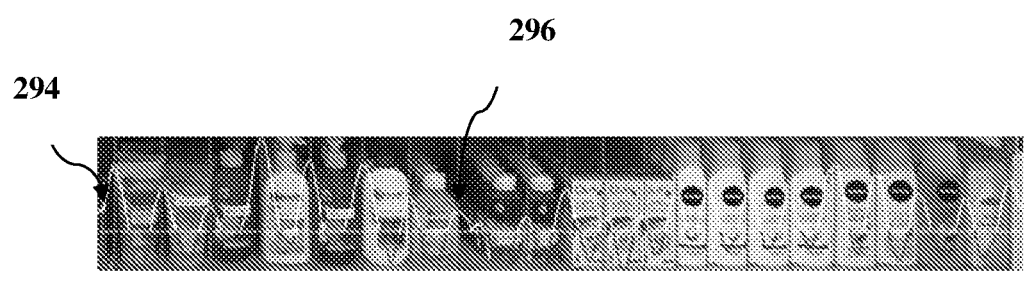
Figure 45B:
Figure 46A:
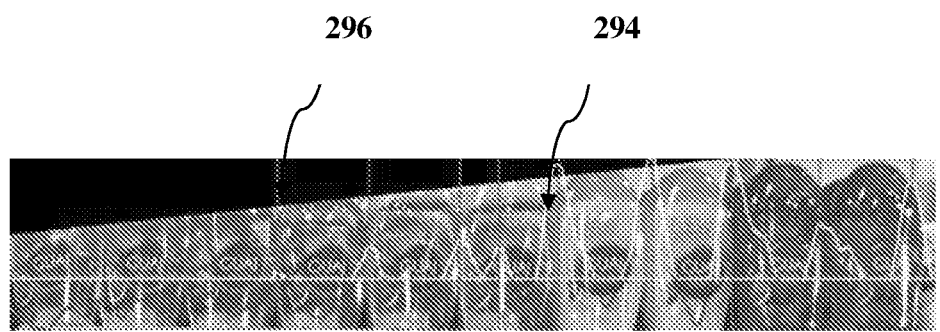
Figure 46B:
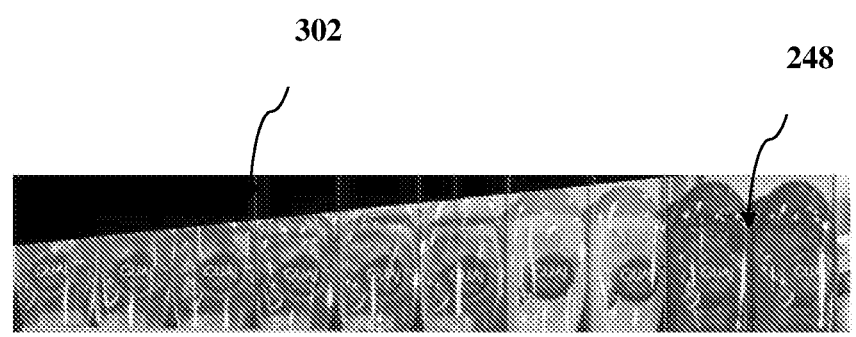
Figure 47A:
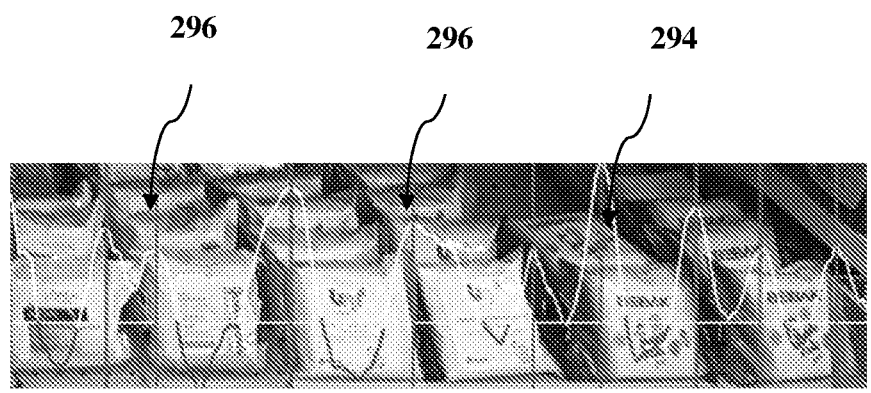
Figure 47B:
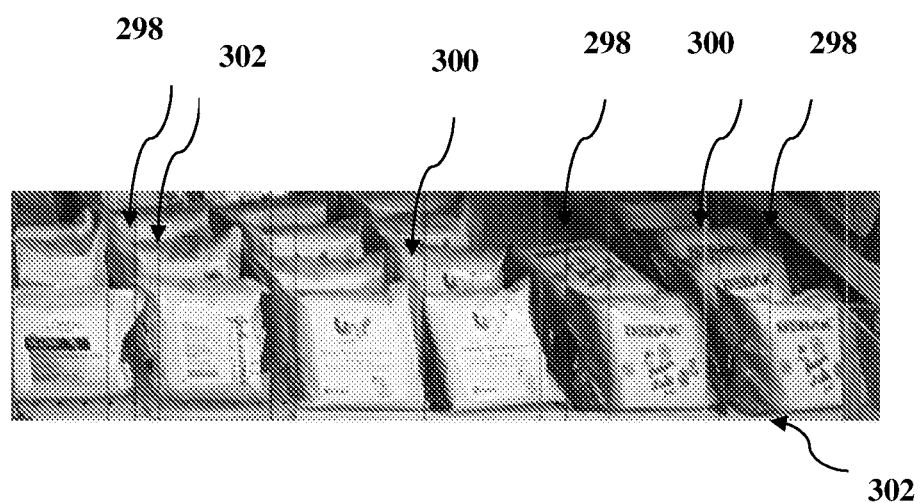
Figure 48A:
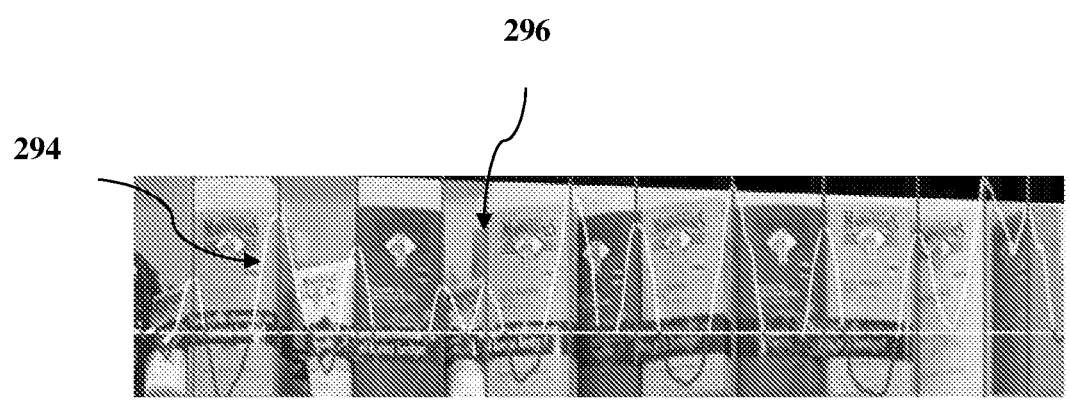
Figure 48B:
Figure 49A:
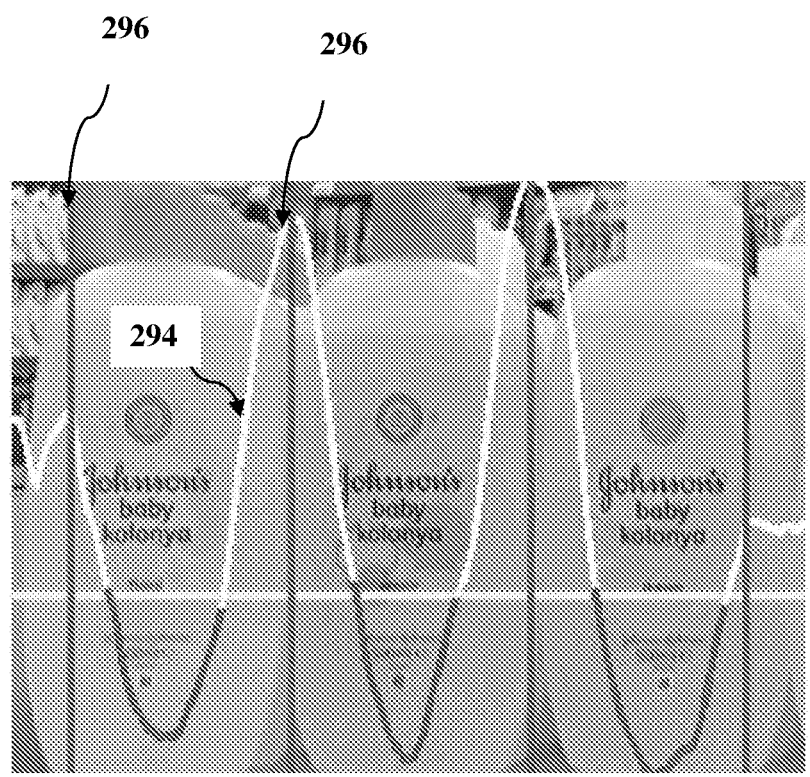
Figure 49B:
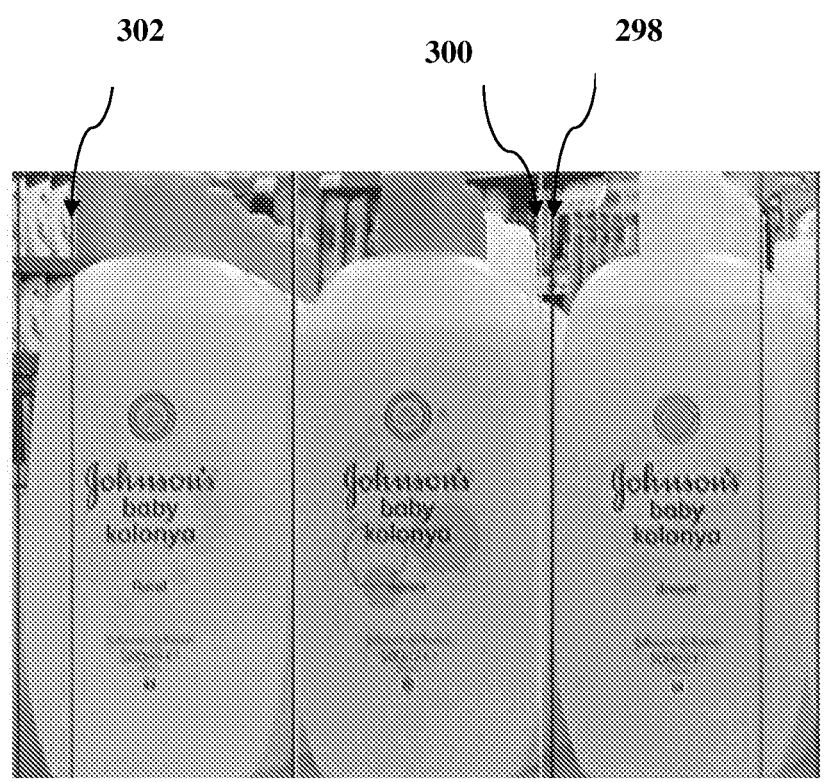
Figure 50A:
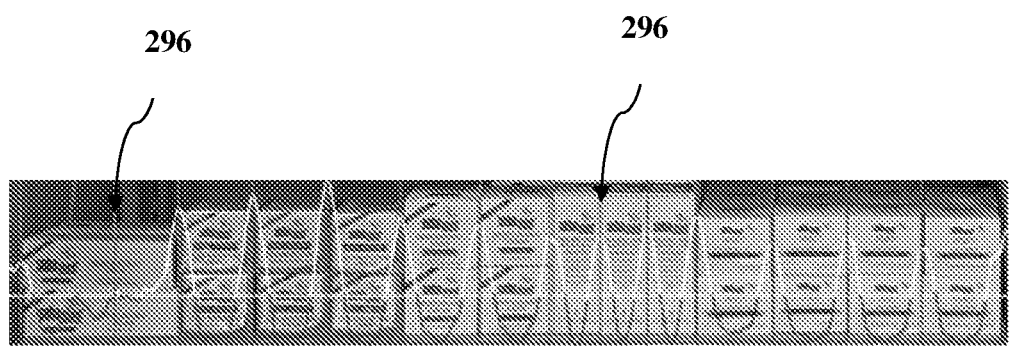
Figure 50B:
Figure 51A:
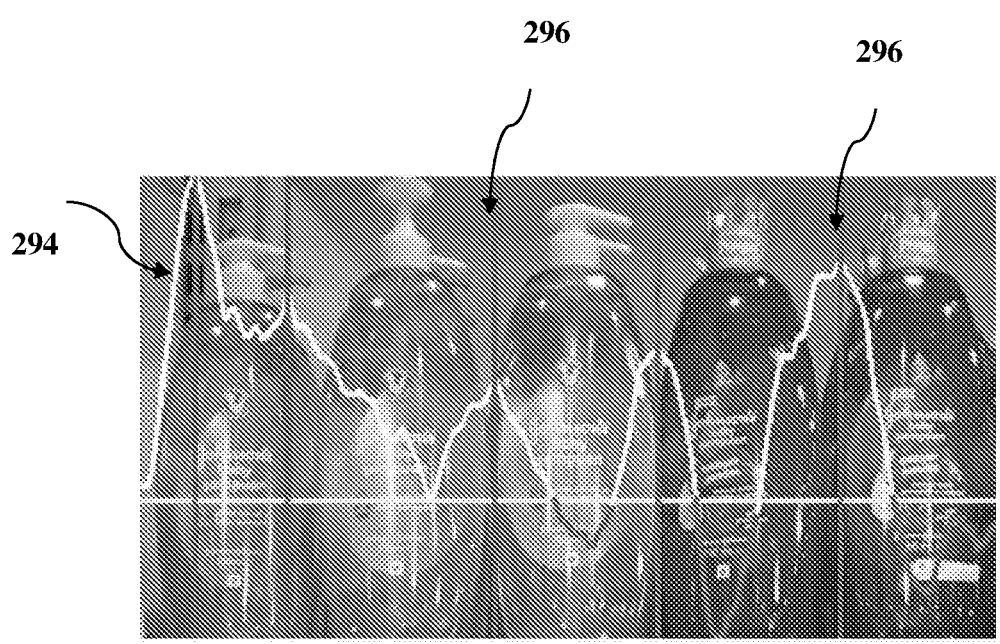
Figure 51B:
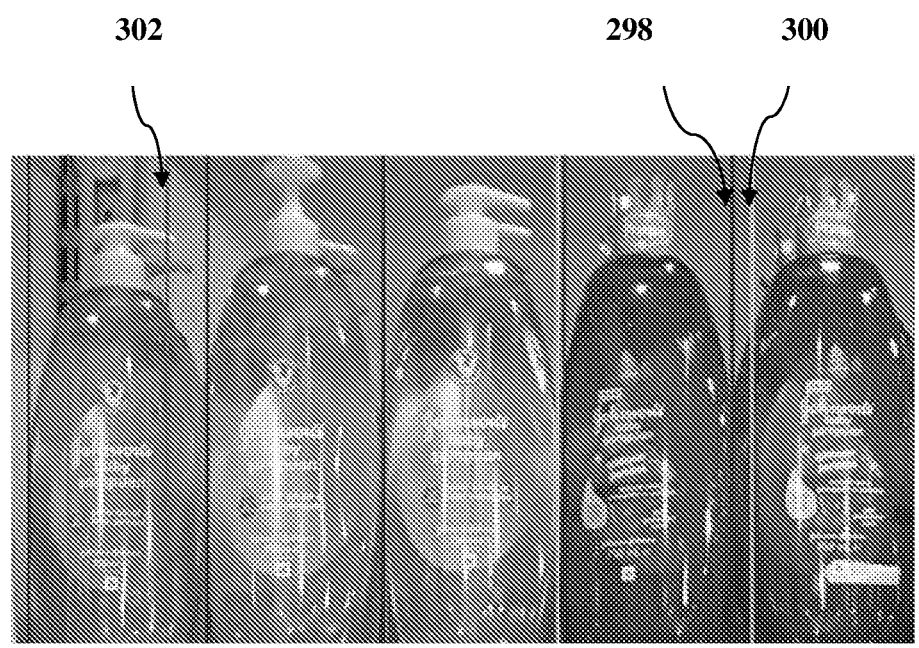
Figure 52A:
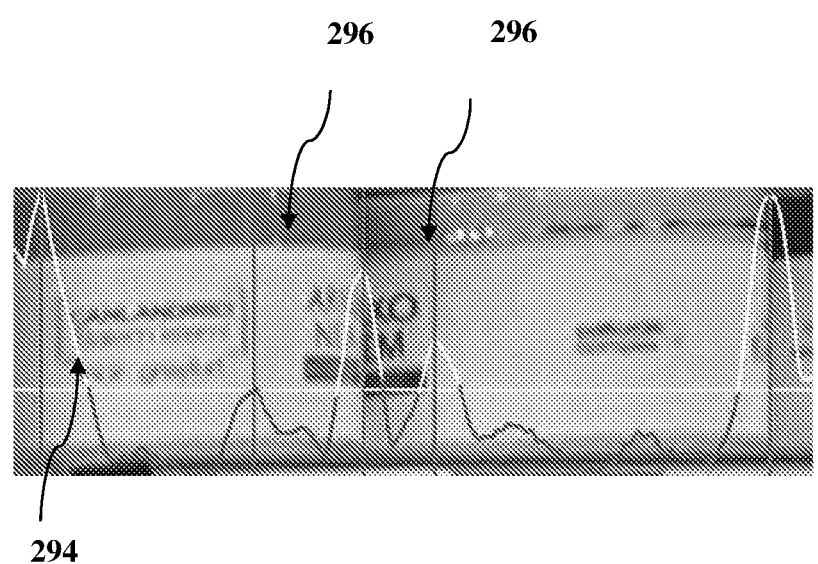
Figure 52B:
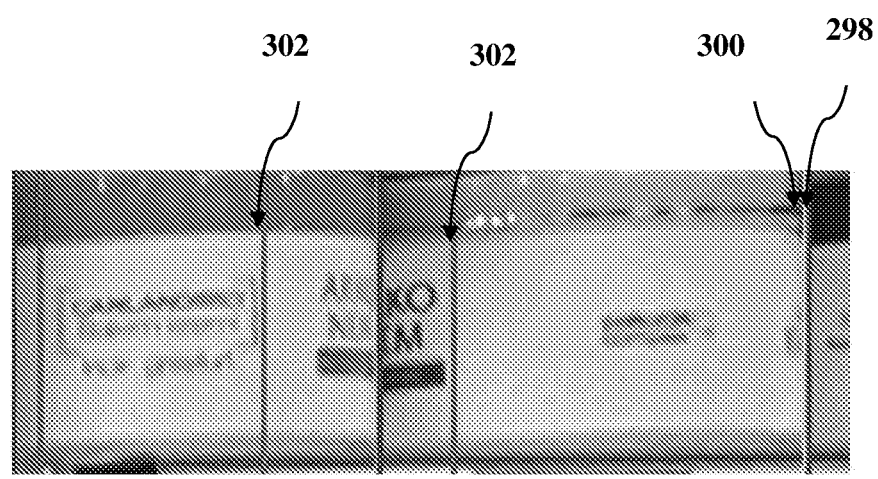
Figure 53A:
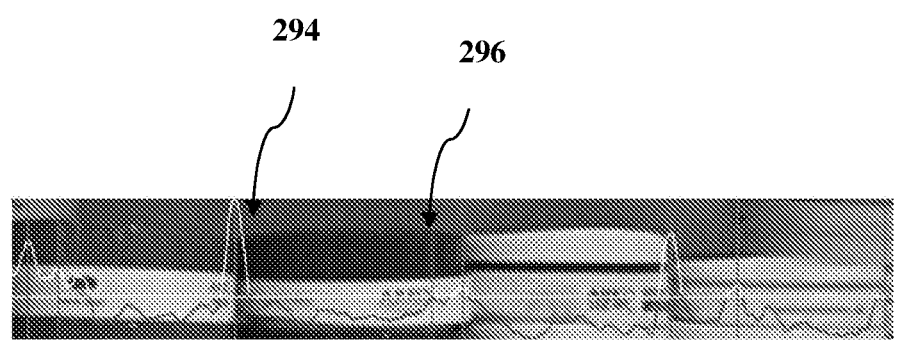
Figure 53B:
Figure 54A:
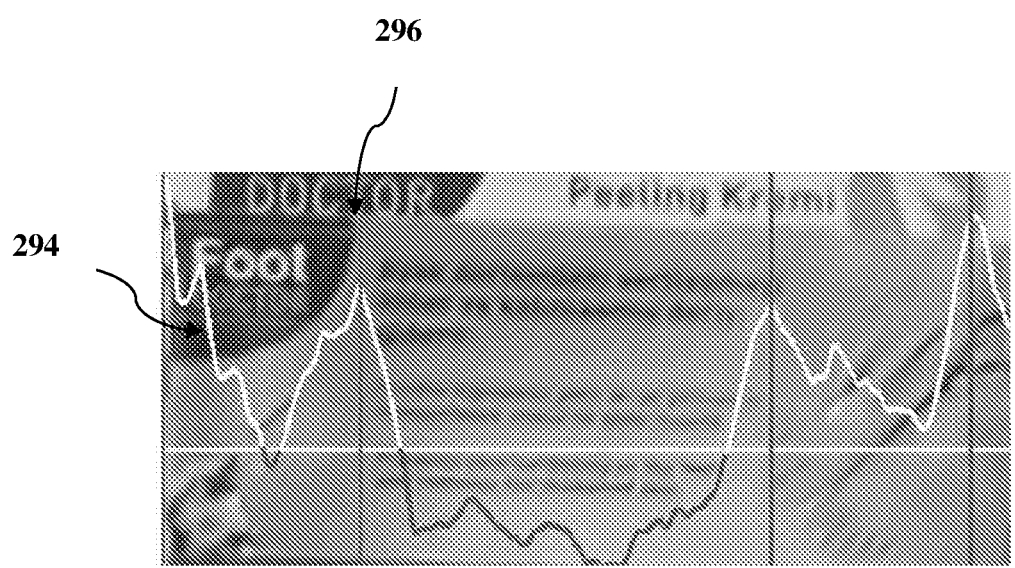
Figure 54B:
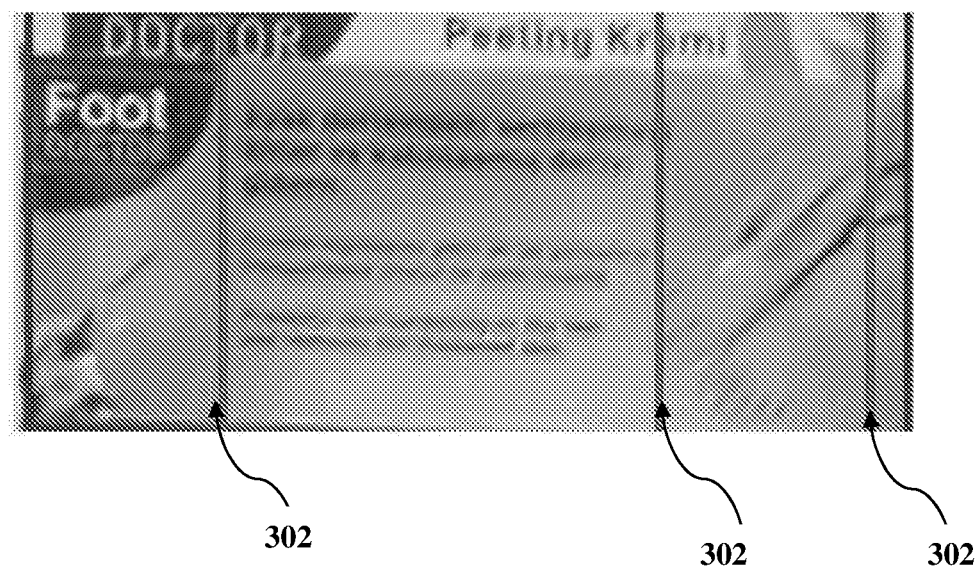
Figure 55A:
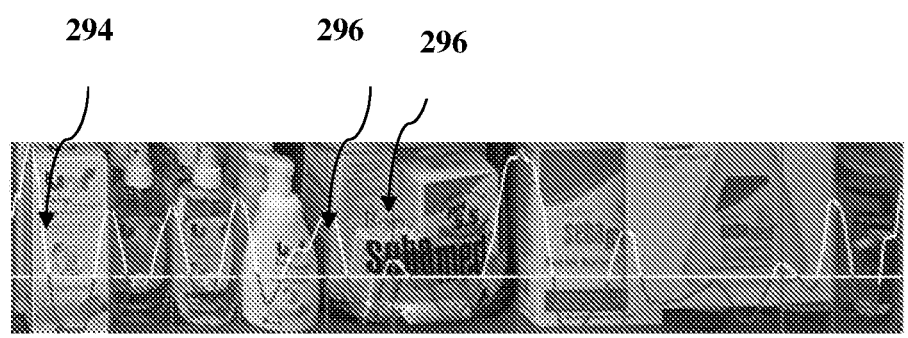
Figure 55B:
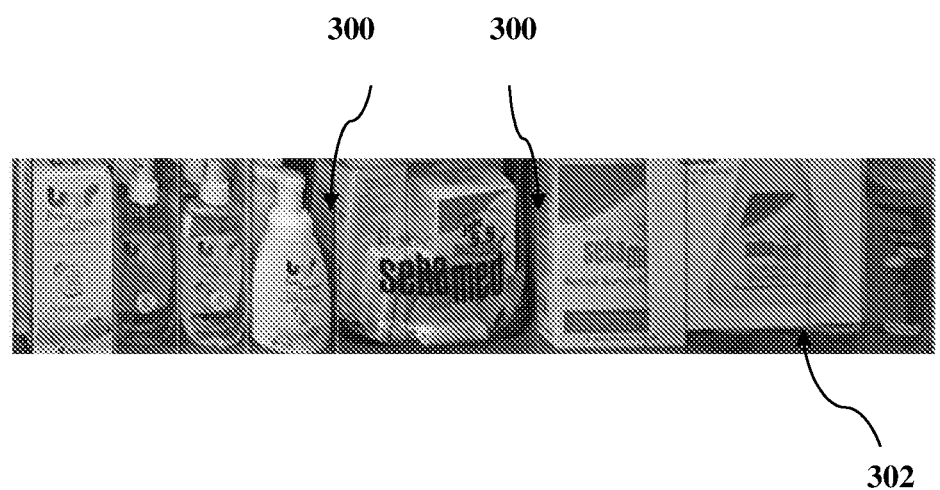

FIG. 41 is a graph of the precision values 290 and the recall values 292 vs. FIXEDCONFIDENCETHRESHOLD.

(F) Discussion

The algorithm uses a lot of parameters and determining the optimal bundle takes time since there are thousands of parameter combinations. The highest performance (precision, recall and F scores of 75%) is attained with the set of parameters below used.

| | |
|---|---|
| WINDOWSIZE | 15 |
| HOG_VERTICALEDGEANGLE | 30 |
| SAFETYPARAMETER | 0.9 |
| HOG_GRADIENTMAGNITUDETHRESHOLD | 96 |
| FIXEDCONFIDENCETHRESHOLD | 0.45 |
| HOG_VERTICALEDGEANGLE | 45 |
| HOG_STRIPEWIDTH | 16 |
| HOG_CELLSPERROW | 2 |
| HOG_CELLSPERCOL | 1 |
| HOG_NUMBEROFBINS | 4 |
| HOG_SIGNEDORIENTATION | true |
| SOBEL_SIZE | 5 |
| ADAPTIVECONFIDENCETHRESHOLDMULTIPLIER | 0 |
| QUERY_SMOOTHINGSIZE | 5 |
| QUERY_MAXIMANBSIZE | 60 |
| truePosCriteriaWindowSize | 15 |

It is observed that increasing the training set size typically does not help attain a higher performance FIGS. 42a-55b are of images and illustrate some test results, according to an embodiment. The first figure of each pair of figures include a respective score signal 294 and respective detected boundaries 296. The second figure of each pair of figures includes the true boundaries 298, detected true boundaries (true positive) 300, and detected false boundaries (false positive) 302. Some figures may not include all types of boundaries, or boundaries (e.g., true boundaries 298 and detected true boundaries 300) may overlap, and, therefore, appear as a single boundary.

(G) Alternate Embodiments

Referring to FIGS. 42a-55b, different "ADAPTIVECONFIDENCETHRESHOLDMULTIPLIER" and different multiplies can be tried. Furthermore, a "smarter" classifier such as SVM could be implemented. Instead of a binary classification (boundary and non-boundary), a four class classification (background to object boundary, object to background boundary, object to object boundary and non-boundary) could be used. Moreover, shelf-boundary detection could be used to extract discrete shelves from a shelf scene image. In addition, a paper that describes an HOG algorithm for human detection is N. Dalai and B. Triggs, *Histograms of Oriented Gradients for Human Detection*, CVPR, pp. 866-893, 2005, https://goo.gl/yrMGBZ.

FIGS. 56-61 are images and diagrams that describe a CNN algorithm that the descriptor circuit 80 and the comparison circuit 82 (FIG. 6) can be configured to implement to generate visual descriptors, and to classify, statistically, the visual descriptors to generate a boundary score, according to an embodiment.

The described Convolutional Neural Network (CNN) simultaneously "learns" the visual descriptors of image windows and the statistical classifier that separates them.

Figure 56:
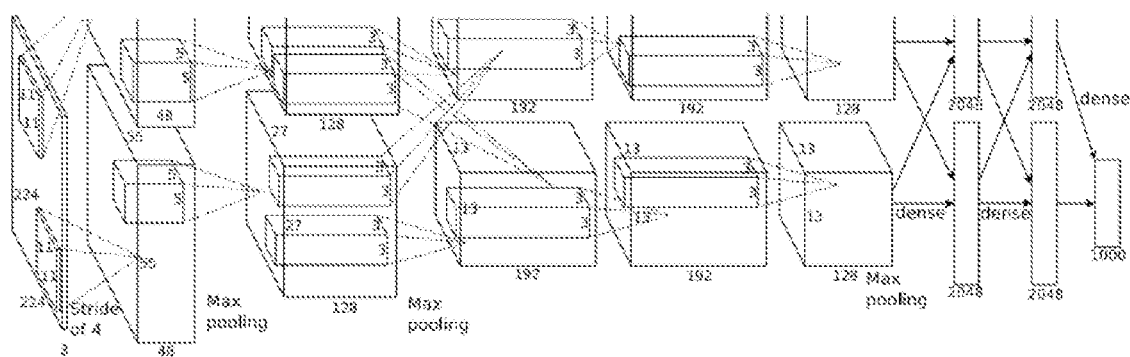
FIGS. 56-61 are diagrams that describe a Convolutional Neural Networks (CNN) technique for determining, and statistically classifying, visual descriptors used to detect and to identify section and product boundaries within a display structure, according to an embodiment.

FIG. 56 is a diagram of a typical CNN architecture used in the context of image classification, accoarding to an embodiment. In more detail, FIG. 56 is an illustration of the architecture of a CNN, explicity showing the delineation of responsibilities between the two graphics processing units (GPUs). One GPU runs the layer-parts at the top of the figure while the other runs the layer-parts at the bottom. The GPUs communicate only at certain layers. The network's input is 150,528-dimensional, and the number of neurons in the network's remaining layers is given by 253,440-186,624-64,896-64,896-43,264-4096-4096-1000. See Krizhevsky, A. Sutskver, I. And Hinton, G. E., *Imagenet Classiviation With Deep Convolutional Neural Netorks*, Advances In Neural Information Processing Systems, 2012, which is incorporated by reference.

Figure 57:
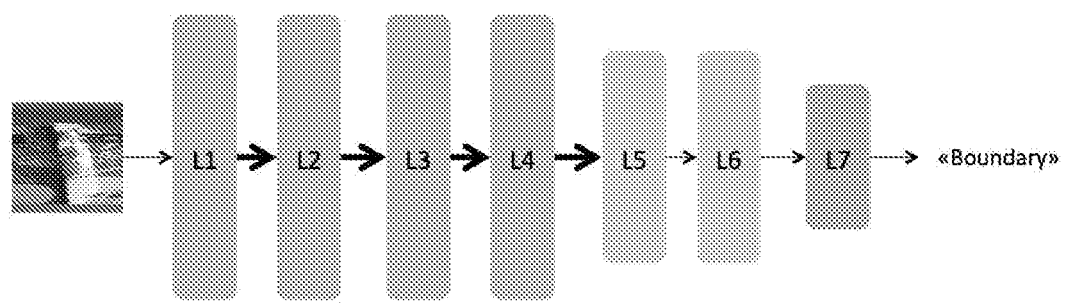

FIG. 57 is a block-diagram representation of a CNN.

Referring to FIG. 57, a CNN consists of a variable number of computational layers, here a 7-layer example is shown.

The input to the network is the size-normalized image (pixels), the output is the estimated class (label) of the input image.

Each layer takes the output of the previous layer as input, processes it, and outputs a certain mid-level representation; image pixels are said to be the lowest-level representation.

In FIG. 57, the CNN consists of three types of layers: There are 4 convolutional layers, 2 fully connected layers, and 1 classification layer. Convolutional and fully connected layers can vary in number.

Figure 58:
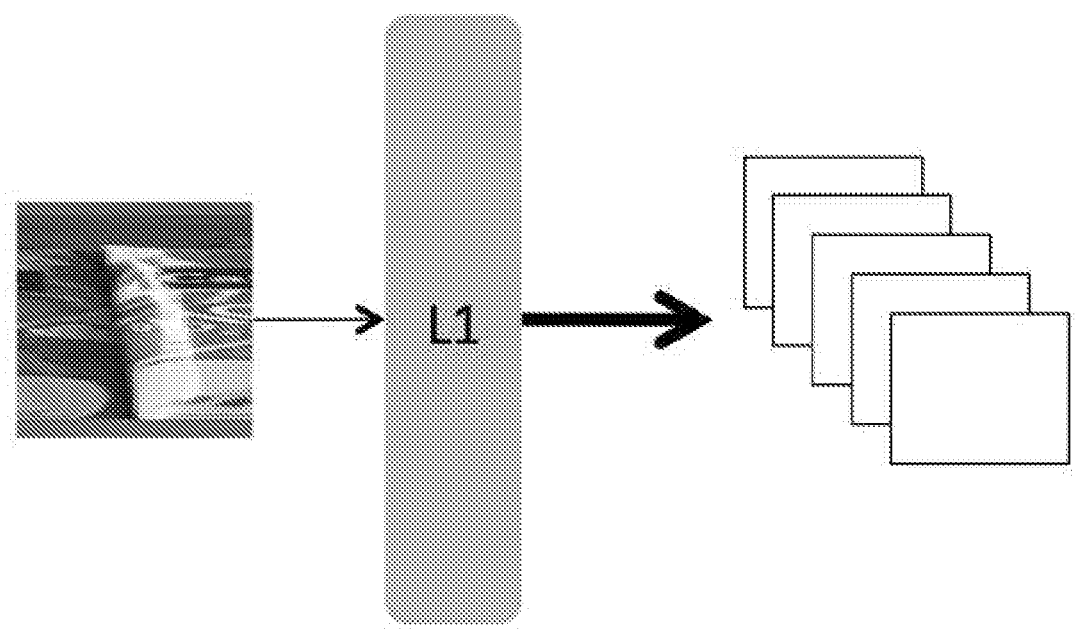

FIG. 58 is a diagram of a first convolutional layer L1 and feature maps of the layer, according to an embodiment. There are as many feature maps aa there are number of filters applied in the layer.

At the first convolutional layer, the following operations takes place.

Filter (convolve) the input with N1 number of filters, the output of each filter is a feature map, there are N1 feature maps in total.

To each feature map, apply the following operations in sequence.

Apply a non-linearity to the feature map values, the common choice is a rectified linear unit which zeros the negative values and keeps the positive values as they are, i.e., y=max(x,0).

Pool K1×K1 neighborhoods into their max values, and slide the neighborhood window with a stride of S1. This has the effect of keeping the strongest response at each neighborhood (max-pooling) and downsampling the image grid (the output matrix is smaller than the input as the pooling operation is applied every S1 pixels, and intermediate locations are discarded).

And contrast-normalize each feature map across all feature maps. That is, normalize the dynamic range of each position's values based on the positions' distribution across all feature maps (at a give position in the feature maps, there are N1 values from N1 feature maps, their dynamic range is normalized, for example, to a range of [0,1]).

Figure 59:
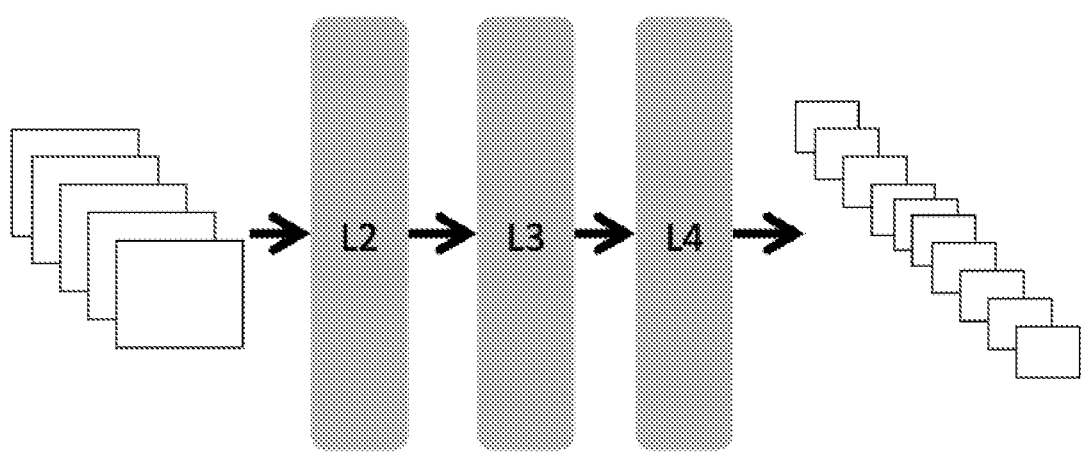

Referring to FIG. 59, at the mid-level convolutional layers, similar operations take place with the following observations.

The number of filters, sizes of the filter kernels, pooling neighborhoods, and stride parameters vary from layer to layer (these are the hyperparameters of the network).

These operations are applied to each feature map that is the output of the previous layer separately, hence the number of feature maps increase at each layer.

Figure 60:
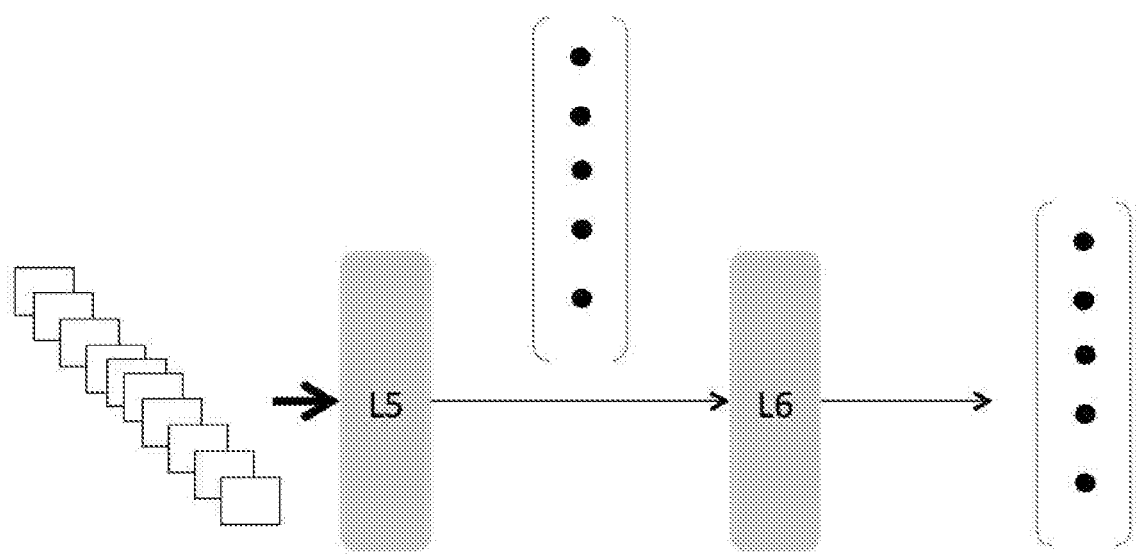

Referring to FIG. 60, the follow are features at the fully-connected layers.

The inputs and outputs are fixed-dimensional vectors (these dimensions are the hyperparameters of the network).

Each entry in the output vector consists of the weighted sum of all entries in the input vector from the previous layer.

In the layer L5, the input is constructed by first vectorizing each feature map from the previous layer, then concatenating all vectors formed this way.

In the layer L6, the input is the output of layer L5 (as usual in a feedforward network).

Figure 61:
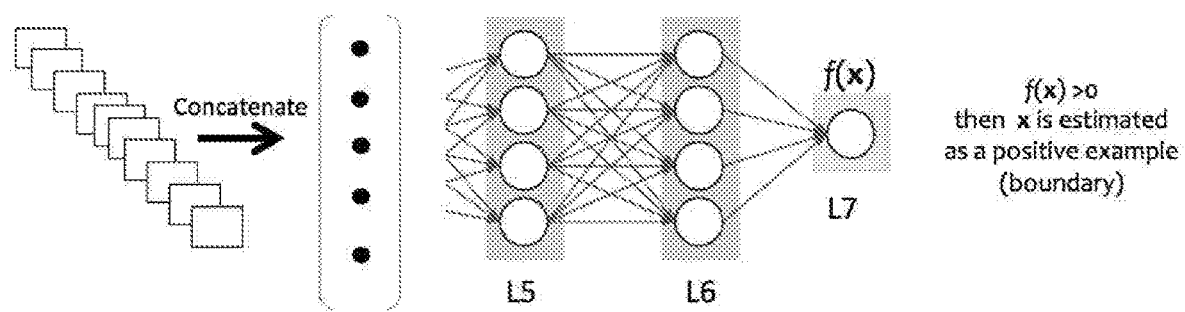

FIG. 61 is a diagram shown the open form of the layers L5 to L7, according to an embodiment.

Referring to FIGS. 60-61, the final (output) layer takes the output of the layer L6 as an input and computes a decision function f(x) to reach the final decision.

FIGS. 56-61 describe the feedforward operation of a fully specified CNN from the input image to the output decision function.

To fully specify a CNN according to a first example:

(1) The architecture is fixed in terms of the number and type of the layers, the number of filters, the stride parameters, the filter kernel sizes used in each convolutional layer, and the output dimension of each fully-connected layer, etc. (these are hyperparameters);

(2) The weights corresponding to each connection (i.e., the filter kernels and the weights of the fully connected layers) are learned from a training dataset.

(3) The learning process is a Gradient Descent based optimization procedure implemented via the well-known back propagation algorithm powered by several speed-up and regularization heuristics. A tutorial further explaining the first example can be found at http://cs231n.stanford.edu/, the contents of which are incorporated by reference.

To fully specify a CNN according to a second example:

(1) The architecture is fixed in terms of the number and type of the layers, the number of filters, the stride parameters, the filter kernel sizes used in each convolutional layer, and the output dimension of each fully-connected layer, etc. (these are hyper parameters);

(2) The weights corresponding to each connection (i.e., the filter kernels and the weights of the fully connected layers) are set by a computational learning procedure from a training dataset; and (3) The learning procedure is usually a Gradient Descent based optimization procedure implemented via the well-know back propagation algorithm powered by several speed-up and regularization heuristics. A tutorial further explaining the second example can be found at http://cs231n.stanford.edu/, the contents of which are incorporated by reference.

Still considering the second example, the weights of the network in the lower layers (i.e., convolutional filter weights) can be interpreted as feature extractors directly applied on image pixels and the weights of the fullyconnected layers can be understood as the classifier parameters.

Unlike the HOG algorithm described above in conjunction with FIGS. 24-55b, in which algorithm the visual-description part is algorithmically fixed (HOG descriptor parameters are not optimized or learned from a training set, they are fixed by design and heuristically set), in the CNN algorithm, all weights are the outcome of an optimization (learning) procedure from the image data.

That is, the CNN algorithm is said to learn the visual representation and the classifier from data in an integrated way.

For example, an embodiment uses CNNs in a new way for detecting boundaries in retail scene images (boundaries as understood in the context of the scene parsing use cases presented above). Before such use described herein, CNNs were not used to this effect (to identify boundaries in images of product-display structures and products located in or on the structures), although CNNs have been employed in a sheer number of other visual recognition tasks, with image classification, such as in ImageNet, being a classical example.

A number of embodiments defined by the following claims have been described. Nevertheless, it will be understood that various modifications to the described embodiments may be made without departing from the spirit and scope of the disclosure. For example, an alternative described in conjunction with one embodiment may be applied to another embodiment. Accordingly, other embodiments are within the scope of the following claims.

The invention claimed is:

1. An electronic processing system, comprising:
an image-processing circuit configured
  to receive an image of products disposed in a display structure having sections,
  to identify the sections, and
  to identify at least one respective product within each identified section;
a product-arrangement circuit configured
  to determine an arrangement of the identified products within the identified sections of the display structure, and
  to compare the determined arrangement to a product-arrangement template; and
a score circuit configured to generate a product-arrangement score in response to the
  comparing of the determined arrangement to the product-arrangement template;

wherein the image-processing circuit comprises
a descriptor circuit configured to generate respective first visual descriptors of pixels within first windows of the image, each first window having a first boundary dimension,
a comparison circuit configured
to compare each of the first visual descriptors to a first visual-descriptor template, and
to generate a respective first boundary value in response to each comparison, and
a boundary circuit configured to identify the sections by
generating a first boundary signal in response to the first boundary values, and
identifying at least one first boundary between the sections of the display structure in response to the first boundary signal, the identified at least one first boundary extending in the first boundary dimension.

2. The electronic system of claim 1, wherein the boundary circuit is configured;
to generate the boundary signal as a function of location within the image; and
to identify the at least one boundary at a respective location within the image corresponding to a respective peak of the boundary signal having a particular polarity.

3. The electronic system of claim 1, wherein
the boundary circuit is configured
to generate the boundary signal as a function of location within the image; and
to identify the at least one boundary at a respective location within the image corresponding to a respective positive peak of the boundary signal.

4. The electronic system of claim 1, wherein
the descriptor circuit is configured to generate
respective second visual descriptors of pixels within second windows of the image, each second window having a second boundary dimension that is approximately orthogonal to the first boundary dimension;
the comparison circuit is configured
to compare each of the second visual descriptors to a second visual-descriptor template, and
to generate a respective second boundary value in response to the comparison; and
the boundary circuit is configured to identify the sections by identifying
in response to the second boundary values, at least one second boundary between the sections of the display structure, each of the identified at least one second boundary extending in the second boundary dimension.

5. The electronic system of claim 4, wherein the first and second visual-descriptor templates are a same visual-descriptor template.

6. The electronic system of claim 4, wherein the first visual-descriptor template is different from the second visual-descriptor template.

7. The electronic system of claim 1, wherein:
the descriptor circuit is configured to generate
respective second visual descriptors of pixels within second windows of the image, each second window having a second boundary dimension that is approximately orthogonal to the first boundary dimension;
the comparison circuit is configured
to compare each of the second visual descriptors to a second visual-descriptor template, and
to generate a respective second boundary value in response to the comparison; and the boundary circuit is configured to identify the sections by identifying
the first boundary signal as a function of location within the image,
in response to the second boundary values, a second boundary signal that is a function of location within the image,
the at least one first boundary at a respective location within the image corresponding to a respective positive peak of the first boundary signal, and
at least one second boundary between the sections of the display structure in response to the second boundary signal, the identified at least one second boundary extending in the second boundary dimension and being located at a respective location within the image corresponding to a respective positive peaks of the second boundary signal.

8. The electronic system of claim 1, wherein
the descriptor circuit is configured to generate
respective second visual descriptors of pixels within second windows of the image, each second window having a second boundary dimension that is approximately orthogonal to the first boundary dimension;
the comparison circuit is configured
to compare each of the second visual descriptors to a second visual-descriptor template, and
to generate a respective second boundary value in response to each comparison;
the boundary circuit is configured to identify
product locations within each of the identified sections by identifying, in response to the second boundary values, a respective at least one second boundary between products within each of the identified sections, the identified respective at least one second boundary extending in the second boundary dimension; and
wherein the image-processing, circuit further includes a product circuit configured to identify a respective product within each of the identified product locations.

9. The electronic system of claim 1, wherein
the descriptor circuit is configured to generate
respective second visual descriptors of pixels within second windows of the image, each second window having a second boundary dimension that is approximately orthogonal to the first boundary dimension;
the comparison circuit is configured
to compare each of the second visual descriptors to a second visual-descriptor template, and
to generate a respective second boundary value in response to each comparison;
the boundary circuit is configured to identify
the sections by
generating the first boundary signal as a function of location within the image, and
identify the at least one first boundary at a respective location within the image corresponding to a respective positive peak of the first boundary signal, and
product locations within the sections by identifying
in response to the second boundary values, a second boundary signal that is a function of location within the image, and
in response to the second boundary signal, a respective at least one second boundary between the products within each section, each of the identified respective at least one second boundary extending in the second boundary dimension and being located at a respective location within the image corresponding to a respective positive peak of the second boundary signal; and wherein the image-processing circuit further includes a product circuit configured to identify a respective product within each of the identified product locations.

10. The electronic system of claim 1, wherein:
the product-arrangement circuit is further configured to determine, in response to the comparing of the determined arrangement to the product-arrangement template, a number of errors in the determined arrangement of the identified product; and
the arrangement-score circuit is configured to generate the arrangement score in response to the determined number of errors.

11. The electronic system of claim 1, wherein:
the product-arrangement circuit is further configured to determine, in response to the comparing of the determined arrangement to the product-arrangement template, a number of errors in the determined arrangement of the identified products, and a location of each determined error within the determined arrangement; and
the arrangement-score circuit is configured to generate the arrangement score in response to the determined number of errors and the determined location of each determined error.

12. The electronic system of claim 1, further comprising:
wherein the image-processing circuit is configured
to receive an image of the display structure and at least one object outside of the display structure, and
to identify the at least one object;
an object-arrangement circuit configured
to determine an arrangement of the identified at least one object relative to the display structure, and
to compare the determined arrangement of at least one object to an object-arrangement template; and
wherein the arrangement-score circuit is configured to generate an object-arrangement score in response to the comparing of the determined arrangement of at least one object to the object-arrangement template.

13. A method, comprising:
receiving an image of products disposed in a display structure having sections;
generating respective first visual descriptors of pixels within first windows of the image, each first window having a first boundary dimension;
comparing each of the first visual descriptors to a visual-descriptor template;
generating a respective first boundary value in response to each comparison;
identifying the sections of the display structure
by generating a first boundary signal in response to the first boundary values, and
identifying at least one first boundary between the sections of the display structure in response to the first boundary signal, the identified at least one first boundary extending in the first boundary dimension;
identifying at least one respective product within the two or more of the identified sections of the display structure;
determining an arrangement of the identified products within the two or more of the identified sections of the di sp as, structure;
comparing the determined arrangement to a product-arrangement template; and generating a product-arrangement score in response to the comparing of the determined arrangement to the product-arrangement template.

14. The method of claim 13, wherein:
generating the boundary signal includes generating the boundary signal as a function of location within the image and
identifying the at least one boundary includes identifying each of the at least one boundary at a respective location within the image corresponding to a respective peak of the boundary signal having a particular polarity.

15. The method of claim 13, wherein
generating the boundary signal includes generating the boundary signal as a function of location within the image; and
identifying the at least one boundary includes locating each of the at least one boundary at a respective location within the image corresponding to a respective positive peak of the boundary signal.

16. The method of claim 13, further comprising:
generating respective second visual descriptors of pixels within second windows of the image, each second window having a second boundary dimension that is approximately orthogonal to the first boundary dimension;
comparing each of the second visual descriptors to a second visual-descriptor template;
generating a respective second boundary value in response to the comparison; and
wherein identifying the sections of the display structure includes identifying the sections by identifying,
in response to the second boundary values, at least one second boundary between the sections of the display structure, each of the identified at least one second boundary extending in the second boundary dimension.

17. The method of claim 13, further comprising:
generating respective second visual descriptors of pixels within second windows of the image, each second window having a second boundary dimension that is approximately orthogonal to the first boundary dimension;
comparing each of the second visual descriptors to a second visual-descriptor template;
generating a respective second boundary value in response to the comparison; and
wherein identifying the sections of the display structure includes identifying the sections by identifying
the first boundary signal as a function of location within the image,
in response to the second boundary values, a second boundary signal that is a function of location within the image,
each of the identified at least one first boundary at a respective location within the image corresponding to a respective positive peak of the first boundary signal, and
at least one second boundary between the sections of the display structure in response to the second boundary signal, the identified at least one second boundary extending in the second boundary dimension and being located at a respective location within the image corresponding to a respective positive peaks of the second boundary signal.

18. The method of claim 13, further comprising:
generating respective second visual descriptors of pixels within second windows of the image, each second window having a second boundary dimension that is approximately orthogonal to the first boundary dimension;

comparing each of the second visual descriptors to a second visual-descriptor template;

generating a respective second boundary value in response to each comparison;

identifying product locations within each of the identified sections by identifying, in response to the second boundary values, a respective at least one second boundary between products within each of the identified sections, the identified respective at least one second boundary extending in the second boundary dimension; and wherein identifying at least one respective product within each of two or more of the identified sections includes identifying at least one respective product within each of two or more identified sections by identifying a respective product within each of the identified product locations.

19. The method of claim 13, further comprising:

generating respective second visual descriptors of pixels within second windows of the image, each second window having a second boundary dimension that is approximately orthogonal to the first boundary dimension;

comparing each of the second visual descriptors to a second visual-descriptor template;

generating a respective second boundary value in response to each comparison;

wherein identifying the sections of the display structure includes identifying the sections by identifying
the first boundary signal as a function of location within the image, and
the at least one first boundary at a respective location within the image corresponding to a respective positive peak of the first boundary signal;

identifying product locations within the sections by identifying
in response to the second boundary values, a second boundary signal that is a function of location within the image, and
in response to the second boundary signal, a respective at least one second boundary between the products within each section, each of the identified respective at least one second boundary extending in the second boundary dimension and being located at a respective location within the image corresponding to a respective positive peak of the second boundary signal; and wherein identifying at least one respective product within each of two or more of the identified sections includes identifying at least one respective product within each of two or more of the identified product locations.

20. The method of claim 13, further comprising:

determining, in response to the comparing of the determined arrangement to the product-arrangement template, a number of errors in the determined arrangement of the identified products; and wherein generating the product-arrangement score includes generating the product-arrangement score in response to the determined number of errors.

21. The method of claim 13, further comprising:

determining, in response to the comparing of the determined arrangement to the product-arrangement template, a number of errors in the determined arrangement of the identified products, and a location of each determined error within the determined arrangement; and generating the product-arrangement score in response to the determined number of errors and the determined location of each determined error.

22. The method of claim 13, further comprising:

wherein receiving an image includes receiving an image of the display structure and at least one object outside of the display structure;

identifying the at least one object;

determining an arrangement of the identified at least one object relative to the display structure;

comparing the determined arrangement of at least one object to an object-arrangement template; and generating an object-arrangement score in response to the comparing of the determined arrangement of at least one object to the object-arrangement template.

23. A tangible, non-transitory computer-readable medium storing program instructions that, when executed by a computing circuit, cause the computing circuit, or another circuit controlled by the computing circuit:

to receive an image of products disposed in a display structure having sections;

to generate respective visual descriptors of pixels within windows of the image, each window having a boundary dimension;

to compare each of visual descriptors to a visual-descriptor template;

to generate a respective boundary value in response to each comparison, to identify the sections of the display structure by
generating a boundary signal in response to the boundary values, and
identifying at least one boundary between the sections of the display structure in response to the boundary signal, the identified at least one boundary extending in the boundary dimension;

to identify at least one respective product within each two or more identified sections of the display structure;

to determine an arrangement of the identified products within the two Or more of the identified sections of the display structure;

to compare the determined arrangement to a product-arrangement template; and to generate a product-arrangement score in response to the comparing of the determined arrangement to the product-arrangement template.

* * * * *